(12) United States Patent
Odaira

(10) Patent No.: US 8,856,765 B2
(45) Date of Patent: Oct. 7, 2014

(54) ANALYZING A POINTER IN AN ANALYSIS TARGET PROGRAM OR A PARTIAL PROGRAM

(75) Inventor: Rei Odaira, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 377 days.

(21) Appl. No.: 13/323,859

(22) Filed: Dec. 13, 2011

(65) Prior Publication Data

US 2012/0151461 A1  Jun. 14, 2012

(30) Foreign Application Priority Data

Dec. 14, 2010 (JP) .................. 2010-278450

(51) Int. Cl.
G06F 9/45 (2006.01)
(52) U.S. Cl.
CPC ...................... G06F 8/434 (2013.01)
USPC ........................................ 717/156
(58) Field of Classification Search
USPC ........................................ 717/156
See application file for complete search history.

(56) References Cited

U.S. PATENT DOCUMENTS

| | | | |
|---|---|---|---|
| 7,003,507 B2* | 2/2006 | Tip et al. ................... | 1/1 |
| 2010/0070955 A1* | 3/2010 | Kahlon ..................... | 717/141 |
| 2013/0145132 A1* | 6/2013 | Moritz ...................... | 712/220 |

OTHER PUBLICATIONS

Burke et al., "Flow Insensitive . . . ", 1995, ACM, pp. 234-250.*
Liang et al., "Efficient points-to analysis . . . ", 1999, ACM, pp. 199-215.*
Ruf et al., Context-Insensitive Alias Analysis Reconsidered, ACM, 1995, pp. 13-22.*
Whaley et al., Cloning-Based Context-Sensitive Pointer Alias Analysis . . . , ACM, 2004, pp. 131-144.*

* cited by examiner

Primary Examiner — John Chavis
(74) Attorney, Agent, or Firm — Jeff Tang

(57) ABSTRACT

The present invention provides a technique for analyzing a pointer. The technique is characterized in detecting whether or not an object for which it is desired to detect an access position escapes to at least one method which is a caller of a method which generates the identified object (a first caller method) or at least one method which is called by the method which generates the identified object (a first callee method), and preparing a load node in a point-to graph and updating the point-to graph on condition that a field of at least one object in the point-to graph is reachable from the first caller method or the first callee method and the field is in a state of not pointing to an object in the point-to graph.

20 Claims, 60 Drawing Sheets

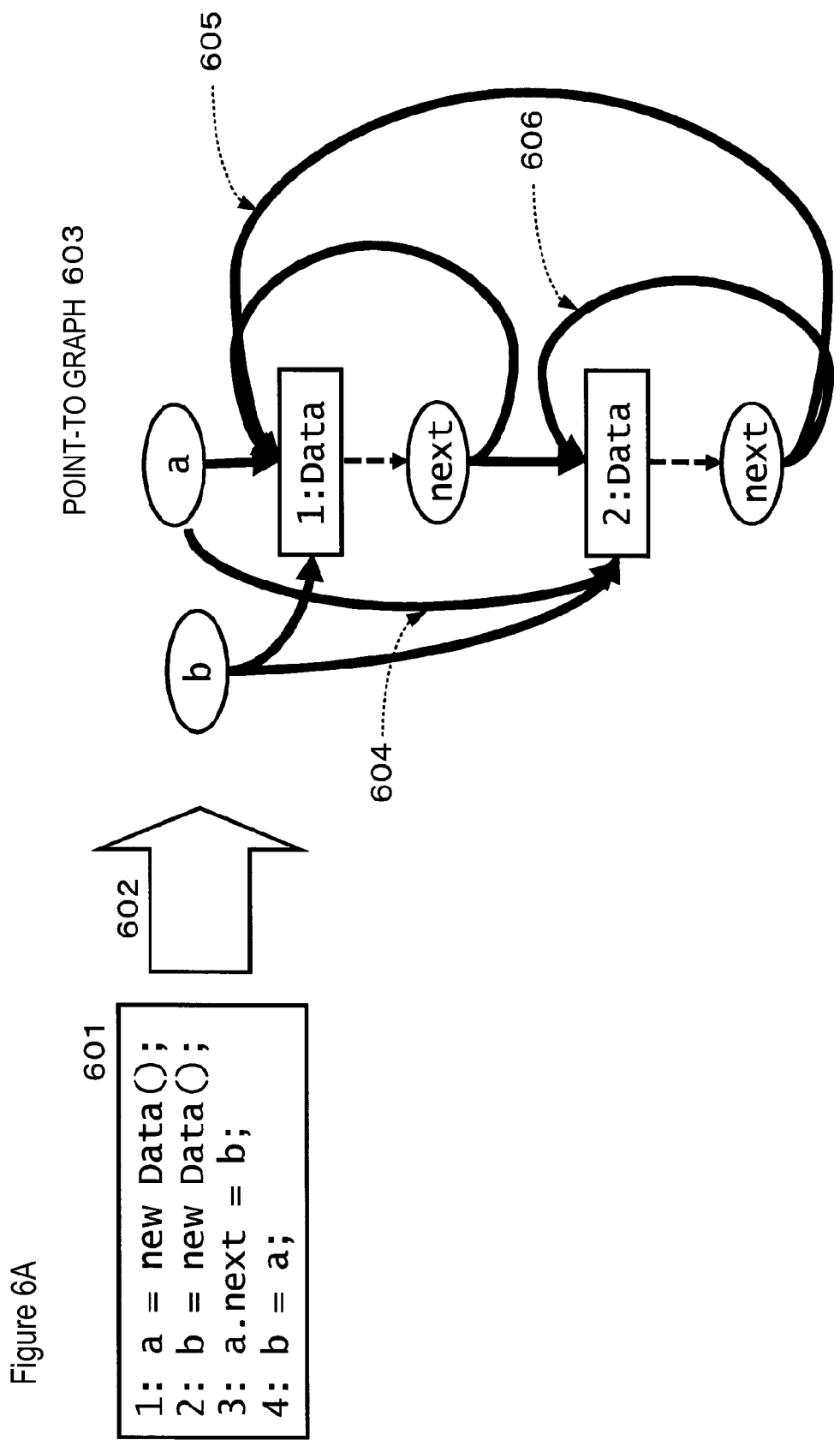

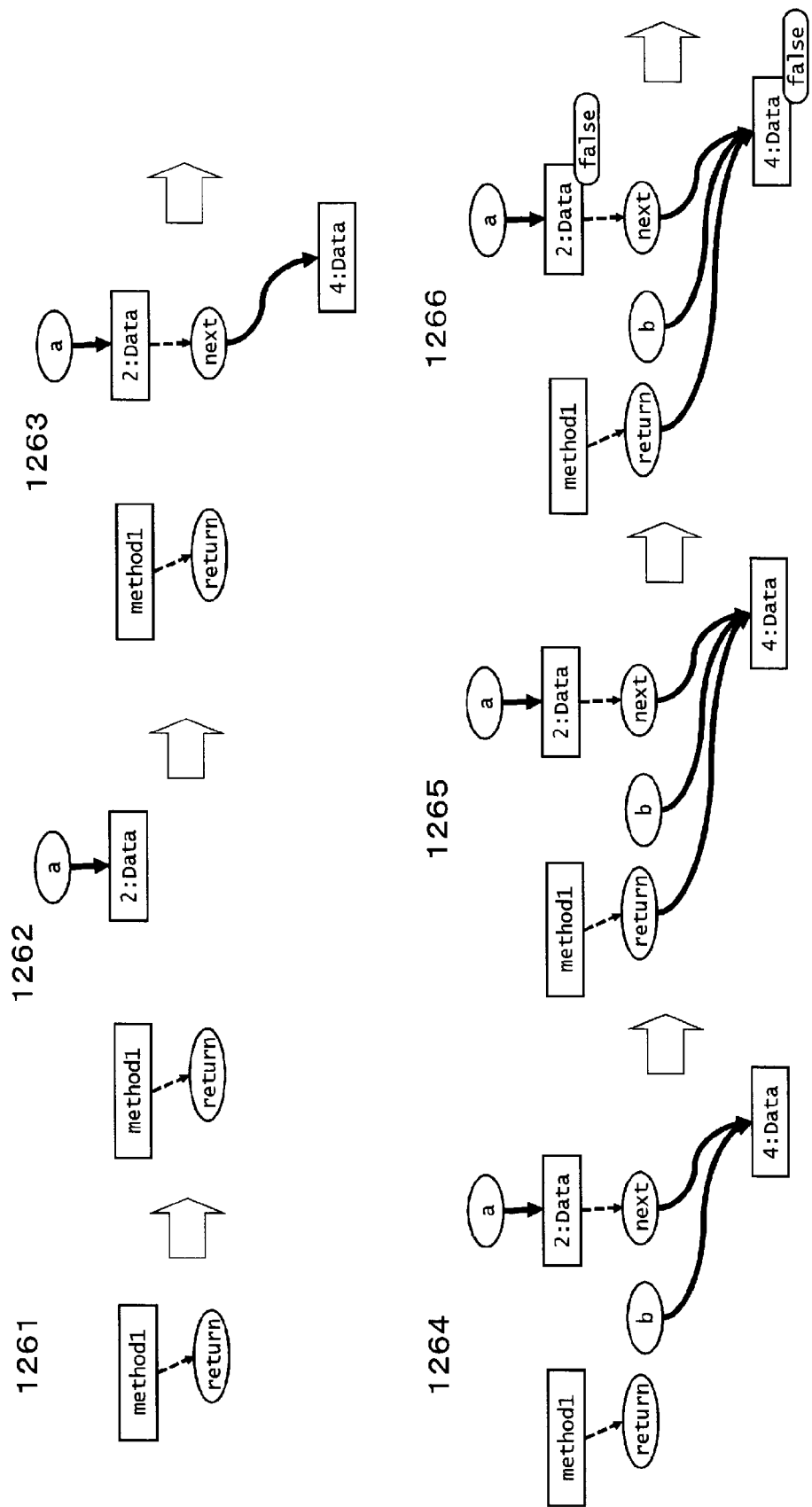

```
1:  class DataSet {
2:    private Data data;
3:    void method0() {
4:      this.method1();
5:    }
6:    void method1() {
7:      a = new Data();
8:      this.method2(a);
9:      x = this.data.field;
10:   ...
11:   }
12:   void method2(Data b) {
13:     this.data = b;
14:   }
15:   void method3() {
16:     c = this.data;
17:   ...
18:   }
19: }
```

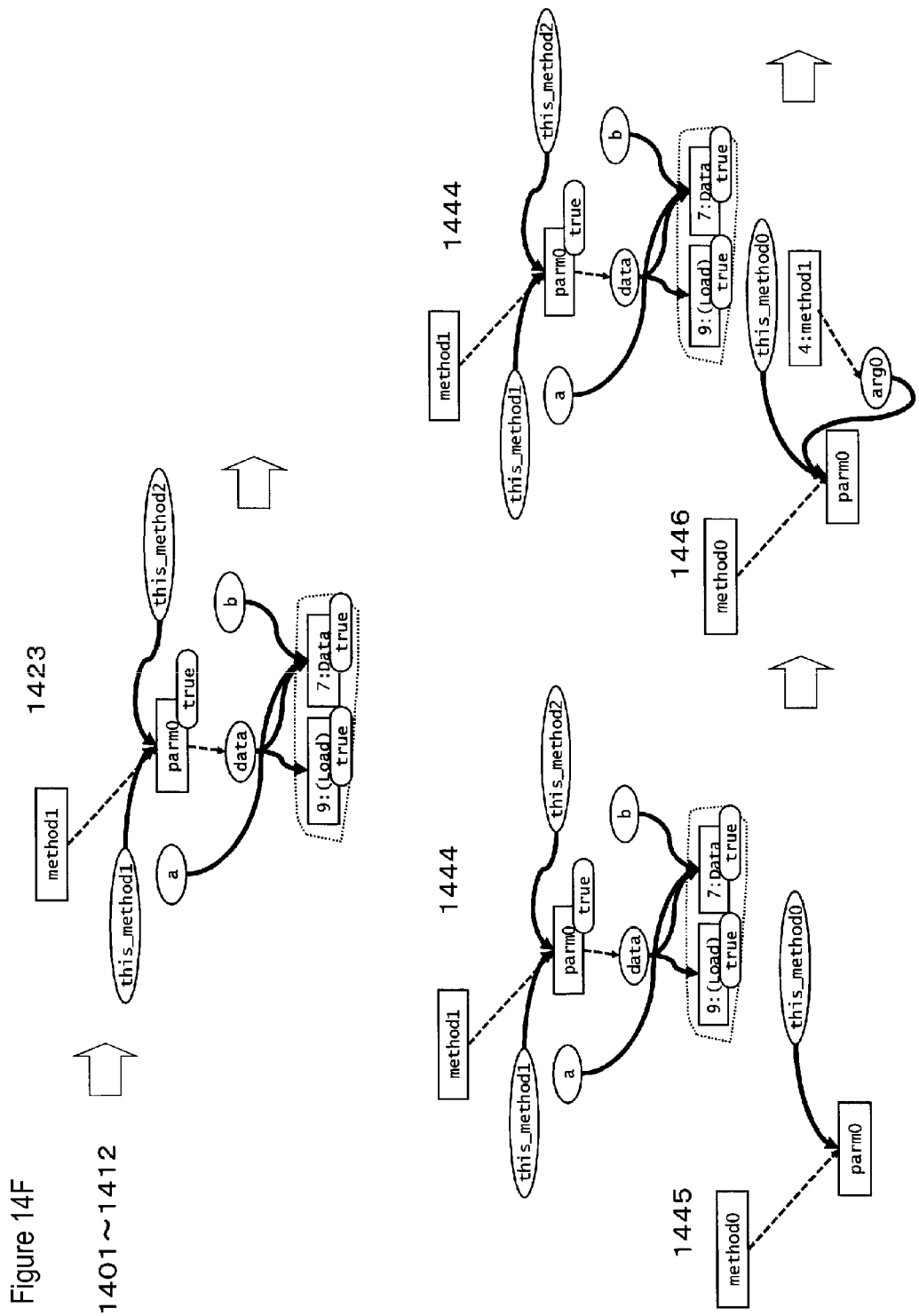
Figure 14F 1401~1412

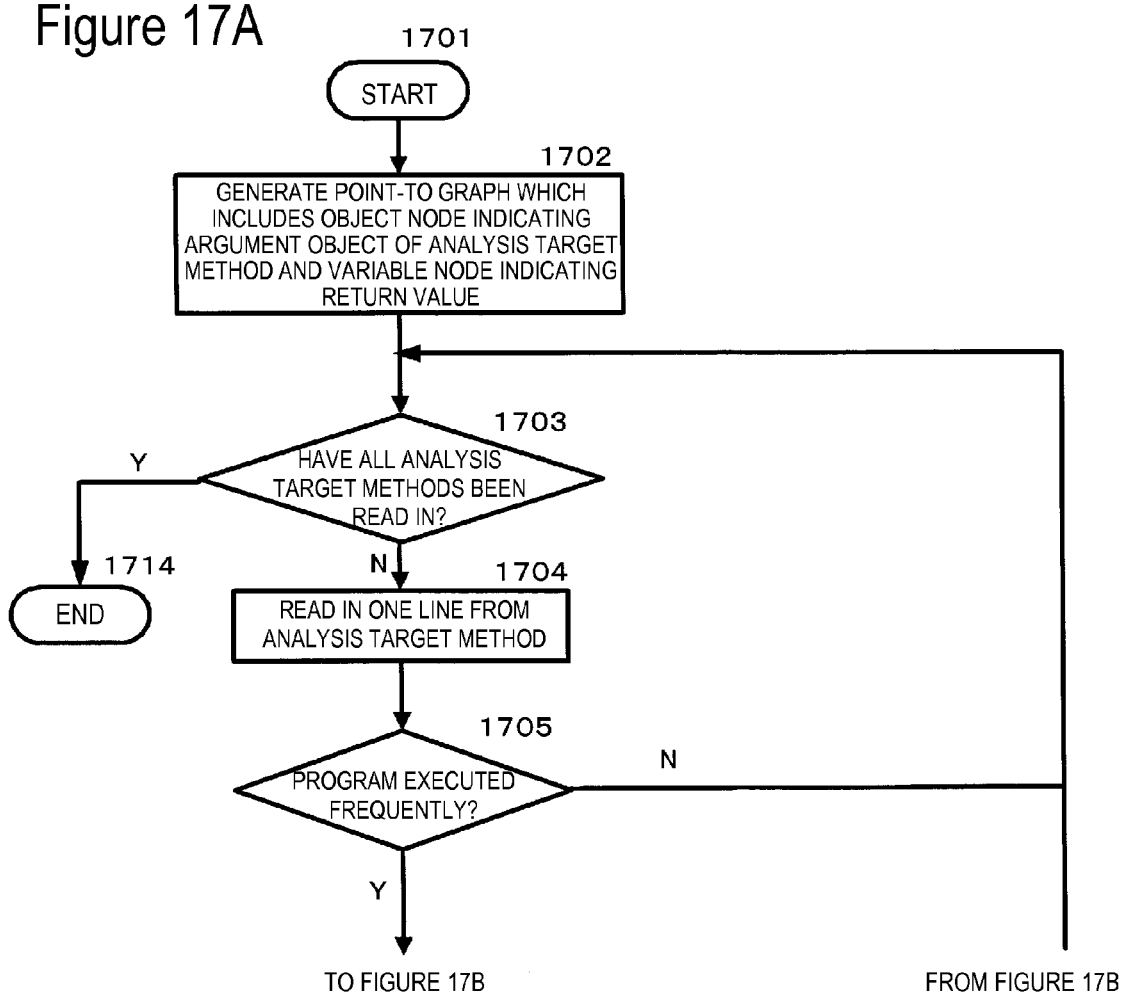

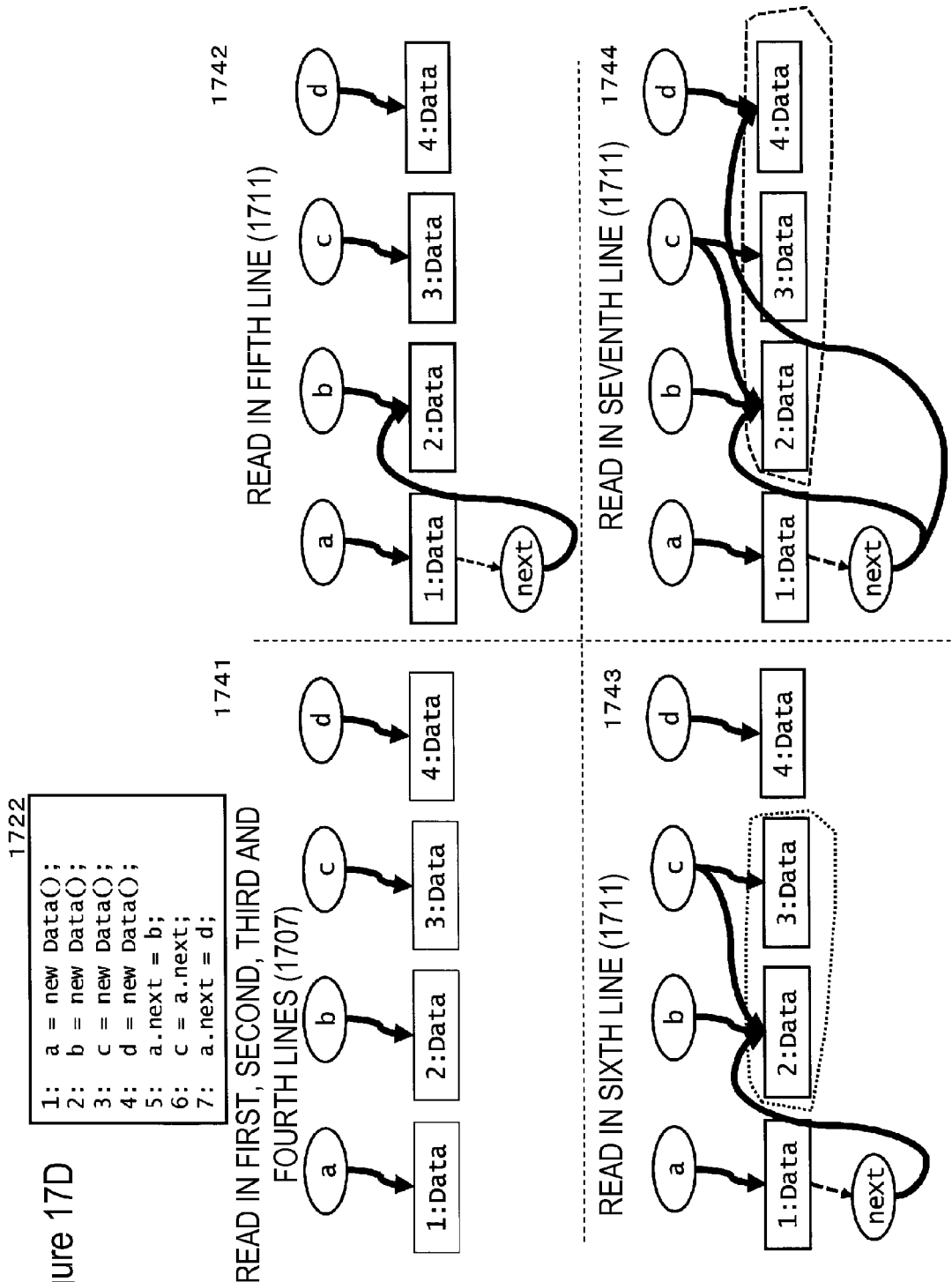

ANALYZING A POINTER IN AN ANALYSIS TARGET PROGRAM OR A PARTIAL PROGRAM

CROSS-REFERENCE TO RELATED APPLICATION

This application claims priority under 35 U.S.C. §119 from Japanese Patent Application No. 2010-278450 filed Dec. 14, 2010, the entire contents of which are incorporated herein by reference.

BACKGROUND OF THE INVENTION

1. Field of the Invention

The present invention relates to a technique for analyzing a pointer, and in particular to a technique for detecting a position to access an object for which it is desired to detect an access position.

2. Description of Related Art

An object-oriented program, such as a Java™ program, dynamically allocates a lot of objects in a memory heap area and accesses the objects. This brings about increase in CPU cache misses and restriction of the memory band width due to accesses to the objects. Therefore, it is important for a developer and in an optimization process by a compiler to understand where and how the object-oriented program accesses the allocated objects to optimize the use of the CPU cache and memory band width during execution of the object-oriented program. Accordingly, methods for detecting a position to access an object have been developed.

Frederic Vivien et al., "Incrementalized Pointer and Escape Analysis", [online], ACM 089791886/97/05, 2001, the Internet <URL http://people.csail.mitedu/rinard/paper/pldi01.pdf> shown below describes escape analysis ("Abstract" and "7.1 Escape Analysis").

Rebecca Hasti et al., "Using Static Single Assignment Form to Improve Flow-Insensitive Pointer Analysis", [online], ACM 0-89791-987-4/98/0006, 1998, the Internet <URL http://www.cs.purdue.edu/homes/suresh/590s-Fall2002/papers/hasti98using.pdf> shown below describes that pointer analysis can be flow-sensitive or flow-insensitive ("Abstract").

Sanjay Ghemawat et. Al., "Field Analysis: Getting Useful and Low-cost Interprocedural Information", [online], 2000, the Internet <URL http://citeseerx.ist.psu.edu/viewdoc/download?doi=10.1.1.78.8889&rep=rep1&type=pdf > shown below describes field analysis ("Abstract"). The field analysis determines useful characteristics of a field of an object by scanning a code which can probably access the field (p. 1, right column, 4th paragraph, 1.1-3). For example, a private field in Java™ can be accessed only by a method in a local class (p. 1, right column, 4th paragraph, 1.3-5).

Ran Shaham et. Al., "Heap profiling for Space-Efficient Java", [online], ACM 1-58113-414-2/01/06, 2001, the Internet <URL http://www.cs.tau.ac.il/msagiv/pldi01.pdf> shown below describes: "For an instance field we inspect the code according to visibility modifiers of the field, e.g., for a private field we inspect only the code of the containing class" (p. 107, "3.3.1 Assigning Null", right column 1.3-5).

National Publication of International Patent Application No. 2005-535055 shown below describes "alias analysis" (paragraph 0140) and describes: "alias analysis can be more accurate or not so accurate depending on whether a control flow is considered or not. If the control flow is considered, it is called flow-sensitive, and otherwise, it is called flow-insensitive. By the flow-sensitive alias analysis, it can be detected in which block two objects are aliased along a path. Since this is more accurate, it is more complicated, and the calculation is more difficult. Ordinarily, flow-insensitive information is sufficient. This point of view is shown in FIG. 14. In this case, it is known by flow-insensitive analysis that p is an alias of b, and it is known by flow-sensitive analysis that p is the alias of b only in a block B2" (paragraph 0142).

Japanese Patent Laid-Open No. 2003-122628 shown below describes that a program conversion apparatus is provided with simulation means for, when generating an instruction code for controlling hardware from a source program describing a signal processing procedure, analyzing the signal processing procedure of the source program in advance and recording a history of the use frequency of address pointer registers in the source program, and a register use instruction to use an address pointer register with a high use frequency is changed to an address pointer register use instruction corresponding to the bank group decoder on the basis of the history of the use frequency of the address pointer registers in the source program obtained by the simulation means.

Japanese Patent Laid-Open No. H10-21078 shown below describes that, in a programming language processing system which combines multiple data definitions to hold a new combined view definition, a combined view reference expression compiling system is provided with means for analyzing the sentence structure of a source code, means for analyzing type information about the analyzed sentence structure and generating a type information table, means for generating a reference code by referring to the type information table and means for outputting a developed code.

Japanese Patent Laid-Open No. 2004-362216 shown below describes that a compiler apparatus is further provided with an execution frequency information measuring section measuring, for each of at least a part of instructions included in a target program, the execution frequency of the instruction by executing the target program; and, if the execution frequency of the detected exclusion-from-optimization instruction by the execution frequency information measuring section is higher than a predetermined first frequency, the instruction group selecting section selects the exclusion-from-optimization instruction as the optimization target instruction group, and, if the execution frequency of the detected exclusion-from-optimization instruction by the execution frequency information measuring section is lower than a second frequency set to a value lower than the first frequency, the instruction group selecting section selects the optimization target instruction as the exclusion-from-optimization instruction.

SUMMARY OF THE INVENTION

One aspect of the present inventions provides a method for analyzing a pointer in an analysis target program or a partial program thereof by processing by a computer, the method including the computer executing the steps of: creating a flow-insensitive point-to graph for the program in memory by a compiler, with a compiling target method as a target, the point-to graph being a graph with variables, or variables and at least one of methods and objects as nodes and with objects pointed to by the variables as edges, where, on condition that an object for which it is desired to detect an access position is identified, creating a first flow-insensitive point-to graph for a first method generating the identified object; and detecting whether or not the object for which it is desired to detect the access position escapes to at least one method which is a caller of the first method (hereinafter referred to as a first caller method) or at least one method which is called by the first method (hereinafter referred to as a first callee method), using the first point-to graph, the detecting step including preparing a first load node in the first point-to graph and updating the first point-to graph on condition that a field of at least one object in the first point-to graph is (i) reachable from the first caller method or the first callee method and (ii) in a state of not pointing to the object in the first point-to graph, where the first load node is used to detect whether or not the object for which it is desired to detect the access position escapes in the updated first point-to graph; and on condition that the object for which it is desired to detect the access position does not escape to the first caller method or the first callee method, detecting a position to access the object for which it is desired to detect the access position, by following the updated first point-to graph if the first load node is prepared and by following the first point-to graph if the first load node is not prepared.

Another aspect of the present invention provides a method for a computer to optimize a code using an access position detected by an analyzing method for a pointer in an analysis target program or a partial program thereof, by processing by the computer, the analyzing method including the computer executing the steps of: creating a flow-insensitive point-to graph for the program in memory by a compiler, with a compiling target method as a target, the point-to graph being a graph with variables, or variables and at least one of methods and objects as nodes and with objects pointed to by the variables as edges, where on condition that an object for which it is desired to detect the access position is identified, creating a first flow-insensitive point-to graph for a first method generating the identified object; and detecting whether or not the object for which it is desired to detect the access position escapes to at least one method which is a caller of the first method (hereinafter referred to as a first caller method) or at least one method which is called by the first method (hereinafter referred to as a first callee method), using the created first point-to graph, the detecting step including preparing a first load node in the first point-to graph and updating the first point-to graph on condition that a field of at least one object in the first point-to graph is (i) reachable from the first caller method or the first callee method and (ii) in a state of not pointing to the object in the first point-to graph, where the first load node is used to detect whether or not the object for which it is desired to detect the access position escapes in the updated first point-to graph; and on condition that the object for which it is desired to detect the access position does not escape to the first caller method or the first callee method, detecting a position to access the object for which it is desired to detect the access position, by following the updated first point-to graph if the first load node is prepared and by following the first point-to graph if the first load node is not prepared.

Another aspect of the present invention provides a method for analyzing a pointer in an analysis target program or a partial program thereof by processing by a computer, the method including the computer executing the steps of: creating a flow-insensitive point-to graph for the program in memory by a compiler, with a compiling target method as a target, the point-to graph being a graph with variables, or variables and at least one of methods and objects as nodes and with objects pointed to by the variables as edges, where on condition that an object for which it is desired to detect the access position is identified, creating a first flow-insensitive point-to graph for a first method generating the identified object; detecting whether or not the object for which it is desired to detect the access position escapes to at least one method which is a caller of the first method (hereinafter referred to as a first caller method) or at least one method which is called by the first method (hereinafter referred to as a first callee method), using the created first point-to graph, the detecting step including preparing a first load node in the first point-to graph and updating the first point-to graph on condition that a field of at least one object in the first point-to graph is (i) reachable from the first caller method or the first callee method and (i) in a state of not pointing to the object in the first point-to graph, where the first load node is used to detect whether or not the object for which it is desired to detect the access position escapes in the updated first point-to graph; on condition that the object for which it is desired to detect the access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared; detecting whether or not the object for which it is desired to detect the access position escapes to a method which has not been analyzed yet among caller methods of a method analyzed in the past steps (hereinafter referred to as a second caller method) or a method which has not been analyzed yet among methods called by the method analyzed in the past steps (hereinafter referred to as a second callee method), using the merged first point-to graph, the detecting step including preparing a second load node in the merged first point-to graph and updating the merged first point-to graph on condition that a field of at least one object in the merged first point-to graph is (i) reachable from the second caller method or the second callee method and (ii) in a state of not pointing to the object in the merged first point-to graph, where the second load node is used to detect whether or not the object for which it is desired to detect the access position escapes in the updated, merged first point-to graph; and repeating the creating and the detecting steps until the object for which it is desired to detect the access position stops escaping or until analyzed methods other than the first method reach a predetermined threshold; and detecting a position to access the object for which it is desired to detect the access position, by following a point-to graph obtained in the end of the repeating steps.

Another aspect of the present invention provides a computer for analyzing a pointer in an analysis target program or a partial program thereof, the computer including: a graph creating section creating a flow-insensitive point-to graph for the program in memory by a compiler, with a compiling target method as a target, the point-to graph being a graph with variables, or variables and at least one of methods and objects as nodes and with objects pointed to by the variables as edges, where on condition that an object for which it is desired to detect the access position is identified, creating a first flow-insensitive point-to graph for a first method generating the identified object; and detecting whether or not the object for which it is desired to detect the access position escapes to at least one method which is a caller of the first method (hereinafter referred to as a first caller method) or at least one method which is called by the first method (hereinafter referred to as a first callee method), using the created first point-to graph, the detecting including preparing a first load node in the first point-to graph and updating the first point-to graph on condition that a field of at least one object in the first point-to graph is (i) reachable from the first caller method or the first callee method and (ii) in a state of not pointing to the object in the first point-to graph, where the first load node is used to detect whether or not the object for which it is desired to detect the access position escapes in the updated first point-to graph; and a detection section detecting, on condition that the object for which it is desired to detect the access position does not escape to the first caller method or the first callee method, a position to access the object for which it is desired to detect the access position, by following the updated first point-to graph if the first load node is prepared and by following the first point-to graph if the first load node is not prepared.

BRIEF DESCRIPTION OF THE DRAWINGS

In order to describe features and benefits of the embodiment of the invention in detail, the following drawings will be referred to. Where possible, same or similar reference number will be used in drawings and description to denote same or similar part, in which:

FIG. 6A shows an example of analyzing a program by a unification-based technique (a technique based on unification), one of the flow-insensitive techniques, and expressing a result of the analysis by a point-to graph.

FIG. 12D is a diagram showing the details of generation of a point-to graph obtained by the pointer analysis shown in the lower part of FIG. 12A.

FIG. 14F is a diagram showing that a graph is further enlarged by the pointer analyses shown in the upper and lower parts of FIG. 13A.

FIG. 17A is a detailed flowchart of steps (1603 and 1607) of creating a flow-insensitive point-to graph in the flowchart of FIG. 16.

FIG. 17D is a graph for illustrating an example of graph generation performed at step 1711 in FIG. 17B.

DETAILED DESCRIPTION OF THE PREFERRED EMBODIMENTS

Figure 1:
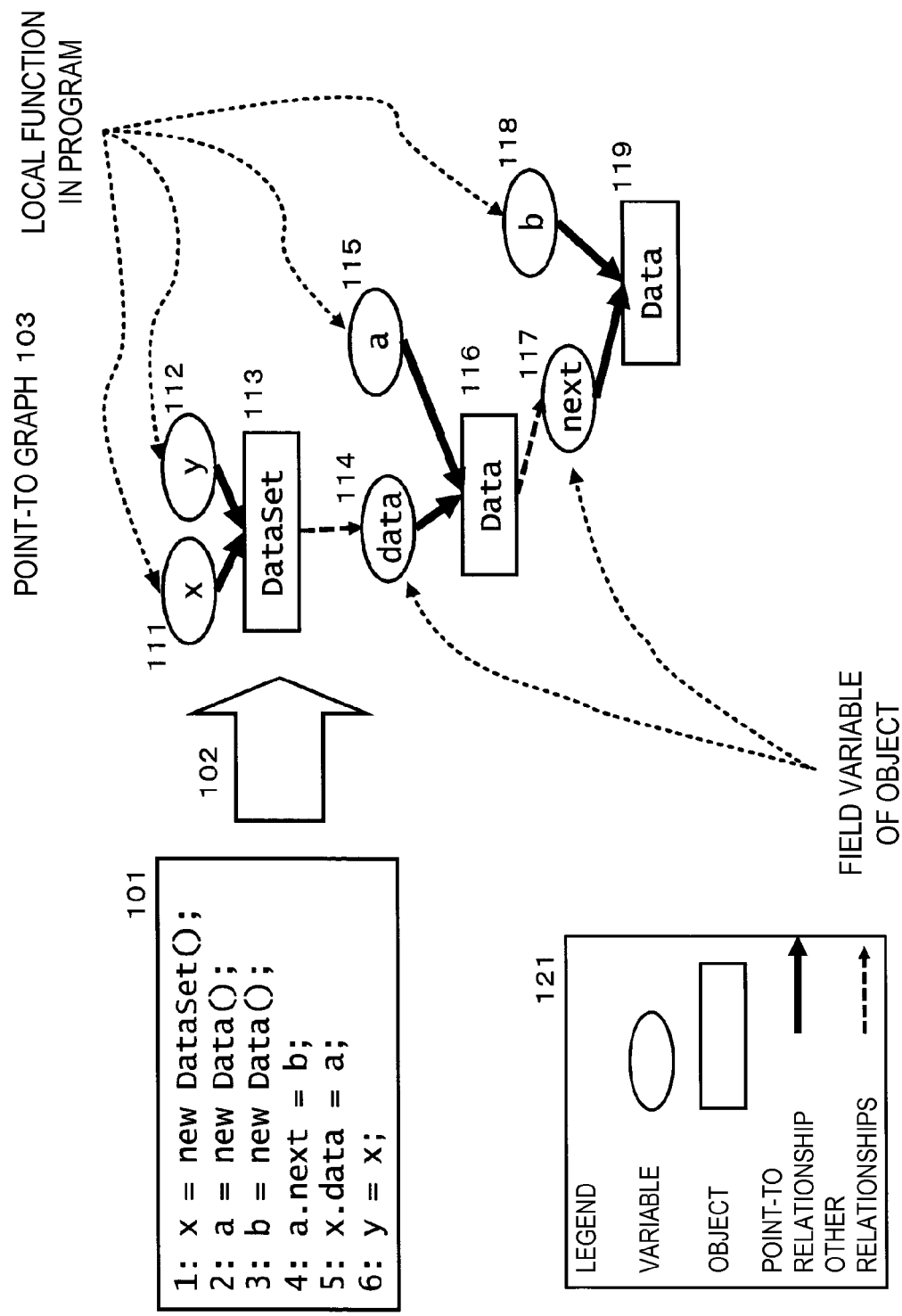
FIG. 1 is a diagram for illustrating pointer analysis.

An object of the present invention is to provide a technique for analyzing how and where a program, in particular, an object-oriented program accesses an allocated object by analyzing access to the object. In particular, an object of the present invention is to provide an easy pointer analysis technique to perform analysis of access to an object by a Just-In-Time (JIT) compiler. Another object of the present invention is to optimize a code using a result of the analysis.

The present invention provides a technique for analyzing a pointer. The present invention also provides a technique for optimizing a code using an access position detected by that technique. In particular, the technique provides a pointer analysis method, a computer, a computer program and a computer program product.

The pointer analysis method for the present invention is as follows. One aspect of the method includes execution of:

a step of creating one flow-insensitive point-to graph for the program in memory by a compiler, with a compiling target method as a target, the point-to graph being a graph with variables, or variables and at least one of methods and objects as nodes and with objects pointed to by the variables as edges, and the creating step including:

(a) a step of, on condition that an object for which it is desired to detect an access position is identified, creating a first flow-insensitive point-to graph for a method generating the identified object (hereinafter, also referred to as the first method); and (b) a step of detecting whether or not the object for which it is desired to detect an access position escapes to at least one method which is a caller of the first method (hereinafter, also referred to as a first caller method) or at least one method which is called by the first method (hereinafter, also referred to as a first callee method), using the created first point-to graph, the detecting step including preparing a first load node in the first point-to graph and updating the first point-to graph on condition that a field of at least one object in the first point-to graph is (1) reachable from the first caller method or the first callee method and (2) in a state of not pointing to an object in the first point-to graph, where the first load node is used to detect whether or not the object for which it is desired to detect an access position escapes in the updated first point-to graph; and a step of, on condition that the object for which it is desired to detect an access position does not escape to the first caller method or the first callee method, detecting a position to access the object for which it is desired to detect an access position, by following the updated first point-to graph if the first load node is prepared at the step (b) and by following the first point-to graph created at the step (a) if the first load node is not prepared at the step (b).

In one aspect of the present invention, the creating step can include:

(c) a step of, on condition that the object for which it is desired to detect an access position escapes to the first caller method or the first callee method, creating a second flow-insensitive point-to graph for the first caller method or the first callee method, and merging the second point-to graph into the updated first point-to graph if the first load node is prepared at the step (b) or into the first point-to graph created at the step (a) if the first load node is not prepared at the step (b);

(d) a step of detecting whether or not the object for which it is desired to detect an access position escapes to a method which has not been analyzed yet among caller methods of a method analyzed in the past steps (hereinafter referred to as a second caller method) or a method which has not been analyzed yet among methods called by the method analyzed in the past steps (hereinafter referred to as a second callee method), using the merged first point-to graph, the detecting step including preparing a second load node in the merged first point-to graph and updating the merged first point-to graph on condition that a field of at least one object in the merged first point-to graph is (1) reachable from the second caller method or the second callee method and (2) in a state of not pointing to an object in the merged first point-to graph, where the second load node is used to detect whether or not the object for which it is desired to detect an access position escapes in the updated, merged first point-to graph; and (e) a step of repeating the steps (c) and (d) until the object for which it is desired to detect an access position stops escaping or until analyzed methods other than the first method reach a predetermined threshold. Furthermore, in the one aspect of the present invention, the method can include a step of detecting a position to access the object for which it is desired to detect an access position, by following a point-to graph obtained in the end at the step (e), instead of the detecting step.

In one aspect of the present invention, "the method analyzed in the past steps" at the step (d) is the first method, the first caller method or the first callee method. In one aspect of the present invention, especially, the second caller method or the second callee method is a caller method for the first caller method, a method called by the first caller method, another method called by the first method or a method called by the first callee method.

In one aspect of the present invention, in the detection of whether or not the object escapes, at the step (b), the object for which it is desired to detect an access position is considered not to escape on condition that (1) the object for which it is desired to detect an access position is reachable from the first caller method or the first callee method via a private field, which is a variable, and (2) positions to access objects read out at all positions to read the private field have been analyzed. Furthermore, in one aspect of the present invention, in the detection of whether or not the object escapes, at the step (d), the object for which it is desired to detect an access position is considered not to escape on condition that (1) the object for which it is desired to detect an access position is reachable from the second caller method or the second callee method via a private field, which is a variable, and (2) positions to access objects read out at all positions to read the private field have been analyzed.

In one aspect of the present invention, the step (b) can further include integrating objects which can be commonly pointed to by at least one variable and the prepared first load node. In one aspect of the present invention, the step (d) can further include integrating objects which can be commonly pointed to by at least one variable and the prepared second load node.

In one aspect of the present invention, at the step (a), only a program that is executed a predetermined number of times or more can be targeted by analysis. In one aspect of the present invention, at the step (c), only a program that is executed a predetermined number of times or more can be targeted by analysis.

The pointer analysis method for the present invention is as follows. One aspect of the method includes:

a step of creating one flow-insensitive point-to graph for the program in memory by a compiler, with a compiling target method as a target, the point-to graph being a graph with variables, or variables and at least one of methods and objects as nodes and with relationships between the variables and objects pointed to by the variables as edges, and the creating step including the steps of:

(a) a step of, on condition that an object for which it is desired to detect an access position is identified, creating a first flow-insensitive point-to graph for a method generating the identified object (a first method);

(b) a step of detecting whether or not the object for which it is desired to detect an access position escapes to at least one method which is a caller of the first method (a first caller method) or at least one method which is called by the first method (a first callee method), using the created first point-to graph, the detecting step including preparing a first load node in the first point-to graph and updating the first point-to graph on condition that a field of at least one object in the first point-to graph is (1) reachable from the first caller method or the first callee method and (2) in a state of not pointing to an object in the first point-to graph, where the first load node is used to detect whether or not the object for which it is desired to detect an access position escapes in the updated first point-to graph;

(c) a step of, on condition that the object for which it is desired to detect an access position escapes to the first caller method or the first callee method, creating a second flow-insensitive point-to graph for the first caller method or the first callee method, and merging the second point-to graph into the updated first point-to graph if the first load node is prepared at the step (b) or into the first point-to graph created at the step (a) if the first load node is not prepared at the step (b);

(d) a step of, detecting whether or not the object for which it is desired to detect an access position escapes to a method which has not been analyzed yet among caller methods of a method analyzed in the past steps (a second caller method) or a method which has not been analyzed yet among methods called by the method analyzed in the past steps (a second callee method), using the merged first point-to graph, the detecting step including preparing a second load node in the merged first point-to graph and updating the merged first point-to graph on condition that a field of at least one object in the merged first point-to graph is (1) reachable from the second caller method or the second callee method and (2) in a state of not pointing to an object in the merged first point-to graph, where the second load node is used to detect whether or not the object for which it is desired to detect an access position escapes in the updated, merged first point-to graph; and (e) a step of repeating the steps (c) and (d) until the object for which it is desired to detect an access position stops escaping or until analyzed methods other than the first method reach a predetermined threshold; and a step of detecting a position to access the object for which it is desired to detect an access position, by following a point-to graph obtained in the end at the step (e).

The present invention also provides a computer program causing a computer to execute each step of the pointer analysis methods.

The pointer analysis computer of the present invention is as follows. The computer is provided with:

a graph creating section creating one flow-insensitive point-to graph for the program in memory by a compiler, with a compiling target method as a target, the point-to graph being a graph with variables, or variables and at least one of methods and objects as nodes and with relationships between the variables and objects pointed to by the variables as edges, and the graph creating section executing:

(a) on condition that an object for which it is desired to detect an access position is identified, creating a first flow-insensitive point-to graph for a method generating the identified object (a first method); and (b) detecting whether or not the object for which it is desired to detect an access position escapes to at least one method which is a caller of the first method (a first caller method) or at least one method which is called by the first method (a first callee method), using the created first point-to graph, the detecting including preparing a first load node in the first point-to graph and updating the first point-to graph on condition that a field of at least one object in the first point-to graph is (1) reachable from the first caller method or the first callee method and (2) in a state of not pointing to an object in the first point-to graph, where the first load node is used to detect whether or not the object for which it is desired to detect an access position escapes in the updated first point-to graph; and a detection section detecting, on condition that the object for which it is desired to detect an access position does not escape to the first caller method or the first callee method, a position to access the object for which it is desired to detect an access position, by following the updated first point-to graph if the first load node is prepared and by following the first point-to graph if the first load node is not prepared.

Furthermore, in the one aspect of the present invention, the creation section can further execute:

(c) on condition that the object for which it is desired to detect an access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared;

(d) detecting whether or not the object for which it is desired to detect an access position escapes to a method which has not been analyzed yet among caller methods of a method analyzed in the past steps (a second caller method) or a method which has not been analyzed yet among methods called by the method analyzed in the past steps (a second callee method), using the merged first point-to graph, the detecting including preparing a second load node in the merged first point-to graph and updating the merged first point-to graph on condition that a field of at least one object in the merged first point-to graph is (1) reachable from the second caller method or the second callee method and (2) in a state of not pointing to an object in the merged first point-to graph, where the second load node is used to detect whether or not the object for which it is desired to detect an access position escapes in the updated, merged first point-to graph; and (e) repeating (c) and (d) described above until the object for which it is desired to detect an access position stops escaping or until analyzed methods other than the first method reach a predetermined threshold. Furthermore, the detection section can execute detecting a position to access the object for which it is desired to detect an access position, by following a point-to graph obtained in the end at the step (e).

Furthermore, in the one aspect of the present invention, the computer described above further includes an optimization section optimizing a code using an access position detected by the detection section.

According to an aspect of the present invention, a load node for showing an object to be loaded from a pointer field of an escape object is prepared in a point-to graph obtained in accordance with the flow-insensitive technique only when a field of at least one object in the point-to graph is under a predetermined condition. Therefore, load node generation can be suppressed. Thus, it is possible to reduce the time and memory required for analysis.

Embodiments of the present invention will be described below with reference to drawings. Through the figures shown below, the same reference numerals denote the same objects unless especially otherwise specified. The embodiments of the present invention is intended to describe preferred aspects of the present invention, and it should be understood that it is not intended to limit the scope of the present invention to what is shown here.

The following techniques (items 1 to 8) will be described below to facilitate understanding of the basic technique of the present invention, and after that, the aspects of the present invention will be described.

1. Pointer analysis (FIG. 1).
2. Point-to graph (FIGS. 2A and 2B).
3. Flow-sensitive technique (FIG. 3).
4. Flow-insensitive technique (FIG. 4).
5. Inclusion-based technique, one of flow-insensitive techniques (FIGS. 5A and 5B, and FIG. 7A).
6. Unification-based technique, one of flow-insensitive techniques (FIGS. 6A and 6B, and FIG. 7B).
7. Whole-program technique (FIG. 8).
8. Incrementalized technique (FIGS. 9A to 9C, and FIGS. 10A and 10B).

FIG. 1 is a diagram for illustrating pointer analysis.

The pointer analysis is an analysis method by a compiler for checking which object is pointed to by a variable in a program before execution of the program.

A code (101) in FIG. 1 shows an example of the program. In an aspect of the present invention, the program includes an object-oriented language. Among object-oriented languages, there are included, for example, Java™, Java™ Script, C, C++, C#, Python, Ruby, Haskell, Go, Modula-3 and Script (PHP, Pyhton, Ruby or Perl).

An "object" is obtained by embodying an abstracted procedure target on a program, and it is an object generated from a place described in the program where an object is allocated. The "object" is allocated in memory, for example, in a heap area when the program is executed. The "object" is generated, for example, from a class. The "object" is allocated on a memory area. The "object" can exist in the heap area of the memory even if execution of the program is, for example, terminated or completed. The heap area is not the whole heap area used by the program but a part of the whole heap area, and it is an area to which an object is allocated. The heap area is, for example, a heap area targeted by GC.

The "object" typically includes a header and at least one field. The header is embedded in the object and holds information about the object itself, such as size and type of the object. The field is a part which can be accessed by a user of the object, and it has two kinds of data, for example, a pointer and a non-pointer. The pointer is a value referring to a certain place on the memory area. In a lot of language processing systems, a pointer to an object refers to the top address of the object. The non-pointer is something whose value itself is used in programming, and a numerical value, a character and/or true/false values are included.

In pointer analysis, data inputted to the analysis is a program or a part of the program. Data outputted from the analysis is correspondence relationship from a variable set V to an object set N. The output is often expressed by a point-to graph.

FIG. 1 shows that a point-to graph (103) is generated by performing pointer analysis (102) of a code (101).

A point-to graph is a graph with variables, or variables and at least one of methods and objects as nodes, and with objects pointed to by the variables as edges, more correctly, with relationships between the variables and objects pointed to by the variables as edges. That is, a point-to graph can include (1) only variables, (2) variables and methods, (3) variables and objects, or (4) variables, methods and objects, as nodes. As shown in FIG. 1, a point-to graph is expressed, for example, by variable nodes, method nodes, object nodes, point-to relationships and other relationships (see a legend (121)).

Variables in a point-to graph are local variables in a program (for example, 111, 112, 115 and 118), field variables of objects (for example, 114 and 117) or other special variables. A point-to graph has, for example, "arg" and "return" as the special variables (see FIGS. 9A to 9C described below). The point-to graph (103) shown in FIG. 1 has "x" (111), "y" (112), "a" (115) and "b" (118) as local variables in a program, and "data" (114) and "next" (117) as object field variables.

The object is as described above.

The point-to relationship is a relationship indicating which object the variable points to.

Other relationships are relationships indicating which field variable an object has, which object a method has as an argument (parameter), which variable a method has as a return value, which variable a method call has as an argument, and which object a method call has as a return value.

Figure 2A:
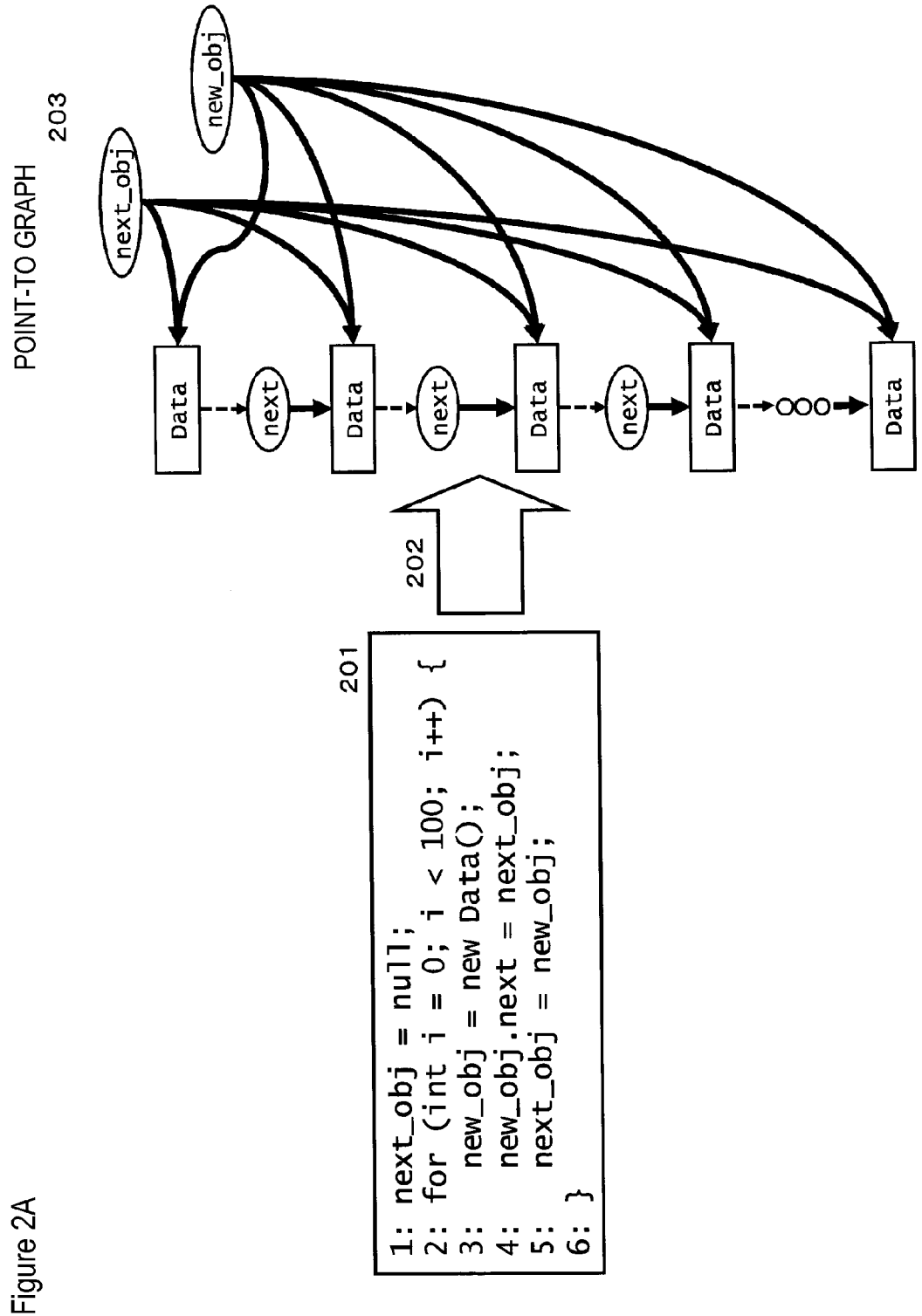
FIG. 2A shows an example of expressing objects by a point-to graph.

FIG. 2A shows an example of expressing objects in a point-to graph.

FIG. 2A shows a point-to graph (203) created when pointer analysis (202) of a program code (201) is performed. As shown in FIG. 2A, the point-to graph (203) expresses all point-to relationships and other relationships. Creating this expression is almost the same as actually executing the code (201) in the pointer analysis. In the pointer analysis by a compiler, the detailed information as expressed in the point-to graph (203) is not necessary. Therefore, creating the point-to graph (203) as shown in FIG. 2A is wasting the time and memory required for the analysis.

Figure 2B:
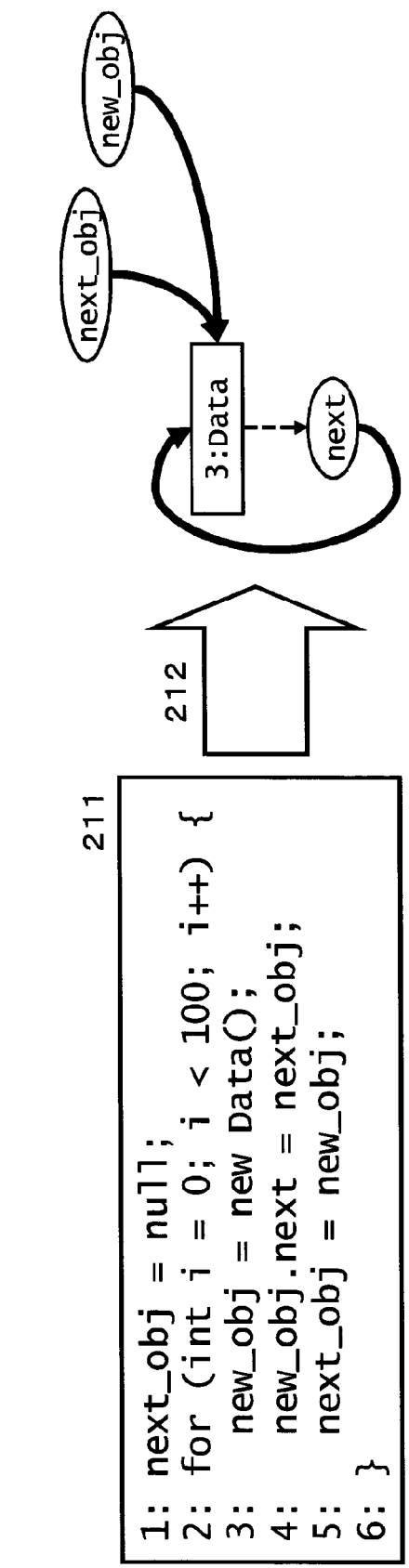
FIG. 2B shows an example of expressing an object by a point-to graph.

FIG. 2B shows an example of expressing an object in a point-to graph.

FIG. 2B shows a point-to graph (213) created when pointer analysis (212) of a program code (211) is performed. The point-to graph (213) shows that objects allocated at the same position can be expressed as being extracted as one. When pointer analysis (212) of the program code (211) is performed, all Data objects allocated by the instruction on the third line are treated as a whole, as expressed as "3: Data" in the point-to graph (213). In this expression method, the time and memory required for analysis is reduced though the accuracy of analysis deteriorates, in comparison with the expression method in FIG. 2A.

Figure 3:
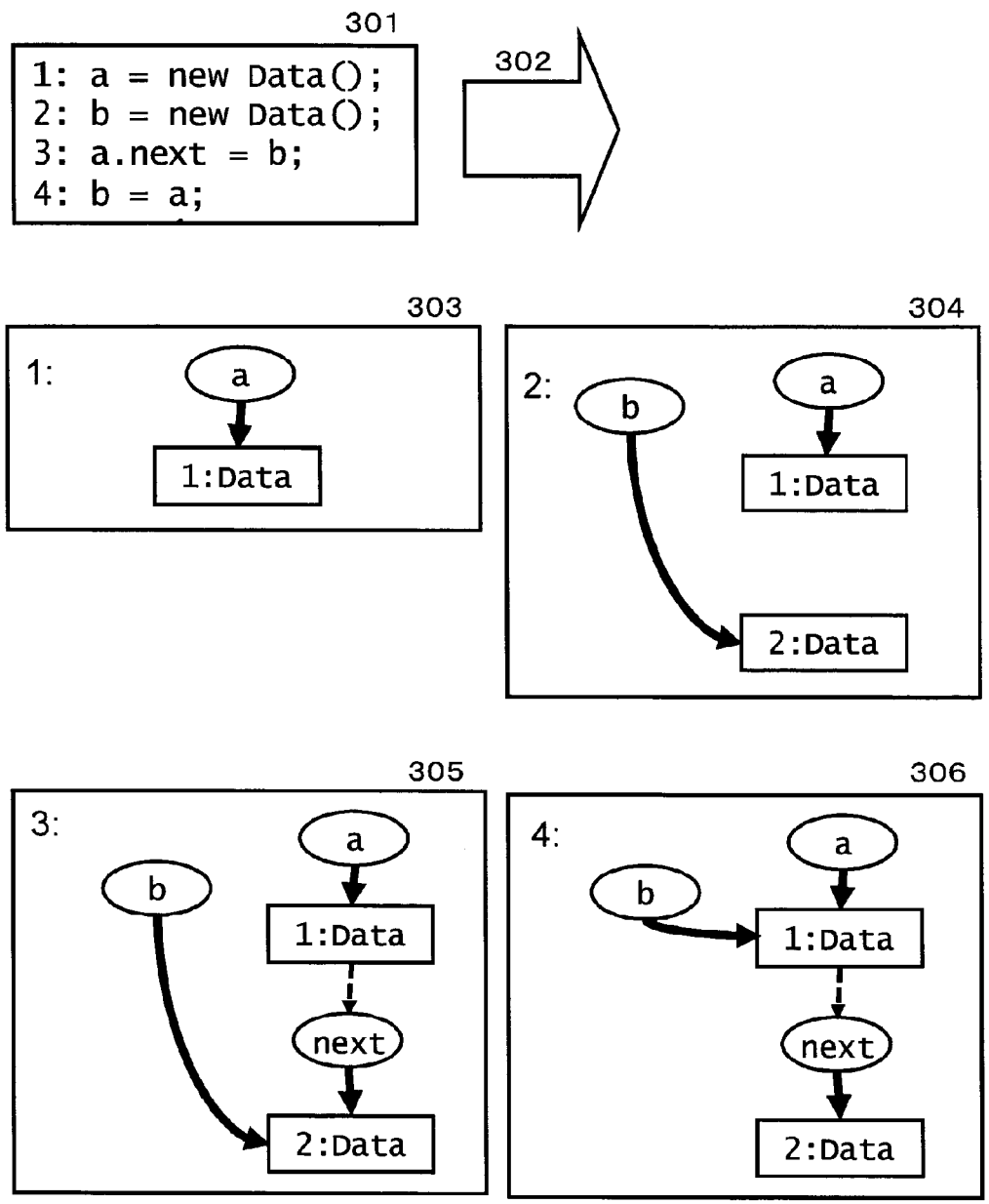
FIG. 3 shows an example of analyzing a program by a flow-sensitive technique (a technique considering a control flow) and expressing a result of the analysis by point-to graphs.

FIG. 3 shows an example of analyzing a program by a flow-sensitive technique and expressing a result of the analysis by point-to graphs.

The flow-sensitive analysis is a technique in which a separate point-to graph is created for each position of a program targeted by the analysis.

FIG. 3 shows four point-to graphs (303, 304, 305 and 306) created when pointer analysis (302) of a program code (301) is performed in accordance with a flow-sensitive technique. The point-to graph (303) is created by analyzing the instruction on the first line. The point-to graph (304) is created by analyzing the instruction on the second line. The point-to graph (305) is created by analyzing the instruction on the third line. The point-to graph (306) is created by analyzing the instruction on the fourth line. In the flow-sensitive, more time and memory are required for the analysis in comparison with the flow-insensitive analysis described below because the four graphs are created.

Figure 4:
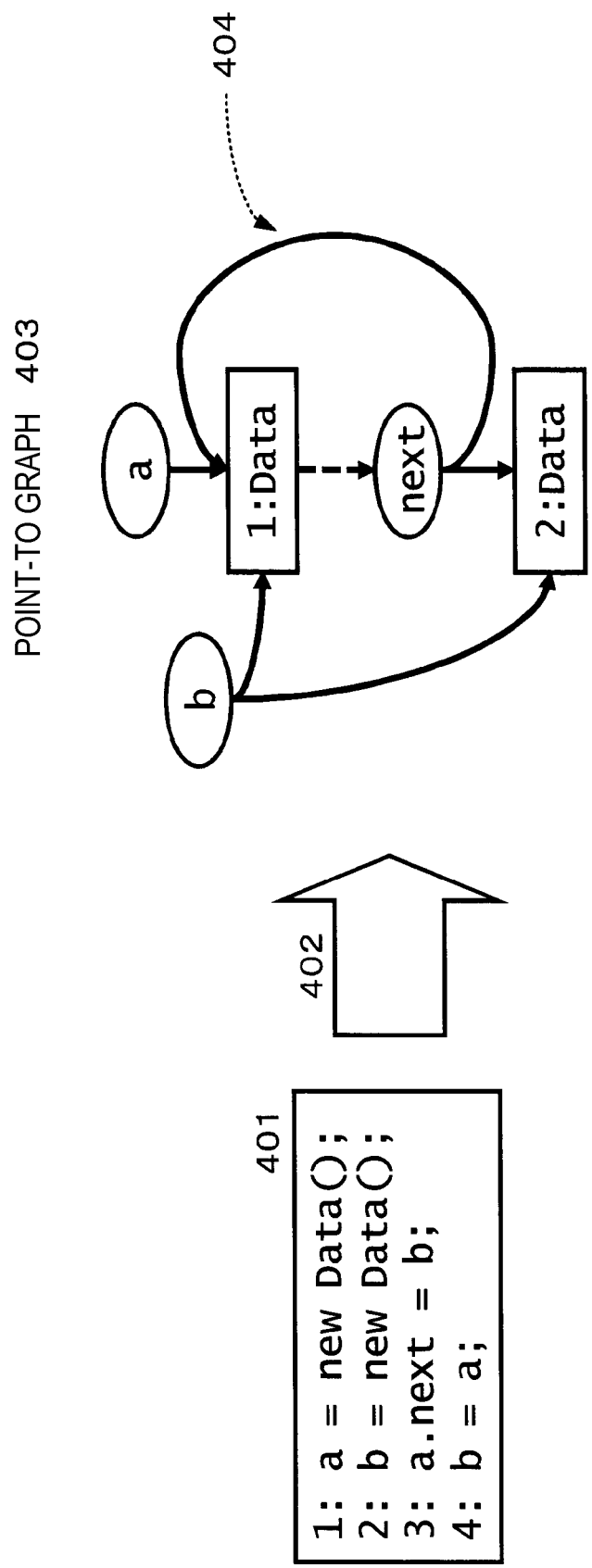
FIG. 4 shows an example of analyzing a program by a flow-insensitive technique (a technique ignoring a control flow) and expressing a result of the analysis by a point-to graph.

FIG. 4 shows an example of analyzing a program by a flow-insensitive technique and expressing a result of the analysis in a point-to graph.

The flow sensitive analysis is a technique in which one point-to graph is created for the whole program targeted by the analysis.

Figure 5A:
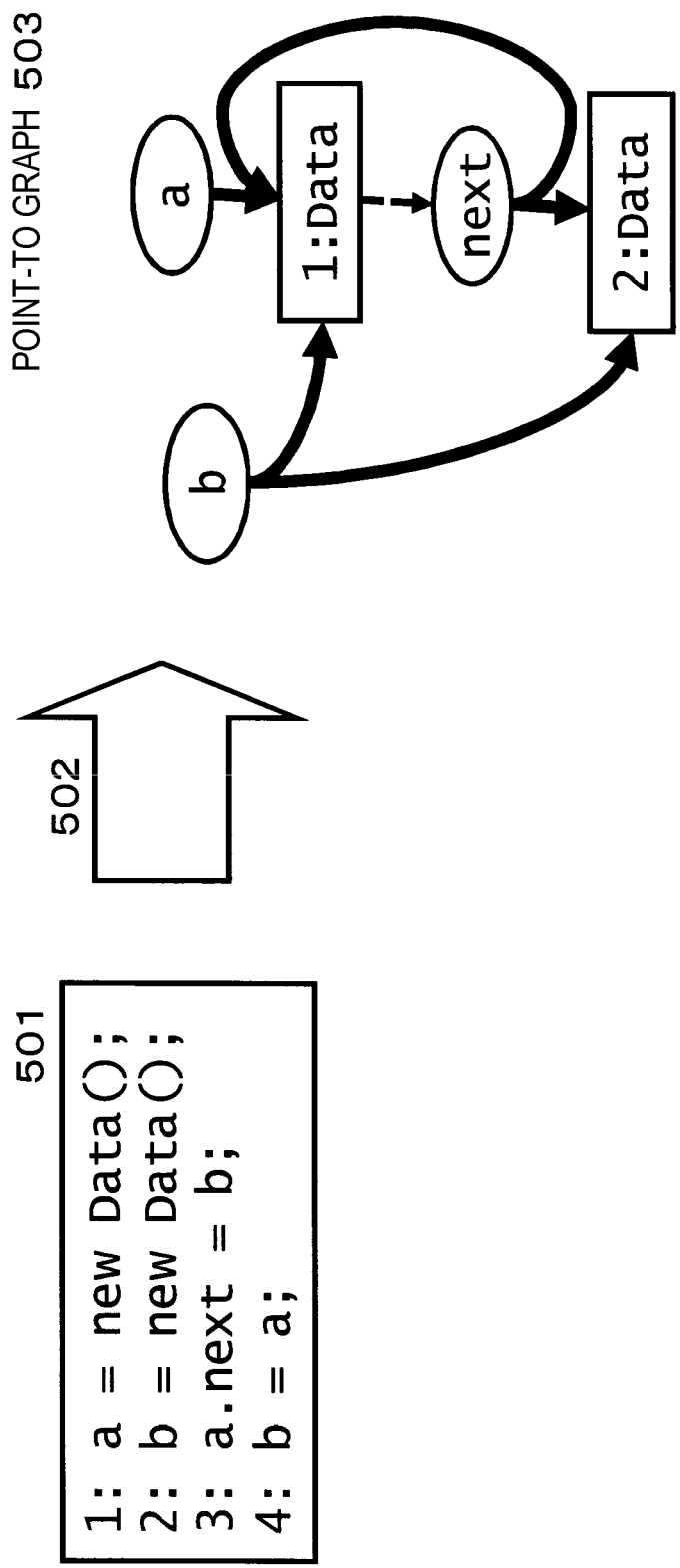
FIG. 5A shows an example of analyzing a program by an inclusion-based technique (a technique based on inclusion relationship), one of flow-insensitive techniques, and expressing a result of the analysis by a point-to graph.
Figure 5B:
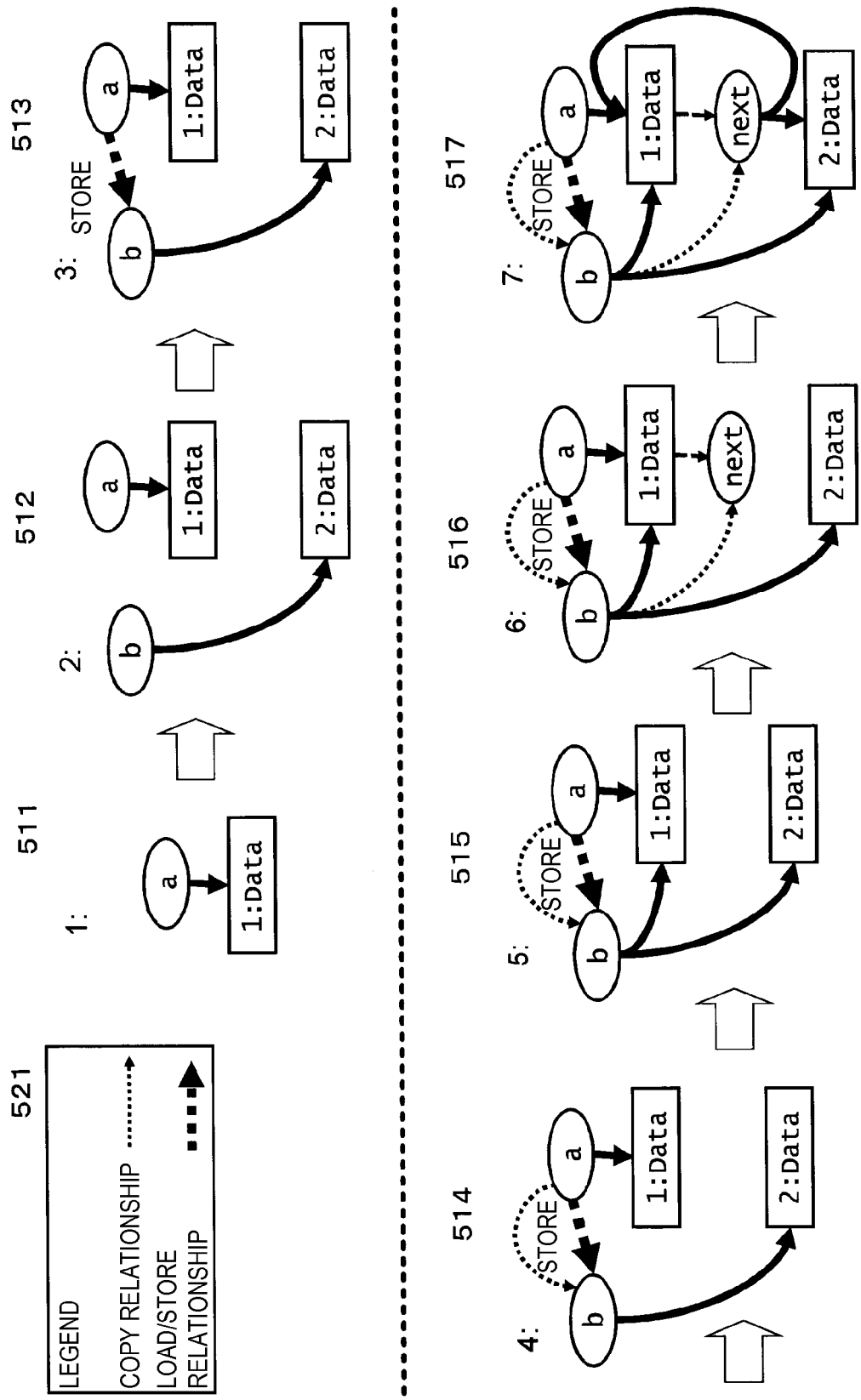
FIG. 5B is a diagram expressing the flow of analysis by the inclusion-based technique in FIG. 5A by point-to graphs.

FIG. 4 shows one point-to graph (403) created when pointer analysis (402) of a program code (401) is performed in accordance with a flow-insensitive technique. There are some kinds of flow-insensitive techniques, and the point-to graph (403) is an example thereof. This example shows a result of performing analysis by an inclusion-based technique to be described with reference to FIGS. 5A to 5B shown below. In the point-to graph (403) shown in this example, a "next" field of "1: Data" points to "1: Data" (404). It does not happen during actual execution of the code (401) that the "next" field of "1: Data" points to "1: Data". However, since the accuracy of analysis of this flow-insensitive technique is low, an analysis result as shown in the point-to graph (403) is obtained.

The flow-insensitive technique is classified into mainly the two: an inclusion-based technique and a unification-based technique. The inclusion-based technique will be described with reference to FIGS. 5A and 5B. The unification-based technique will be described with reference to FIGS. 6A and 6B.

FIG. 5A shows an example of analyzing a program by the inclusion-based technique, one of the flow-insensitive techniques, and expressing a result of the analysis in a point-to graph.

The inclusion-based technique is a method in which a graph indicating copying of pointers is created, and the pointer is propagated until point-to relationships converge on the graph. The analysis by the inclusion-based technique is characterized in that, though the analysis accuracy is high, much time and much memory are required for the analysis.

FIG. 5A shows a point-to graph (503) created when pointer analysis (502) of a program code (501) is performed in accordance with the inclusion-based technique.

FIG. 5B is a diagram expressing the flow of analysis by the inclusion-based technique in FIG. 5A by point-to graphs.

An algorithm for creating the point-to graph (503) in accordance with the inclusion-based technique mainly includes the following:

1: to read an instruction on each line of an analysis target program and create a graph indicating pointer copies; and 2: to propagate the pointer until a point-to relationship converges on the graph created at 1 above by repeatedly applying the following rules, and thereby create a point-to graph.

Rule 1: an object pointed to by a variable at the start of a copy relationship arrow is also pointed to by a variable at the end of the arrow (propagation); and Rule 2: a copy relationship is established between a field of an object pointed to by a variable at the start of a load/store relationship arrow and a variable at the end of the arrow.

The inclusion-based technique will be described below in accordance with the above algorithms 1 and 2.

In a legend (521), the copy relationship indicates that a pointer is copied from a variable at the start of an arrow to a variable at the end of the arrow. In the legend (521), the load/store relationship indicates a load or store relationship between a field of an object pointed to by a variable at the start of an arrow and a variable at the end of the arrow. The load/store relationship can be expressed in a point-to graph with a load or store destination as an edge. In the flow example in FIG. 5B, only store relationships are shown.

A graph (511) is a graph expressed as a result of analyzing the instruction on the first line of the program code (501).

A graph (512) is a graph expressed as a result of analyzing the instruction on the second line.

A graph (513) is a graph expressed as a result of analyzing that there is a store relationship from a variable "a" to a variable "b". In the graph (513), the store relationship is expressed as an edge from the variable "a" to the variable "b".

A graph (514) is a graph expressed as a result of analyzing that there is a copy relationship from the variable "a" to the variable "b".

A graph (515) is a graph expressed as a result of, because the variable "a" points to "1: Data" in the graph (514), causing the variable "b" which is in a copy relationship with the variable "a" and is at the end of the copy relationship arrow, to also point to "1: Data" (Rule 1).

A graph (516) is a graph expressed as a result of, because there is a store relationship from the variable "a" to the variable "b", establishing a copy relationship from the variable "b" to the "next" field of "1: Data" pointed to by the variable "a", in the graph (515) (Rule 2).

A graph (517) is a graph expressed as a result of, because the variable "b" points to "1: Data" and "2: Data" in the graph (516), causing the "next" field which is in a copy relationship with the variable "b" and at the end of the copy relationship arrow, to also point to "1: Data" and "2: Data" (Rule 1).

It is seen from the graph (517) that there is not any pointer to be propagated. Therefore, the graph (517) is the point-to graph created when the pointer analysis (502) of the program code (501) is performed in accordance with the inclusion-based technique. The point-to graph (517) is the same as the point-to graph (503) in FIG. 5A. This is because the copy relationships and load/store relationships in the point-to graph (517) are required only during pointer analysis and are not necessary for expressing a result of the pointer analysis.

FIG. 6A shows an example of analyzing a program by the unification-based technique, one of the flow-insensitive techniques, and expressing a result of the analysis in a point-to graph.

The unification-based technique is a technique in which all objects pointed to by a certain variable are integrated (unified). Though the analysis accuracy of analysis by the unification-based technique is low, the analysis ends almost in linear time because the analysis is performed merely by scanning an analysis target program once. Therefore, analysis by the unification-based technique is characterized in that the analysis time is short and the memory required is not much.

Figure 6B:
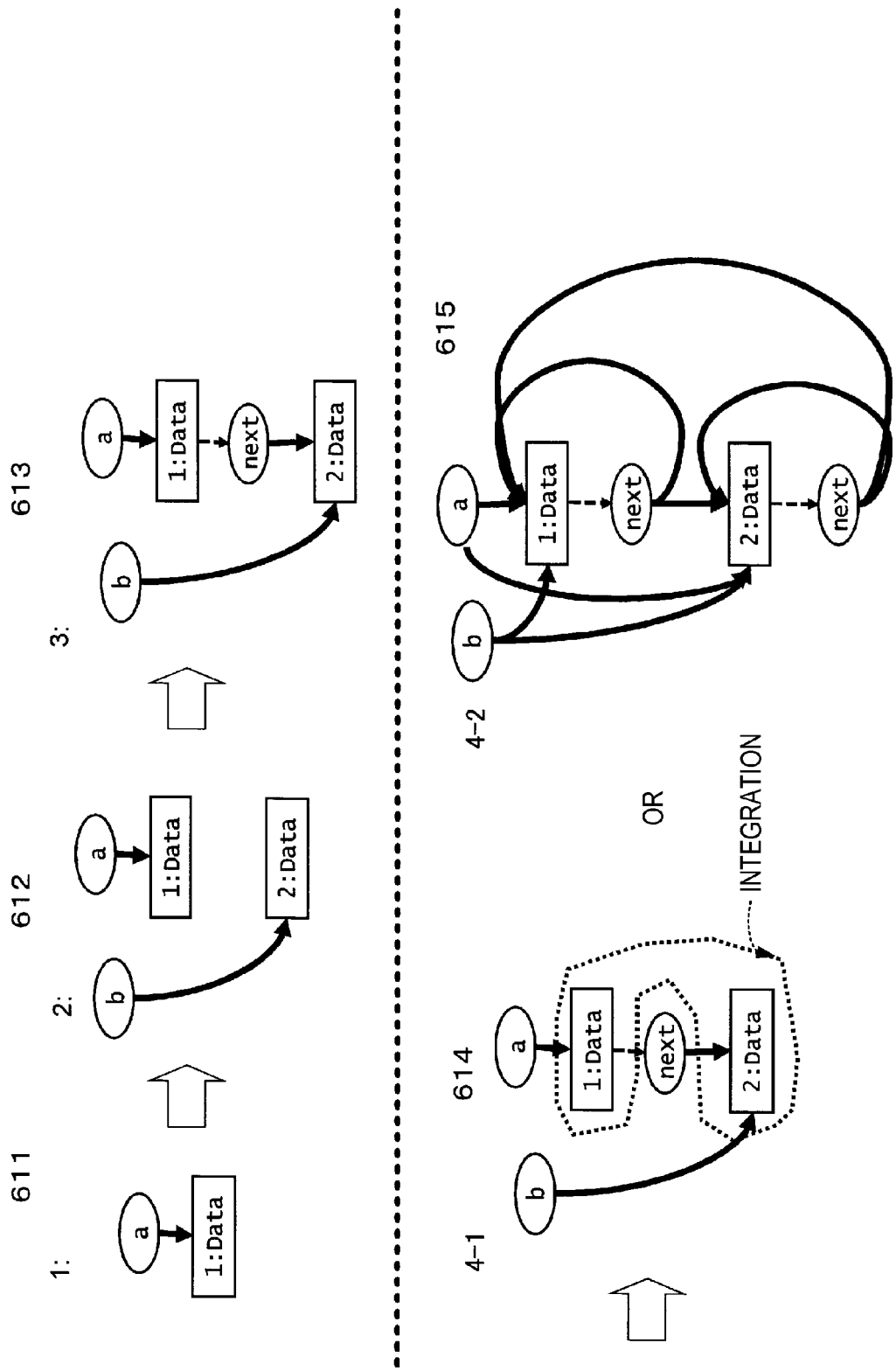
FIG. 6B is a diagram expressing the flow of analysis by the unification-based technique in FIG. 6A by point-to graphs.

FIG. 6A shows a point-to graph (603) created when pointer analysis (602) of a program code (601) is performed in accordance with the unification-based technique. In the point-to graph (603), a variable "a" points to "2: Data" (604). It does not happen during actual execution of the code (601) that the variable "a" points to "2: Data". However, since the accuracy of analysis by this unification-based technique is low, an analysis result as shown in the point-to graph (603) is obtained. In the point-to graph (603), a "next" field of "2: Data" points to "1: Data" and "2: Data" (605 and 606, respectively). It does not essentially happen that the "next" field of "2: Data" points to "1: Data" and "2: Data". However, since the accuracy of analysis by this unification-based technique is low, an analysis result as shown in the point-to graph (603) is obtained. As described above, analysis by the unification-based technique is further more inaccurate in comparison with the inclusion-based technique. However, the algorithm of analysis by the unification-based technique is fast. This is because, in the analysis by the unification-based technique, instructions on the lines of an analysis target program are read in, and all objects pointed to by variables are integrated (see 603, and 614 and 615 in FIG. 6B).

FIG. 6B is a diagram expressing the flow of analysis by the unification-based technique in FIG. 6A by point-to graphs.

The unification-based technique will be described below.

A graph (611) is a graph expressed as a result of analyzing the instruction on the first line of the program code (601).

A graph (612) is a graph expressed as a result of analyzing the instruction on the second line.

A graph (613) is a graph expressed as a result of analyzing the instruction on the third line.

A graph (614) is a graph expressed as a result of analyzing the instruction on the fourth line. Since the instruction on the fourth line is a copy sentence "b=a", there is a possibility that a variable "b" points to any of "1: Data" and "2: Data". Therefore, the graph (614) is expressed as a result of integrating "1: Data" and "2: Data" so that the variable "b" points to both of "1: Data" and "2: Data". Therefore, in the graph (614), "1: Data" and "2: Data" are completely identified with each other.

A graph (615) is a graph expressed as a result of analyzing the instruction on the fourth line and is completely the same graph as the graph (614) semantically. That is, difference between the graph (614) and the graph (615) is merely difference of notation for developers. The variables "a" and "b", and the "next" fields of "1: Data" and "2: Data" point to "1: Data" and "2: Data". Therefore, both of "1: Data" and "2: Data" are regarded as having two "next" fields, that is, the "next" fields of "1: Data" and "2: Data". As a result, the analysis by the unification-based technique is further more inaccurate in comparison with analysis by the inclusion-based technique though its speed is fast.

Figure 7A:
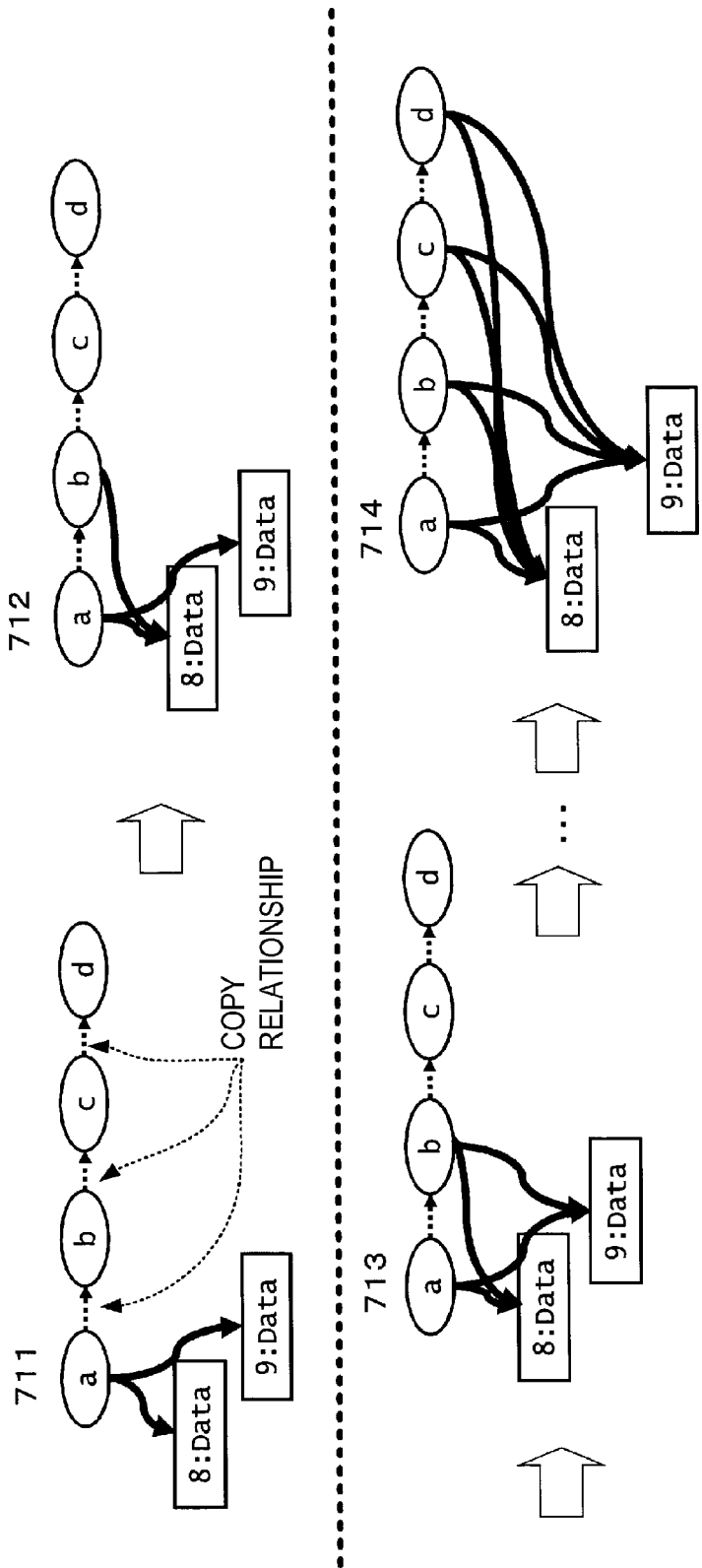
FIG. 7A is a diagram illustrating the reason why an analysis process by the inclusion-based technique is slow, using point-to graphs.

FIG. 7A is a diagram illustrating the reason why an analysis process by the inclusion-based technique is slow, using point-to graphs.

Graphs (711 to 714) are graphs generated at the time of performing pointer analysis of a program code (701) by the inclusion-based technique.

The graph (711) is a graph generated by reading in the instruction on the first to ninth lines in the code (701).

The graphs (712) and (713) show that pointers are propagated one by one according to copy relationships in the graph (711).

The graph (714) is a graph expressed as a result of propagating pointers one by one according to the copy relationships.

As described above, pointers are propagated one by one until point-to relationships converge on a graph, and therefore, the processing speed of the analysis is slow.

Figure 7B:
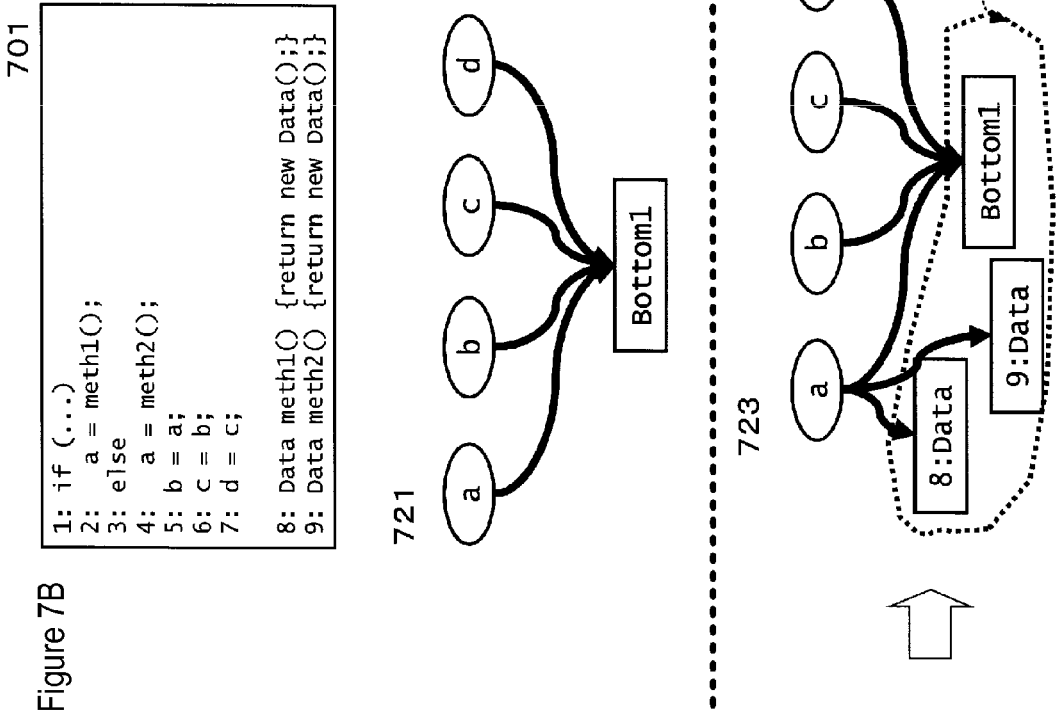
FIG. 7B is a diagram illustrating the reason why an analysis process by the unification-based technique is fast, using point-to graphs.

FIG. 7B is a diagram illustrating the reason why an analysis process by the unification-based technique is fast, using point-to graphs.

Graphs (721 to 723) are graphs generated at the time of performing pointer analysis of a program code (701) by the unification-based technique.

The graph (721) is a graph generated by reading in the instructions on the first to ninth lines in the code (701). A "Bottom1" node is a special node indicating that "it does not point to any object". Variables "a", "b", "c" and "d" do not point to any object at the time when the first to seventh lines in the code (701) have been scanned. However, it is known that the variables point to a common object. Therefore, the variables "a", "b", "c" and "d" are caused to point to one common "Bottom1" node.

The graph (722) is a graph generated by reading in the instruction on the eighth line. Since all objects ("8: Data" in this case) pointed to by a certain variable (the variable "a" in this case) are integrated, "8: Data" is integrated with "Bottom1" (this is shown by a dotted line in the figure). As a result, the variables "b", "c" and "d", which point to "Bottom1" among the integrated objects, also point to "8: Data" among the integrated objects.

The graph (723) is a graph generated by reading in the instruction on the ninth line. Since all objects ("9: Data" in this case) pointed to by a certain variable (the variable "a" in this case) are integrated, "9: Data" is integrated with "Bottom1" and "8: Data" which are integrated objects. As a result, the variables "b", "c" and "d", which point to "Bottom1" among the integrated objects, also point to "9: Data" among the integrated objects.

As described above, in the unification-based technique, high-speed analysis is realized by performing integration in constant time without propagating a pointer and not depending on the number of sentences in a program. That is, in the unification-based technique, high-speed analysis is realized because a union-find structured is used.

With reference to FIG. 8 and FIGS. 9A to 9C, beyond-method-boundary pointer analysis (inter-method pointer analysis) will be described.

In pointer analysis, it is often the case that an accurate pointer analysis result cannot be obtained unless analysis is performed beyond the boundary between methods (procedures). For example, it is assumed that it is desired to know where a Data object allocated by the second line ("2: Data") is accessed in a program code (801) in FIG. 8. That is, the Data object allocated by the second line is an object for which it is desired to detect an access position. However, it is not known where the Data object allocated by the second line ("2: Data") is accessed unless "method2" called by "method1" and a caller method for "method1" are checked. Therefore, it is necessary to perform beyond-method-boundary pointer analysis (inter-method pointer analysis).

The beyond-method-boundary pointer analysis is classified into mainly the following two: that is, analysis by a whole-program technique and analysis by an incrementalized technique.

The analysis by the whole-program technique is a technique in which all methods in an analysis target program are read into memory and analyzing them. The details thereof will be described with reference to FIG. 8.

The analysis by the incrementalized technique is a technique in which only such methods that are required to obtain desired information are gradually added in an analysis target program.

Figure 8:
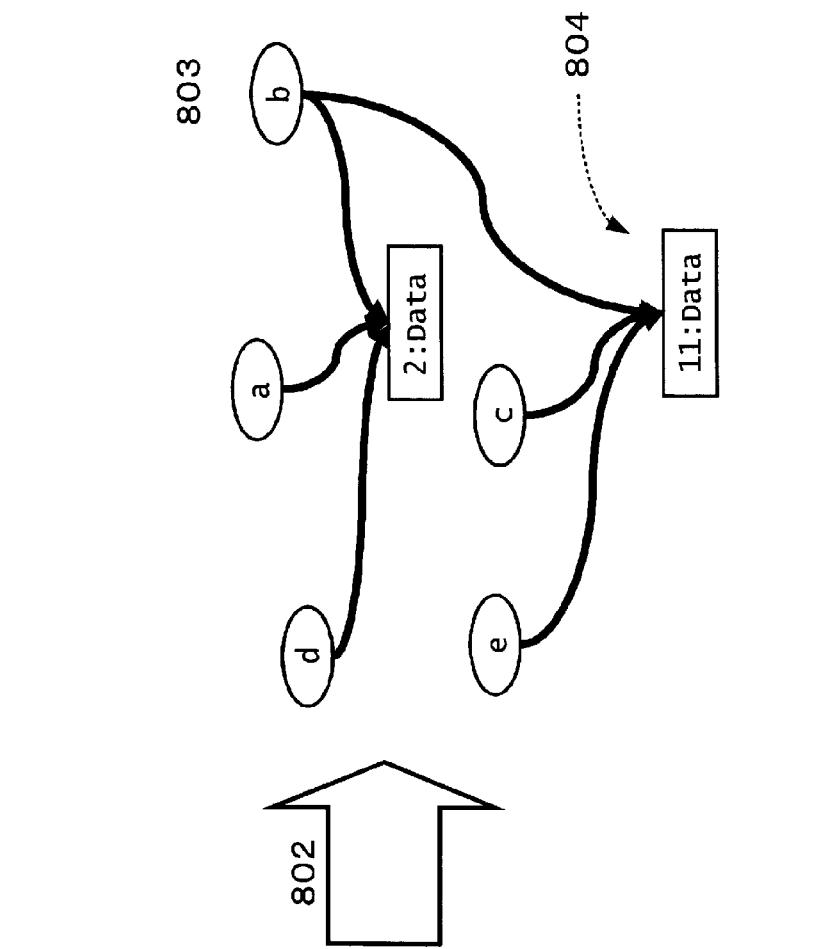
FIG. 8 is a diagram expressing a result of analysis by a whole-program technique (a technique targeting the whole program), one of beyond-method-boundary pointer analyses (inter-method pointer analyses), by a point-to graph.

FIG. 8 is a diagram expressing a result of analysis by the whole-program technique, one of the beyond-method-boundary pointer analyses (inter-method pointer analyses), in a point-to graph.

As stated before, it is assumed that it is desired to know where the Data object allocated by the second line ("2: Data") is accessed in the program code (801). Therefore, in the whole-program technique, a computer reads in all the four methods of "method1", "method2", "method3" and "main" in the code (801) into the memory, performs pointer analysis (802) and creates a point-to graph. The result is a point-to graph (803). In the analysis by the whole-program technique, nodes indicating methods are not shown because they are not necessary in the point-to graph.

In the point-to graph (803), a Data object allocated by the instruction on the eleventh line ("11: Data"), which is essentially unnecessary to know a position to access "2: Data", is also analyzed.

Figure 9A:
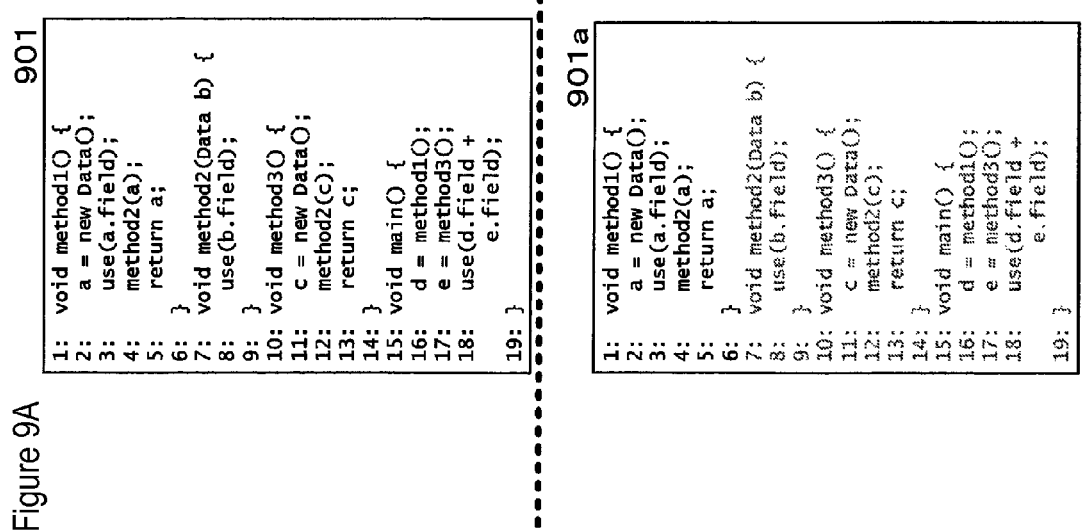
FIG. 9A is a diagram expressing a flow of analysis by an incrementalized technique (gradually-increased technique), one of the beyond-method-boundary pointer analyses (inter-method pointer analyses), by a point-to graph.
Figure 9B:
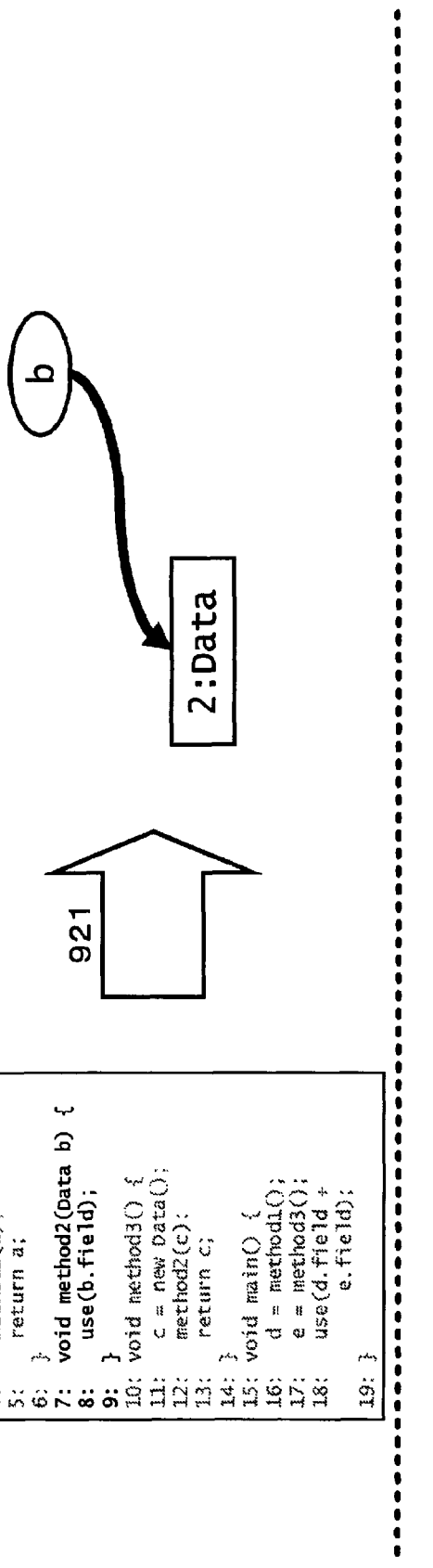
FIG. 9B is a diagram expressing a flow of analysis by the incrementalized technique, one of the beyond-method-boundary pointer analyses (inter-method pointer analyses), by point-to graphs.
Figure 9B:
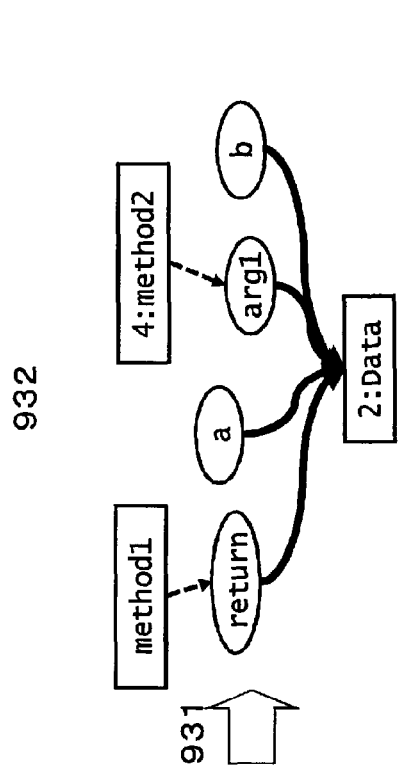
Figure 9B:
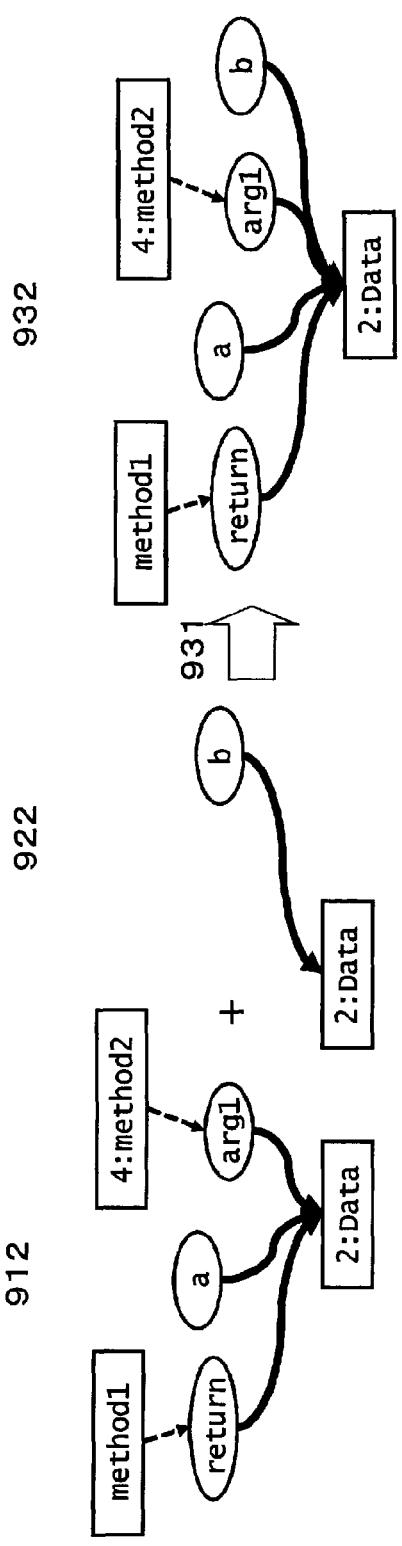
Figure 9C:
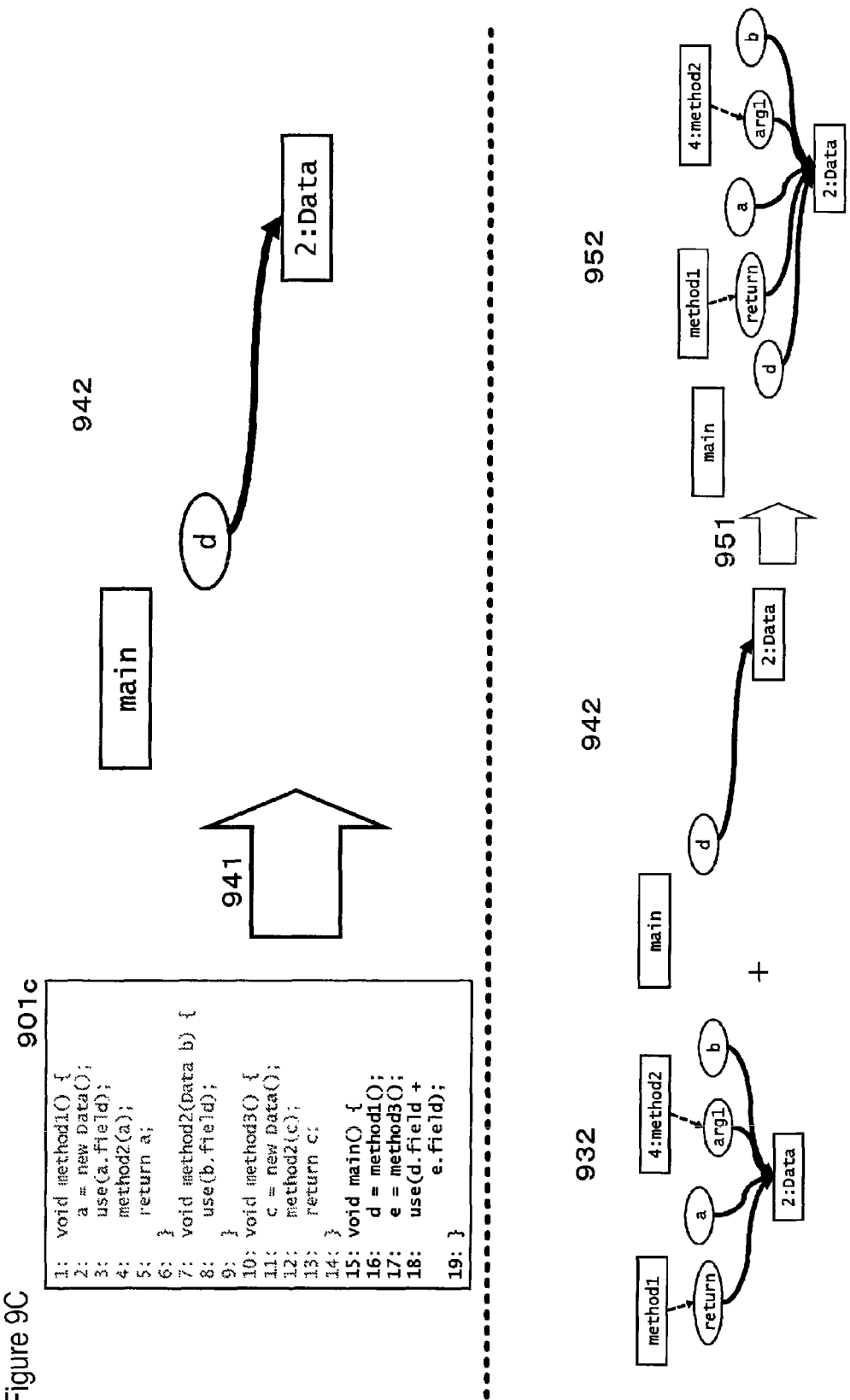
FIG. 9C is a diagram expressing a flow of analysis by the incrementalized technique, one of the beyond-method-boundary pointer analyses (inter-method pointer analyses), by point-to graphs.

FIGS. 9A, 9B and 9C are diagrams expressing a flow of analysis by the incrementalized technique, one of the beyond-method-boundary pointer analyses (inter-method pointer analyses), in a point-to graph;

Program codes (901, 901a, 901b and 901c) are the same as the program code (801) in FIG. 8.

Referring to the upper part of FIG. 9A, similar to the case of the whole-program technique described with reference to FIG. 8, it is assumed that it is desired to know where a Data object allocated by the second line is accessed ("2: Data") in the program code (901).

Referring to the lower part of FIG. 9A, for that purpose, in the incrementalized technique, the computer reads in "method1" including the instruction on the second line in the code (901a) into the memory as the first analysis target, performs pointer analysis (911) and creates a partial point-to graph. The result is a point-to graph (912). In the point-to graph (912), a "return" node and an "arg1" node, which are special nodes, are prepared (913). The "return" node is a special node for a method return value, and the "arg1" node is a special node for a method call argument. In the point-to graph (912), "4: method2" means that it is a call on the fourth line in the code 901a. It is seen from the point-to graph (912) that "2: Data" is a "method2" call argument and is also a return value of "method1". That "2: Data" is a "method2" call argument is expressed as that "2: Data" "escapes" to "method 2". That "2: Data" is a return value of "method1" is expressed as that "2: Data" "escapes" to a caller of "method 1".

Referring to the upper part of FIG. 9B, when "2: Data" "escapes" to "method2", the computer reads in "method2" into the memory and generates a point-to graph. The result is a point-to graph (922).

Referring to the lower part of FIG. 9B, the computer merges the point-to graph (922) shown in the upper part of FIG. 9B into the point-to graph (912) shown in the lower part of FIG. 9A and updates the point-to graph (912) to generate a point-to graph (932). To read in a method other than "method1", which is the first analysis target, into the memory and analyze the method is referred to as sniffing.

Referring to the upper part of FIG. 9C, when "2: Data" "escapes" to a caller of "method1", the computer reads in "main" into the memory and generates a point-to graph. The result is a point-to graph (942).

Referring to the lower part of FIG. 9C, the computer merges the point-to graph (942) shown in the upper part of FIG. 9C into the point-to graph (932) shown in the lower part of FIG. 9B and updates the point-to graph (932) to generate a point-to graph (952).

Because "2: Data" does not escape to a method other than "method2", "method1" and "main", the analysis ends. Since "2: Data" does not escape to "method3", it is not necessary to analyze "method3".

The whole-program technique, one of the beyond-method-boundary pointer analyses, has been described with reference to FIG. 8, and, the incrementalized technique, one of the beyond-method-boundary pointer analyses, has been described with reference to FIGS. 9A to 9B.

Since the analysis by the whole-program technique is a technique in which all methods in an analysis target program are read into memory and performing analysis, the analysis is disadvantageous in that much analysis time and much memory are required, in comparison with pointer analysis by the incrementalized technique. Furthermore, in the case of desiring to know where the Data object allocated by the second line is accessed, the pointer analysis of "method3" in the program code (801) in FIG. 8 is essentially unnecessary to know a position to access "2: Data".

However, the analysis by the whole-program technique is advantageous in the following case. It is assumed that it is further desired to know a position to access the Data object allocated by the eleventh line of the program code (801) in FIG. 8. That is, the Data object allocated by the eleventh line is an object for which it is desired to detect an access position. In this case, in the analysis by the whole-program technique, the point-to graph (803) created in FIG. 8 can be used as it is. On the other hand, in the analysis by the incrementalized technique, it is not possible to use the point-to graph (952) created in FIGS. 9A to 9C as it is, in the case of desiring to know a position to access the Data object allocated by the instruction on the eleventh line. Therefore, it is necessary to analyze "method2", "method1" and "main", and analysis of "method2" and "main" is troublesomely performed twice.

Figure 10A:
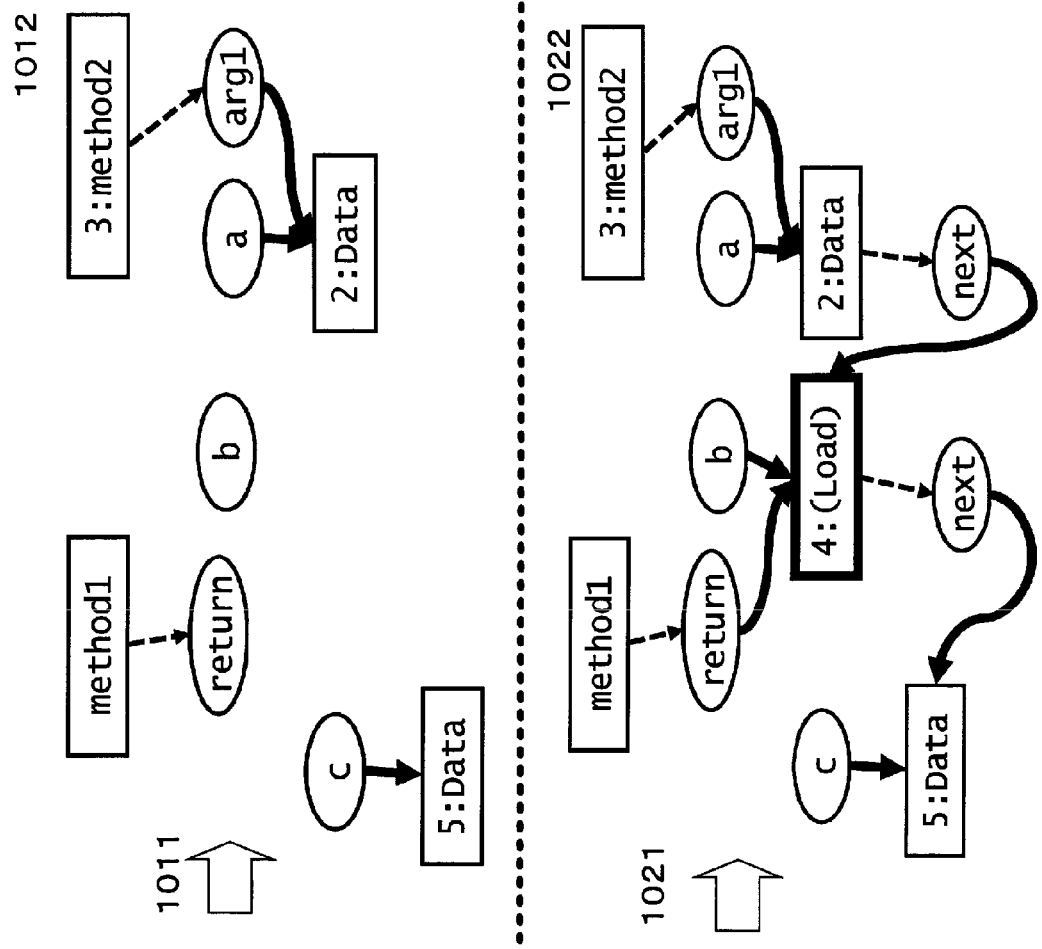
FIG. 10A is a diagram showing introduction of a "load" node in the incrementalized technique, by point-to graphs.
Figure 10B:
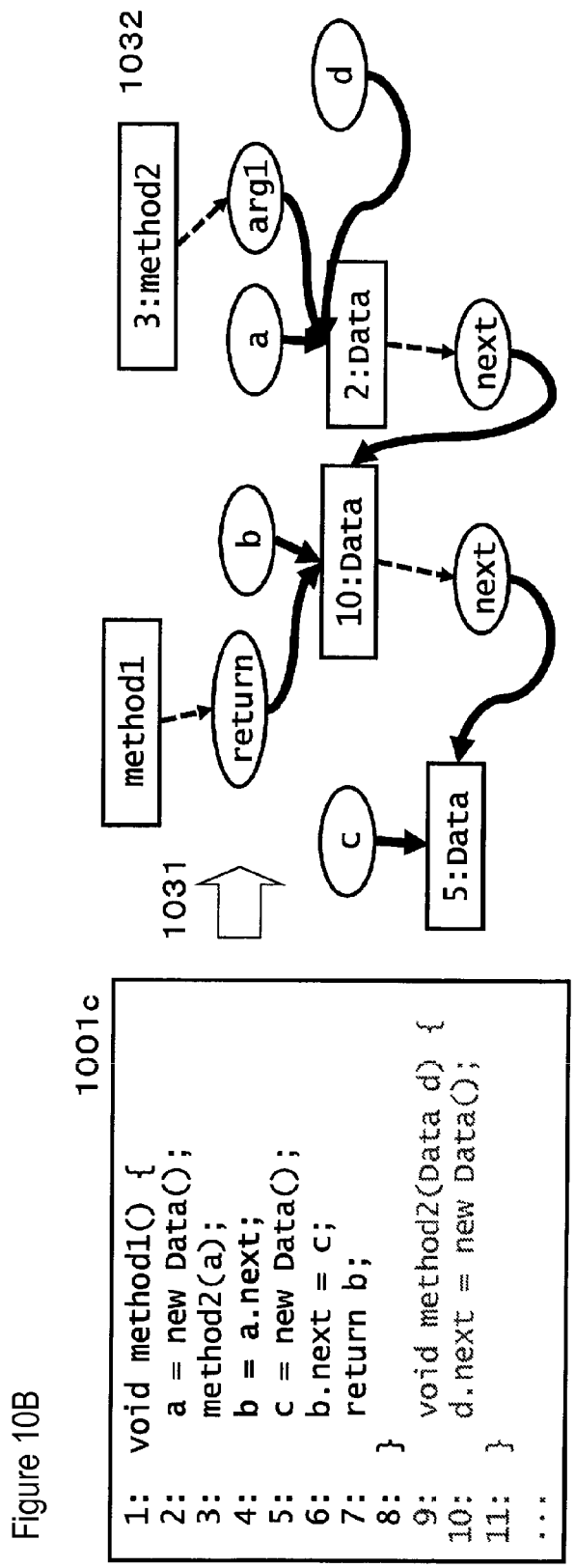
FIG. 10B is a diagram showing introduction of a "load" node in the incrementalized technique, by a point-to graph.

FIGS. 10A and 10B are diagrams showing introduction of a "Load" node in the incrementalized technique, in a point-to graph.

The analysis by the incrementalized technique is advantageous in that the analysis time and memory required is not so much, in comparison with the whole-program technique. Furthermore, it is possible to, in order to reduce the time and memory required for analysis, provide a predetermined upper limit and perform analysis as much as possible within the upper limit. The predetermined upper limit is, for example, an upper limit provided for the total number of lines of a method to be sniffed (hereinafter referred to as "sniff restriction"). This method for providing a predetermined limit is used, for example, in the case where the analysis time of a JIT compiler and the memory required are important.

Program codes (1001a, 1001b and 1001c) shown in FIGS. 10A and 10B are the same codes.

Referring to the upper part of FIG. 10A, it is assumed that it is desired to know where a Data object allocated by the fifth line ("5: Data") is accessed in the code (1001a). That is, the Data object allocated by the fifth line is an object for which it is desired to detect an access position.

During actual execution of the code (1001a), "5: Data" escapes to a caller of "method1" and "method2" via an object pointed to by a variable "b". However, when pointer analysis of the code (1001a) is performed (1011) to generate a point-to graph of "method1" as in the analysis by the incrementalized technique described with reference to FIGS. 9A to 9C, a point-to graph (1012) shown in the upper part of FIG. 10A is obtained. The point-to graph (1012) is a point-to graph at a stage where "method2" has not been sniffed yet though "method1" has been analyzed. In the point-to graph (1012), the variable "b" does not point to any object. Therefore, "5: Data" is regarded as not escaping anywhere.

Referring to the lower part of FIG. 10A, therefore, on the fourth line in the code (1001b), a "Load" node ("4: (Load)") is prepared as a node indicting an unknown object to be loaded from the "next" field of "2: Data" to the variable "b". The "Load" node (also referred to as a load node) is also referred to as a node serving as a role of a proxy (place-holder node). The "Load" node is a node indicating an unknown object loaded to a variable from a pointer field of an object which escapes. A point-to graph in which "4: (Load)" is prepared is a point-to graph (1022) shown in the lower part of FIG. 10A. The "Load" node is created in response to loading from a field of an object which escapes ("2: Data" here). However, creation of the Load node leads to increase in memory consumption.

Referring to FIG. 10B, it is possible to replace "4: (Load)" with "10: Data", which is a Data object allocated by the instruction on the tenth line in the code (1001c), when "method2" is sniffed subsequently. A point-to graph in which "4: (Load)" is replaced with "10: Data" is a point-to graph (1032) shown in FIG. 10B. It is not indispensable to replace "4: (Load)" with "10: Data". However, if "4: (Load)" can be replaced with "10: Data" when "4: (Load)" is such an unknown object that it is unknown where it was allocated, it is known that "5: Data" is pointed to by a Data object ("10: Data") allocated by the tenth line in the code (1001b). Therefore, from the obtained point-to graph (1032), more detailed point-to relationships can be seen in comparison with the point-to graph (1022). The point-to graph (1032) is a point-to graph at a stage where "method1" and "method2" have been analyzed.

Figure 11A:
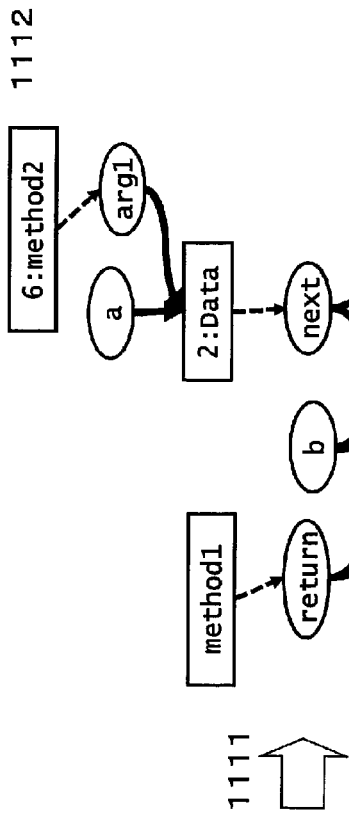
FIG. 11A is a diagram showing that a point-to graph is created by analysis by the incrementalized technique (upper part) or by analysis by a technique in which the unification-based technique, one of the flow-insensitive techniques, is further combined with the analysis by the incrementalized technique (lower part).
Figure 11A:
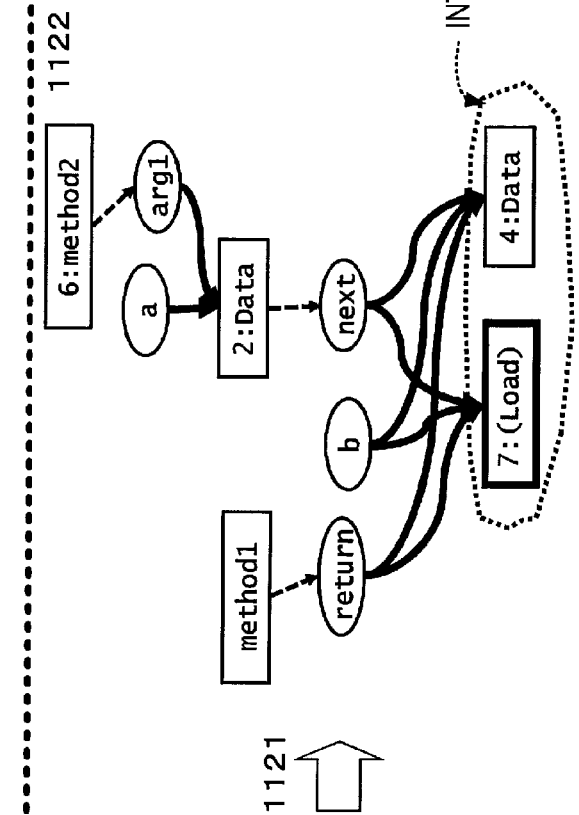

FIG. 11A is a diagram showing that a point-to graph is created by analysis by the incrementalized technique (upper part) or by analysis by a technique in which the unification-based technique, one of the flow-insensitive techniques, is further combined with the analysis by the incrementalized technique (lower part).

Referring to the upper part of FIG. 11A, it is assumed that it is desired to know where a Data object allocated by the fourth or second line of a program code (1101) is accessed. That is, the Data object allocated by the fourth or second line ("4: Data" or "2: Data") is an object for which it is desired to detect an access position.

By performing pointer analysis of the program code (1101) by analysis by the ordinary incrementalized technique shown in FIGS. 9A to 9C, FIG. 10A (lower part) and FIG. 10B (1111), a point-to graph (1112) shown in the upper part of FIG. 11A is obtained. The details of generation of the point-to graph (1112) is shown in FIG. 11C to 11D described below. The point-to graph (1112) is a point-to graph at a stage where "method2" has not been sniffed yet though "method1" has been analyzed. In the pointer analysis, since "2: Data" escapes to "method2", "7: (Load)" is generated in response to loading of the instruction on the seventh line of the program code (1101).

Referring to the lower part of FIG. 11A it is assumed that analysis by the unification-based technique is combined with the analysis by the incrementalized technique in the upper part of FIG. 11A and implemented.

As stated in the description about the point-to graph (1112) in the upper part of FIG. 11A, since "2: Data" escapes to "6: method2", "7: (Load)" is generated in response to loading of the instruction on the seventh line of the program code (1101). However, in analysis by the unification-based technique (1121), "7: (Load)" and "4: Data" are integrated. That is, in the analysis by the unification-based technique (1121), "7: (Load)" and "4: Data" are integrated and not distinguished from each other. A point-to graph generated as a result is a point-to graph (1122) shown in the lower part of FIG. 11A. The details of generation of the point-to graph (1122) is shown in FIG. 11E described below.

Figure 11B:
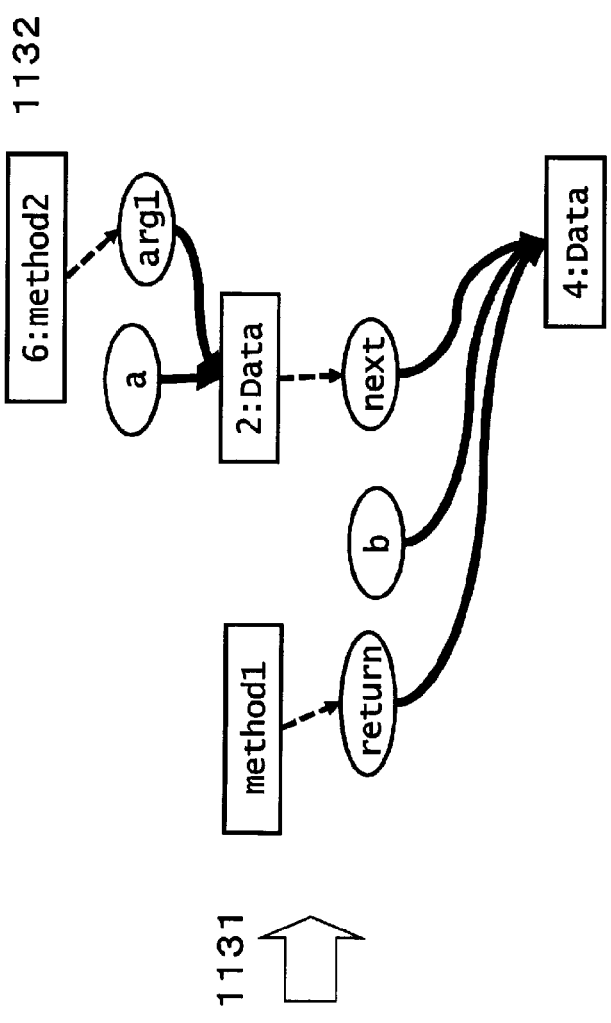
FIG. 11B is a diagram showing that a point-to graph is created by combination of analysis by the unification-based technique and analysis by the incrementalized technique and, further, by analysis by a technique for suppressing unnecessary load nodes (lower part) in accordance with an aspect of the present invention.
Figure 11C:
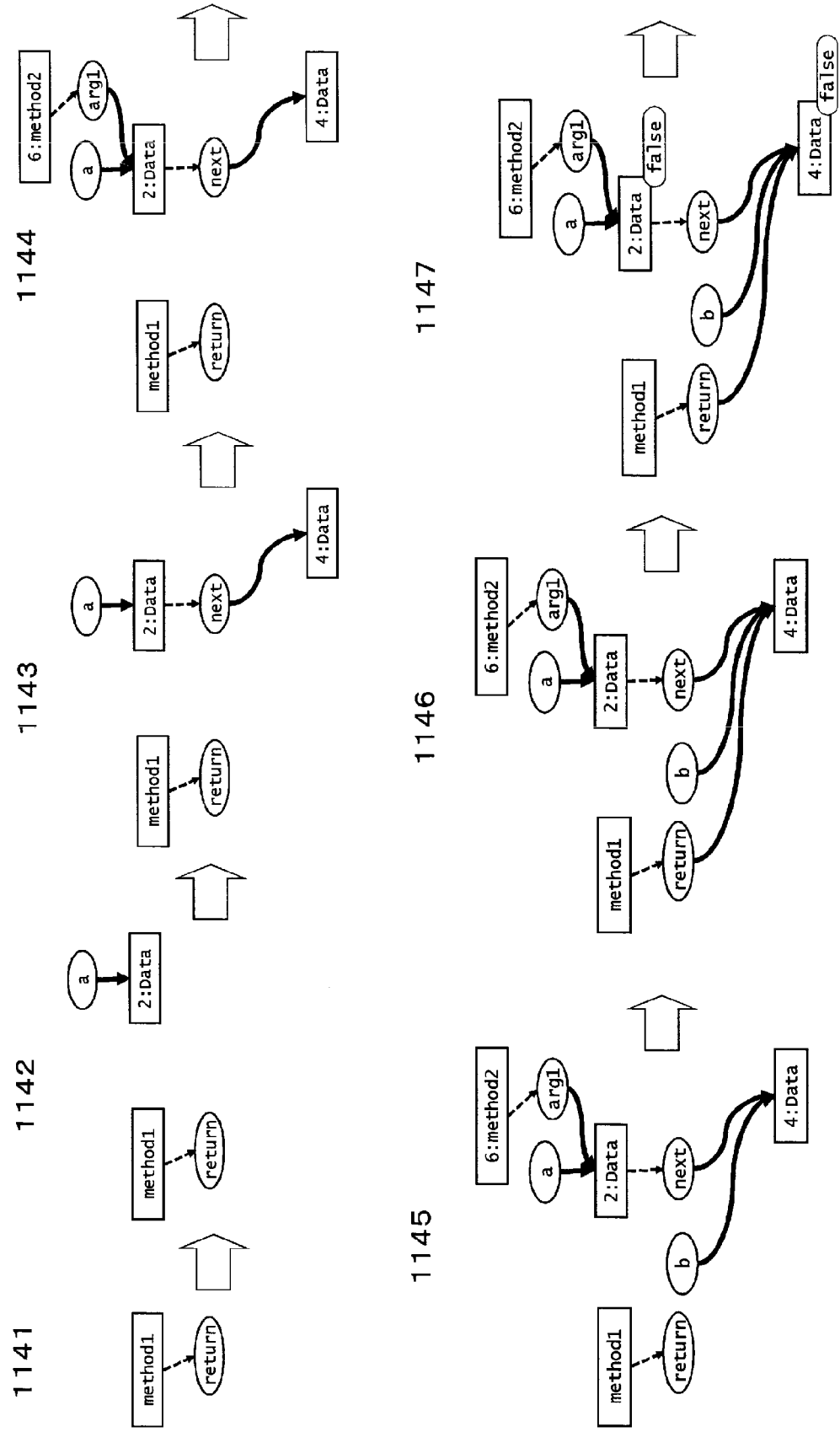
FIG. 11C is a diagram showing the details of generation of a point-to graph obtained by the pointer analysis shown in the upper part of FIG. 11A.
Figure 11D:
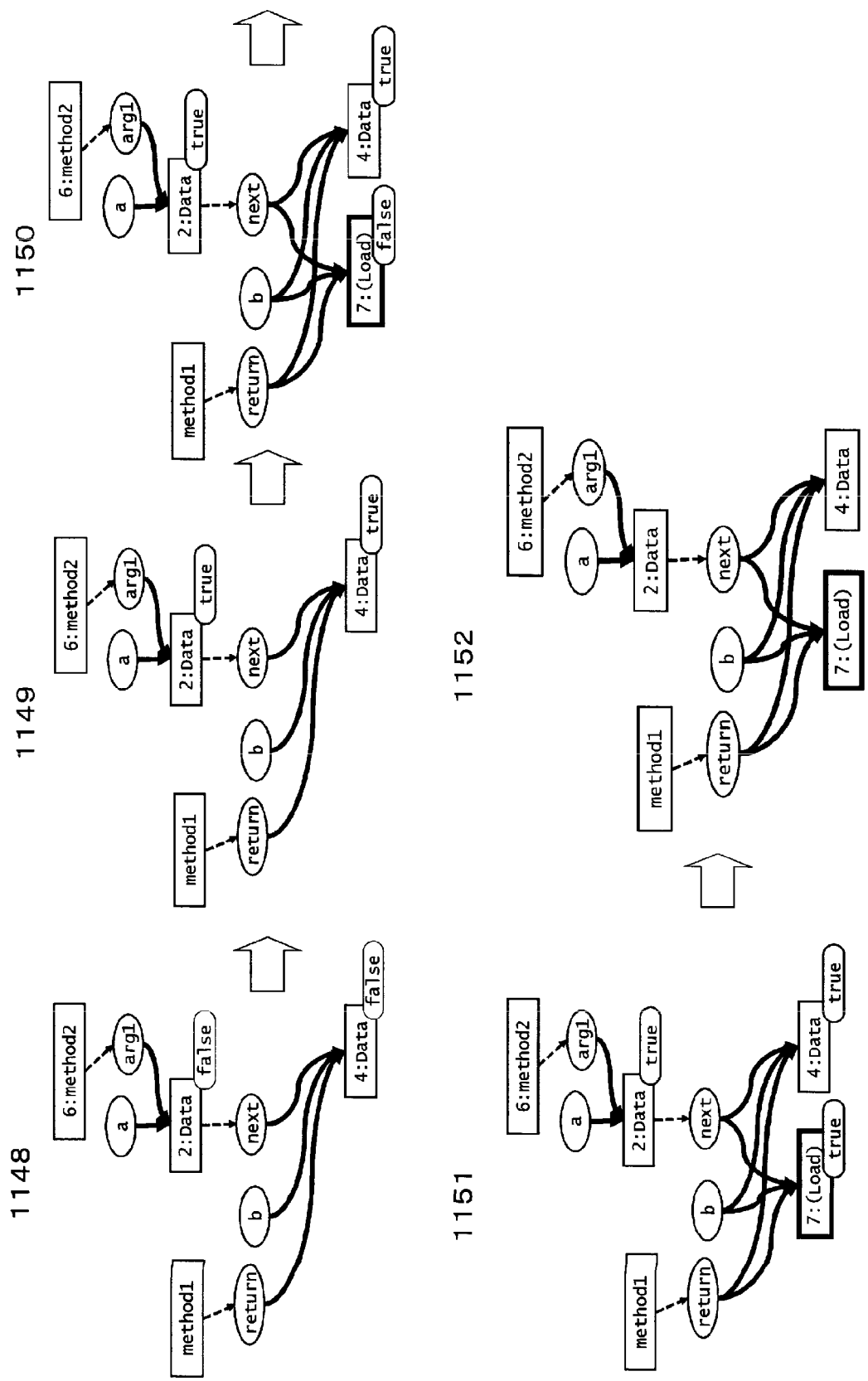
FIG. 11D is a diagram showing the details of generation of a point-to graph obtained by the pointer analysis shown in the upper part of FIG. 11A.
Figure 11E:
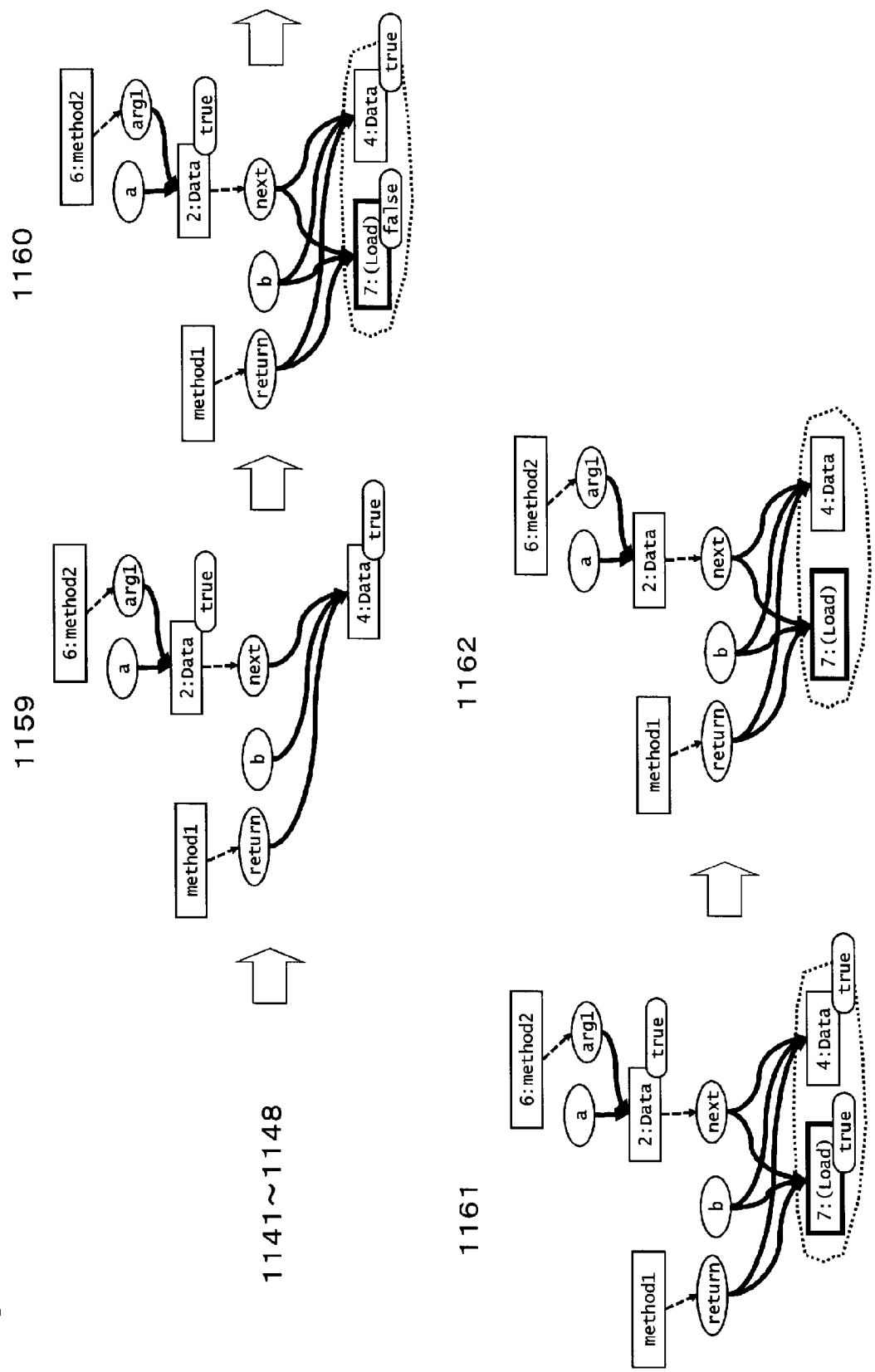
FIG. 11E is a diagram showing the details of generation of a point-to graph obtained by the pointer analysis shown in the lower part of FIG. 11A.

FIG. 11B is a diagram showing that a point-to graph is created by combination of analysis by the unification-based technique and analysis by the incrementalized technique and, further, by analysis by a technique for suppressing unnecessary load nodes in accordance with an aspect of the present invention.

In generation of the point-to graph (1122) in the lower part of FIG. 11A, a technique in which analysis by the unification-based technique is combined with analysis by the incrementalized technique is used. However, even if these pointer analyses are merely combined, the result is only creation of a lot of unnecessary "Load" nodes. According to the aspect of the present invention, a "Load" node is created only when a field is in a bottom state. The bottom state refers to a state in that the field of an object does not point to any object.

As shown in the point-to graph (1122) in the lower part of FIG. 11A, the "next" field of the "2: Data" object already points to the "4: Data" object. That is, the "next" field of the "2: Data" object is not in the bottom state. Therefore, essentially, it is not necessary to newly create a "Load" node. That is, to create both of "7: (Load)" and the "4: Data" is meaningless. Therefore, in a method in accordance with the aspect of the present invention, "7: (Load)" is prevented from being prepared (or created) (1131). A point-to graph created as a result is a point-to graph (1132) shown in FIG. 11B. The details of generation of the point-to graph (1132) are shown in FIG. 11G described below. Similarly to the point-to graph (1122), the point-to graph (1132) is a point-to graph at a stage where "method2" has not been sniffed yet though "method1" has been analyzed. In the point-to graph (1132), generation of "7: Load" is prevented unlike the point-to graph (1122). However, it should be avoided that the instruction on the seventh line of the program code (1101) is interpreted as meaning "no object is to be loaded". However, that is not a problem in the point-to graph (1132), because the "next" field of "2: Data" is not in the bottom state, and the instruction is interpreted as meaning "some object is to be loaded".

Generation of a load node leads to increase in memory consumption as described above. Because a load node is a place-holder node, the load node is not necessary when an escape object points to another object serving as a role of the place-holder node. According to the aspect of the present invention, restriction is made so that a Load node is prepared in a point-to graph on condition that a field of at least one object in a point-to graph (for example, "next" when a point-to graph (1193) in FIG. 11B is referred to) is (1) reachable from a method which has not been analyzed yet (for example, a caller method for "method1" though it is not shown in FIG. 11B) among caller methods of methods which have been analyzed in the past steps (for example, "method1" in FIG. 11B), or from a method which has not been analyzed yet (for example, "method2" in FIG. 11B) among methods called by the methods which have been analyzed by past steps (for example, "method1") and (2) in a state of not pointing to an object in the point-to graph. By imposing such a restriction, it is possible to suppress increase in memory consumption due to generation of a load node and decrease analysis time.

FIGS. 11C and 11D are diagrams showing the details of generation of the point-to graph (1112) obtained by the pointer analysis shown in the upper part of FIG. 11A. Graphs generated over time will be described below in order of generation. However, graphs shown in FIGS. 11C and 11D are not all the graphs generated over time.

A graph (1141) is a graph generated through a step of reading in the instruction on the first line in the code (1101) (corresponding to step 1702 in FIG. 17A described below).

A graph (1142) is a graph generated through a step of reading in the instruction on the second line (corresponding to step 1707 in FIG. 17B described below).

Figure 17B:
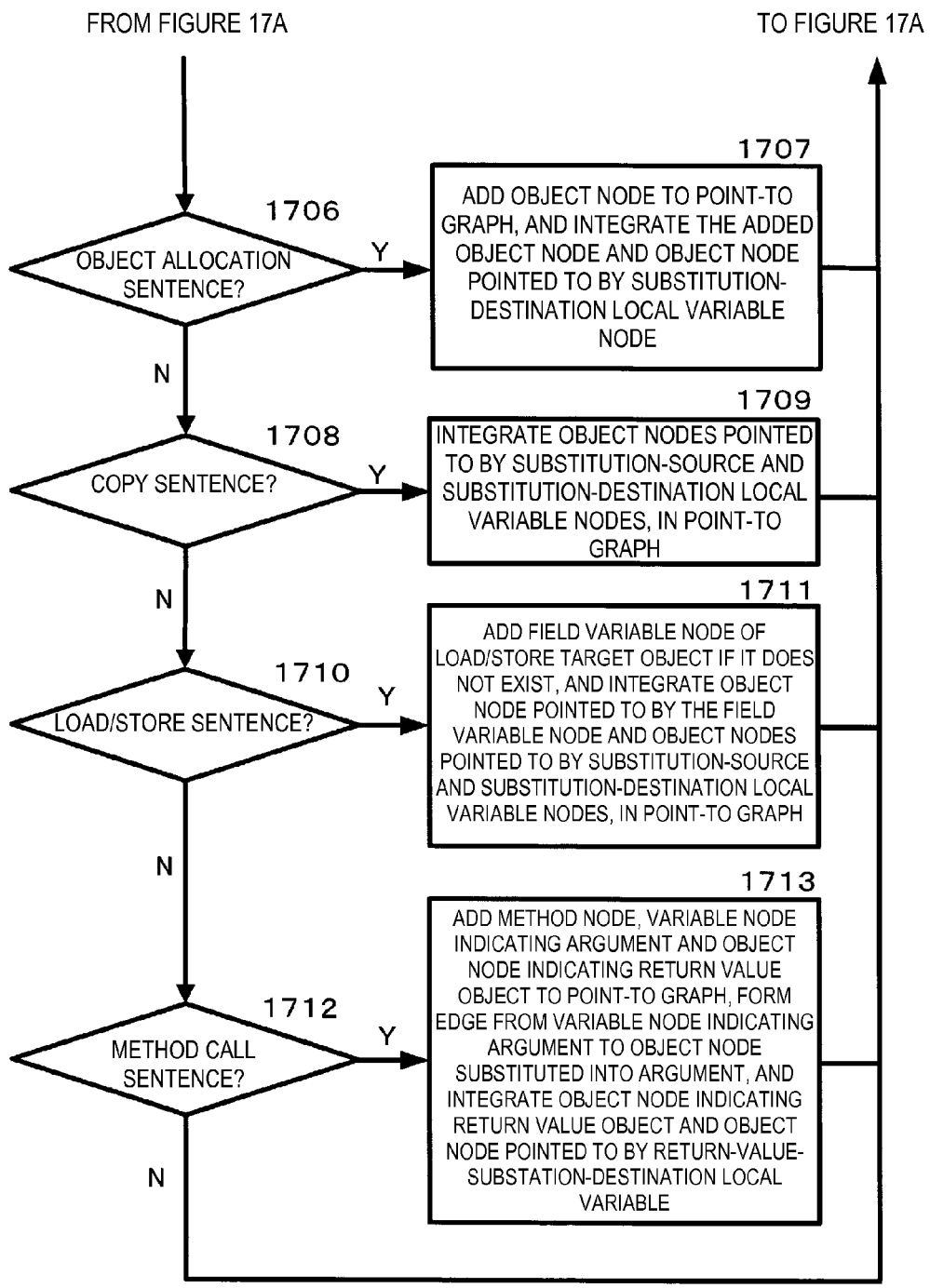
FIG. 17B is a detailed flowchart of steps (1603 and 1607) of creating a flow-insensitive point-to graph in the flowchart of FIG. 16.

A graph (1143) is a graph generated through a step of reading in the instructions on the third and fourth lines (corresponding to step 1707 in FIG. 17B).

A graph (1144) is a graph generated through a step of reading in the instructions on the fifth and sixth lines (corresponding to step 1713 in FIG. 17B).

A graph (1145) is a graph generated through a step of reading in the instruction on the seventh line (corresponding to step 1711 in FIG. 17B).

A graph (1146) is a graph generated through a step of reading in the instructions on the eighth and ninth lines (corresponding to step 1708 in FIG. 17B).

A graph (1147) is a graph generated through a step of initializing the escape attributes of all the objects nodes in the graph (1146) to "false" (corresponding to step 1802 in FIG. 18A described below).

Figure 18A:
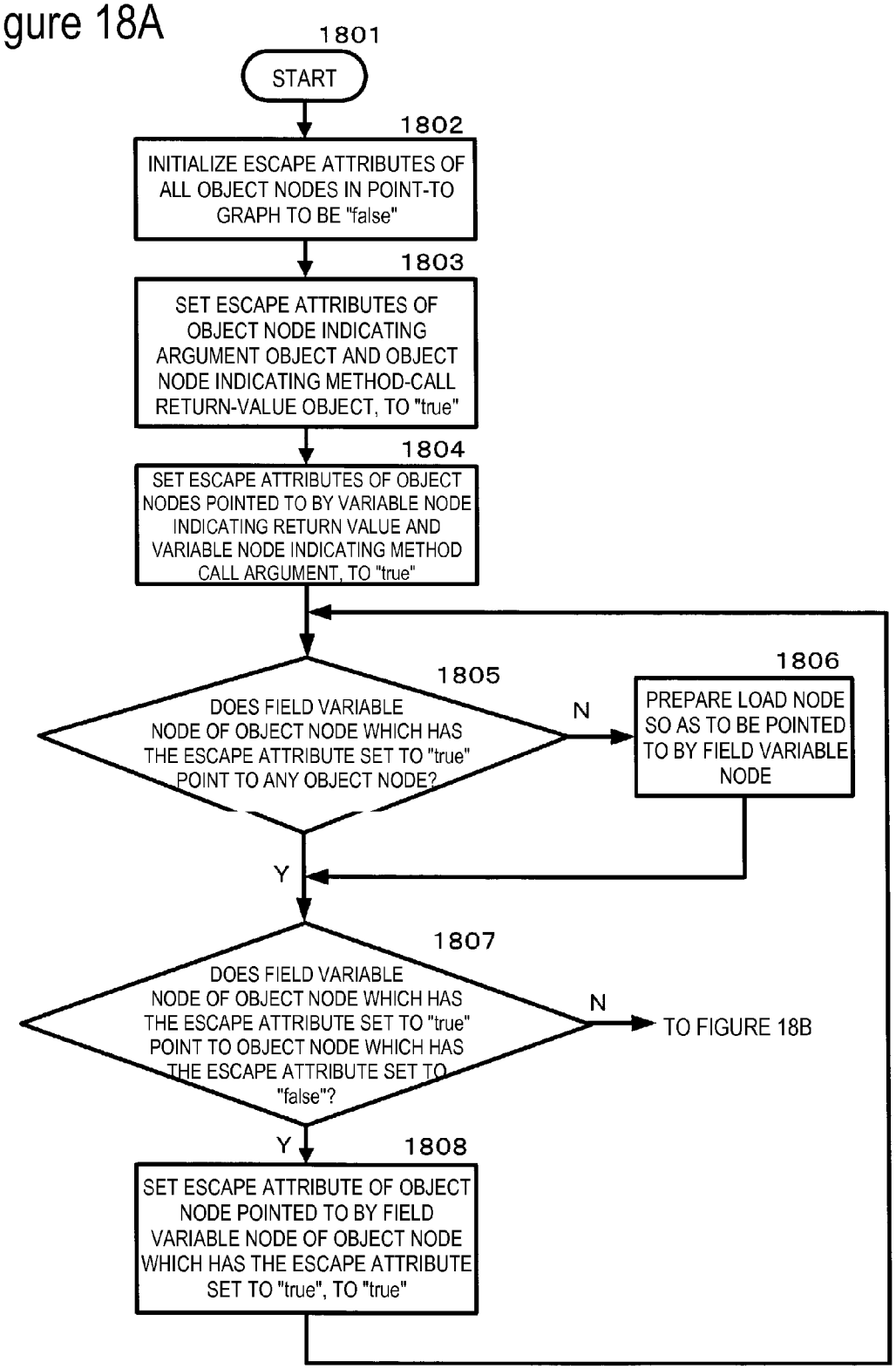
FIG. 18A is a detailed flowchart of a step (1604) of detecting whether or not an object for which it is desired to detect an access position escapes to a caller method or a callee method, using a flow-insensitive point-to graph in the flowchart of FIG. 16.

A graph (1148) is a graph obtained through a step of causing the escape attributes of an object node indicating an argument (a parameter) object and an object node indicating a method-call return-value object in the graph (1147) to be "true" (corresponding to step 1803 in FIG. 18A). Since the graph (1147) has neither an object node indicating an argument (a parameter) object nor an object node indicating a method-call return-value object, the graph (1148) is the same as the graph (1147).

A graph (1149) is a graph obtained through a step of changing the escape attributes of the object "2: Data" pointed to by a variable "arg1" and the object "4: Data" pointed to by "return" in the graph (1148) from "false" to "true" (corresponding to step 1804 in FIG. 18A).

A graph (1150) is a graph obtained through a step of adding a load node "7: (Load)" (the default of the escape attribute is "false") into the graph (1149) (corresponding to steps 1805 and 1806 in FIG. 18A).

A graph (1151) is a graph obtained through a step of causing the escape attribute of an object ("7: Load") pointed to by an object ("4: Data") which has the escape attribute set to "true" to be "true" in the graph (1150) (corresponding to steps 1807 and 1808 in FIG. 18A).

A graph (1152) is the point-to graph (1112) obtained by the pointer analysis shown in the upper part of FIG. 11A. At this stage, the point-to graph related to "method1" is completed. The escape attribute is not described in the graph (1152) because the escape attribute is not described ordinarily.

FIG. 11E is a diagram showing the details of generation of a point-to graph (1122) obtained by the pointer analysis shown in the lower part of FIG. 11A. Graphs generated over time will be described below in order of generation. However, graphs shown in FIG. 11E are not all the graphs generated over time.

The graphs (1141 to 1148) in FIGS. 11C and 11D are generated by this pointer analysis also. Therefore, description thereof will be omitted.

A graph (1159) is the same as the graph (1149) in FIG. 11D.

A graph (1160) is a graph obtained through a step of adding the load node "7: (Load)", and integrating "7: (Load)" and "4: Data" because "return" pointed to by "method1" points to the two objects, "7: (Load)" and "4: Data". The escape attribute of the load node is "false" by default.

A graph (1161) is a graph obtained through a step of causing the escape attribute of the object ("7: (Load)") pointed to by an object ("4: Data") which has the escape attribute set to "true" to be "true" (corresponding to step 1808 in FIG. 18A).

A graph (1162) is the point-to graph (1122) obtained by the pointer analysis shown in the lower part of FIG. 11A. At this stage, the point-to graph related to "method1" is completed. The escape attribute is not described in the graph (1162) because the escape attribute is not described ordinarily.

Figure 11F:
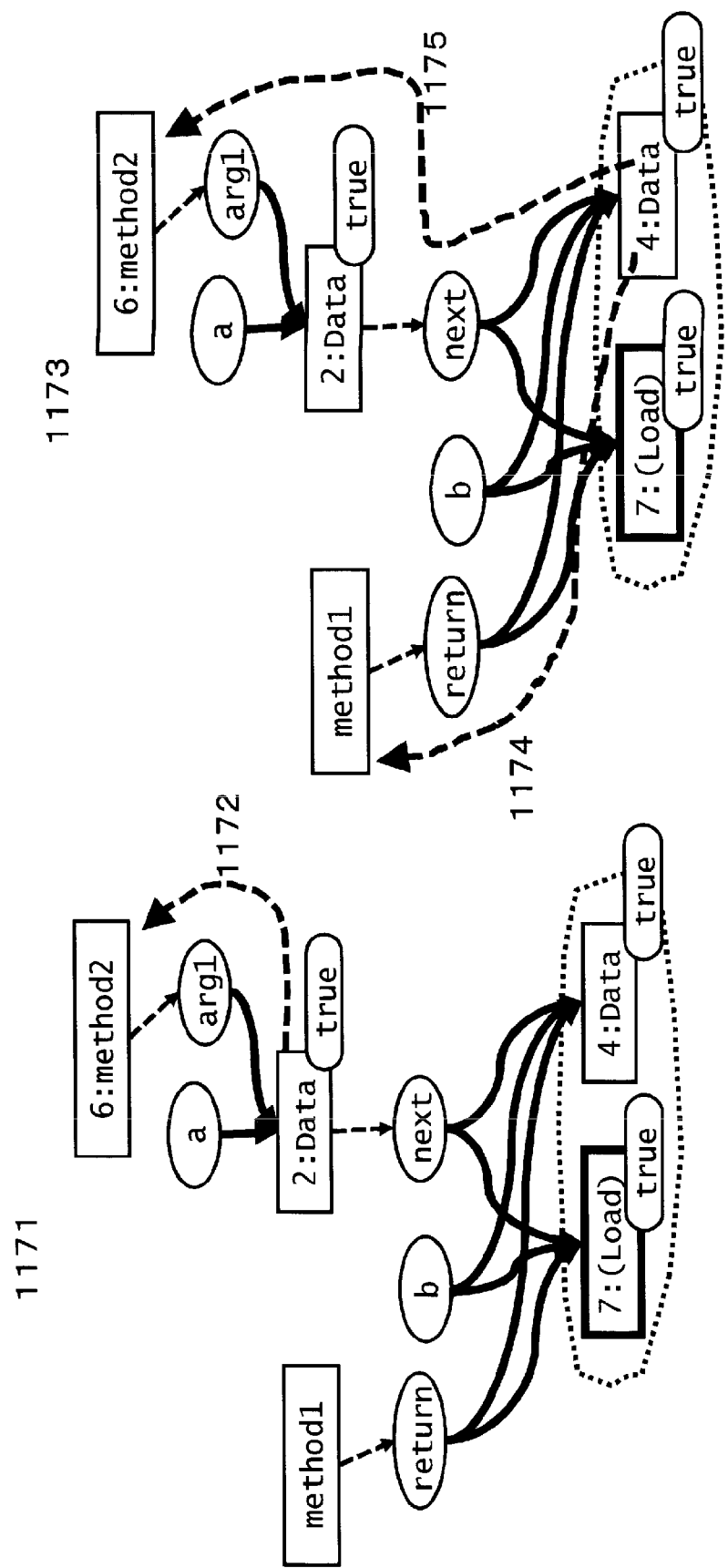
FIG. 11F is a diagram illustrating that a position to access an object for which it is desired to detect an access position is detected with the use of a point-to graph obtained by the pointer analysis shown in the lower part of FIG. 11A.
Figure 11G:
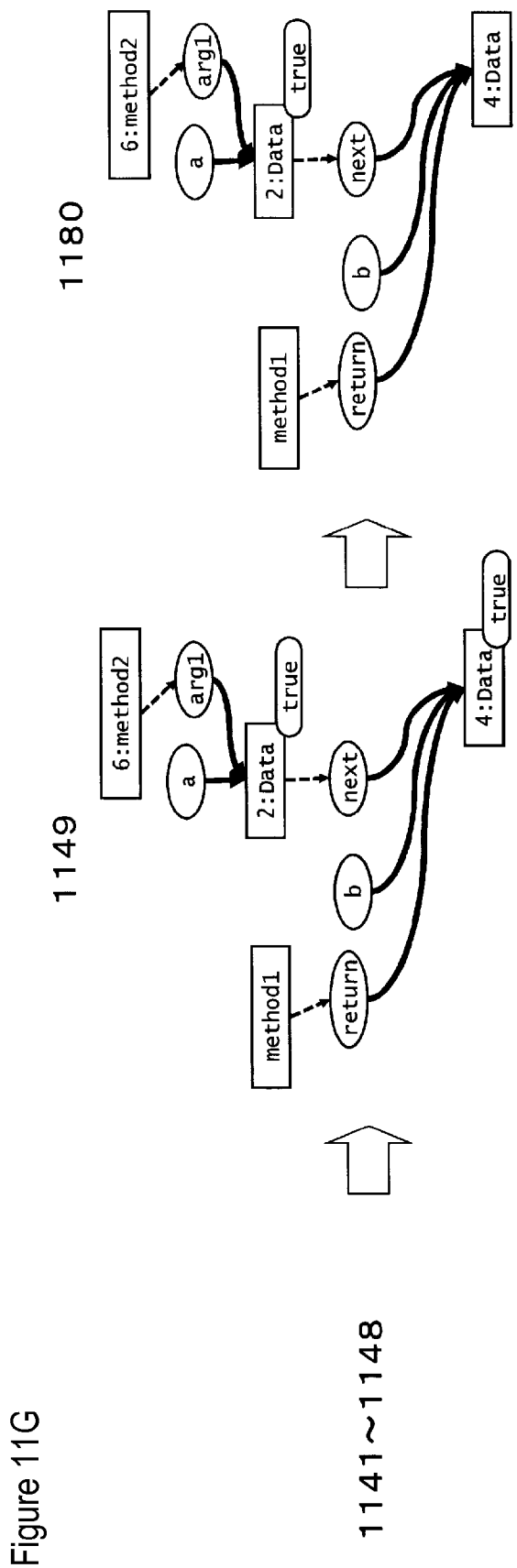
FIG. 11G is a diagram showing the details of generation of a point-to graph obtained by the pointer analysis shown in FIG. 11B.

FIG. 11F is a diagram illustrating that a position to access an object for which it is desired to detect an access position is detected with the use of the point-to graph (1122) obtained by the pointer analysis shown in the lower part of FIG. 11A.

Here, it is assumed that the object for which it is desired to know an access potion is, for example, "2: Data". As shown in a graph (1171), since the escape attribute of "2: Data" is "true" (see step 1809 in FIG. 18B), the arrow in the graph (1171) is followed in the opposite direction (1172) (see step 1810 in FIG. 18B), and the variable "arg1" is reached. Therefore, it is known that "2: Data" escapes to "6: method2" (see step 1813 in FIG. 18B).

It is assumed that the object for which it is desired to know an access potion is, for example, "4: Data". As shown in a graph (1173), since the escape attribute of "4: Data" is "true" (see step 1809 in FIG. 18B), the arrow in the graph (1173) is followed in the opposite direction (1174 and 1175) (see step 1810 in FIG. 18B), and the variables "return" and "arg1" are reached. Therefore, it is known that "4: Data" escapes to a caller of "method1" and "6: method2" (see step 1813 in FIG. 18B).

FIG. 11G is a diagram showing the details of generation of a point-to graph obtained by the pointer analysis shown in FIG. 11B. Graphs generated over time will be described below in order of generation. However, graphs shown in FIG. 11G are not all the graphs generated over time.

The graphs (1141 to 1149) in FIGS. 11C and 11D are generated by this pointer analysis also. Therefore, description thereof will be omitted.

A graph (1180) is a graph created when the field variable node ("next") of an object node ("2: Data") which has the escape attribute set to "true" in the graph (1149) points to any object node ("4: Data"), and the field variable node of an object node ("2: Data") which has the escape attribute set to "true" does not point to an object node which has the escape attribute set to "false" (in the case of "Yes" to the condition of step 1805 and "No" to the condition of step 1807 in FIG. 18A). The graph (1180) is the point-to graph (1132) obtained by the pointer analysis shown in FIG. 11B. At this stage, the point-to graph related to "method1" is completed. The escape attribute is not described in the graph (1180) because the escape attribute is not described ordinarily.

Figure 11H:
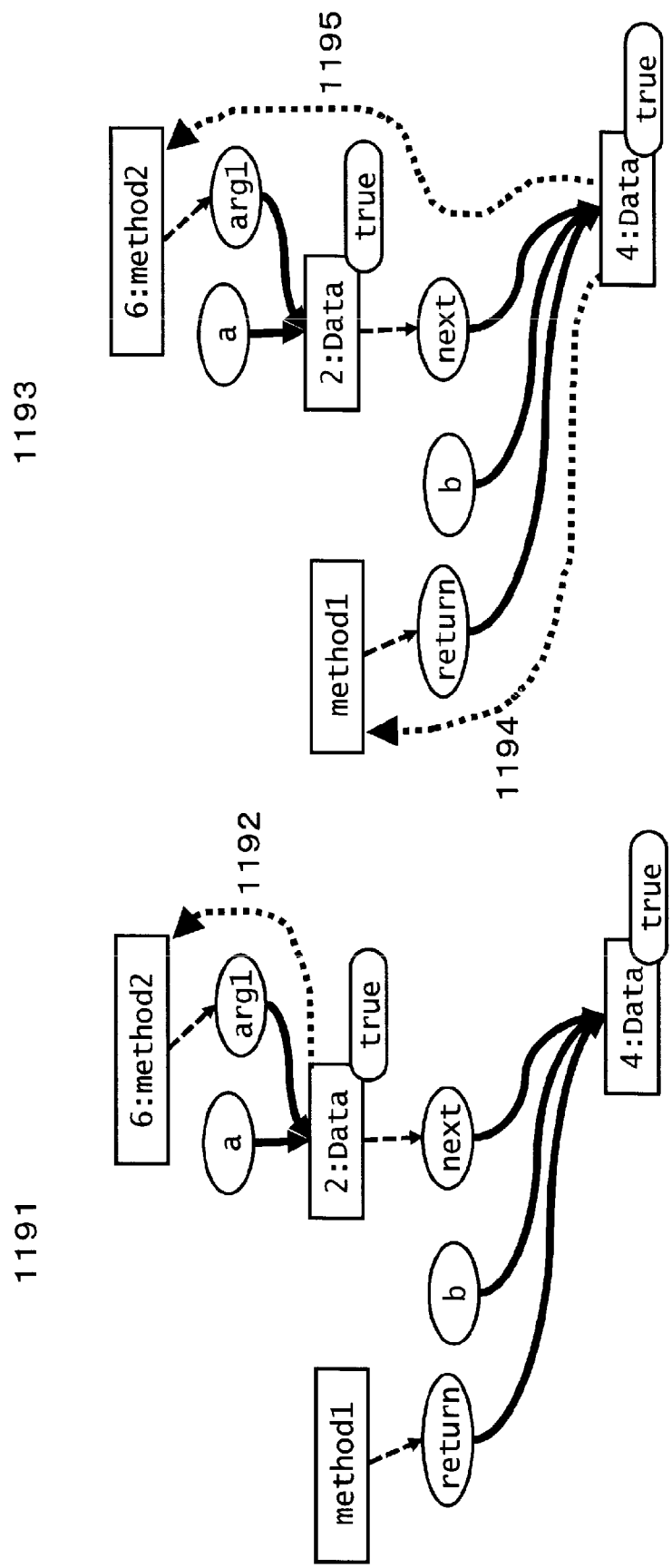
FIG. 11H is a diagram illustrating that a position to access an object for which it is desired to detect an access position is detected with the use of a point-to graph obtained by the pointer analysis shown in FIG. 11B.

FIG. 11H is a diagram illustrating that a position to access an object for which it is desired to detect an access position is detected with the use of the point-to graph (1132) obtained by the pointer analysis shown in FIG. 11B.

It is assumed that the object for which it is desired to know an access potion is, for example, "2: Data". As shown in a graph (1191), since the escape attribute of "2: Data" is "true" (see step 1809 in FIG. 18B), the arrow in the graph (1191) is followed in the opposite direction (1192) (see step 1810 in FIG. 18B), and the variable "arg1" is reached. Therefore, it is known that "2: Data" escapes to "6: method2" (see step 1813 in FIG. 18B).

It is assumed that the object for which it is desired to know an access potion is, for example, "4: Data". As shown in a graph (1193), since the escape attribute of "4: Data" is "true" (see step 1809 in FIG. 18B), the arrow is followed in the graph (1193) in the opposite direction (1194 and 1195) (see step 1810 in FIG. 18B), and the variables "return" and "arg1" are reached. Therefore, it is known that "4: Data" escapes to a caller of "method1" and "6: method2" (see step 1813 in FIG. 18B).

Figure 12A:
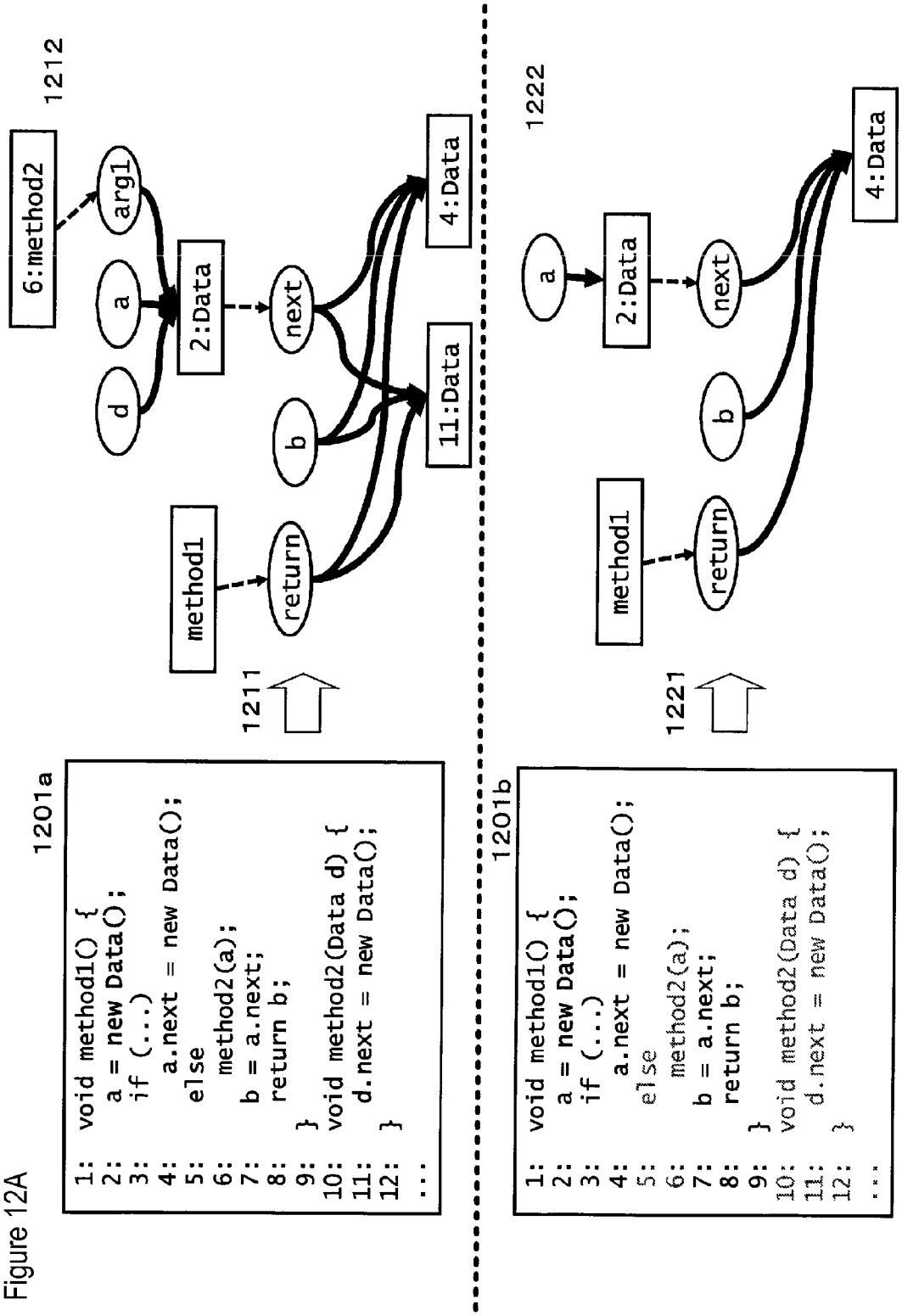
FIG. 12A is a diagram illustrating that only a program area that is executed frequently is analyzed by analysis by the incrementalized technique (upper part) or in accordance with an aspect of the present invention.

FIG. 12A is a diagram illustrating that only a program area that is executed frequently is analyzed by analysis by the incrementalized technique (upper part) or in accordance with an aspect of the present invention.

Program codes (1201a and 1201b) shown in FIG. 12A are the same codes, and they are also the same as the program code (1101) in FIGS. 11A and 11B.

Referring to the upper part of FIG. 12A, it is assumed that it is desired to know a position where a Data object allocated by the instruction on the second line of the program code (1201a) is accessed last. That is, the Data object allocated on the second line ("2: Data") is an object for which it is desired to detect an access position.

Figure 12B:
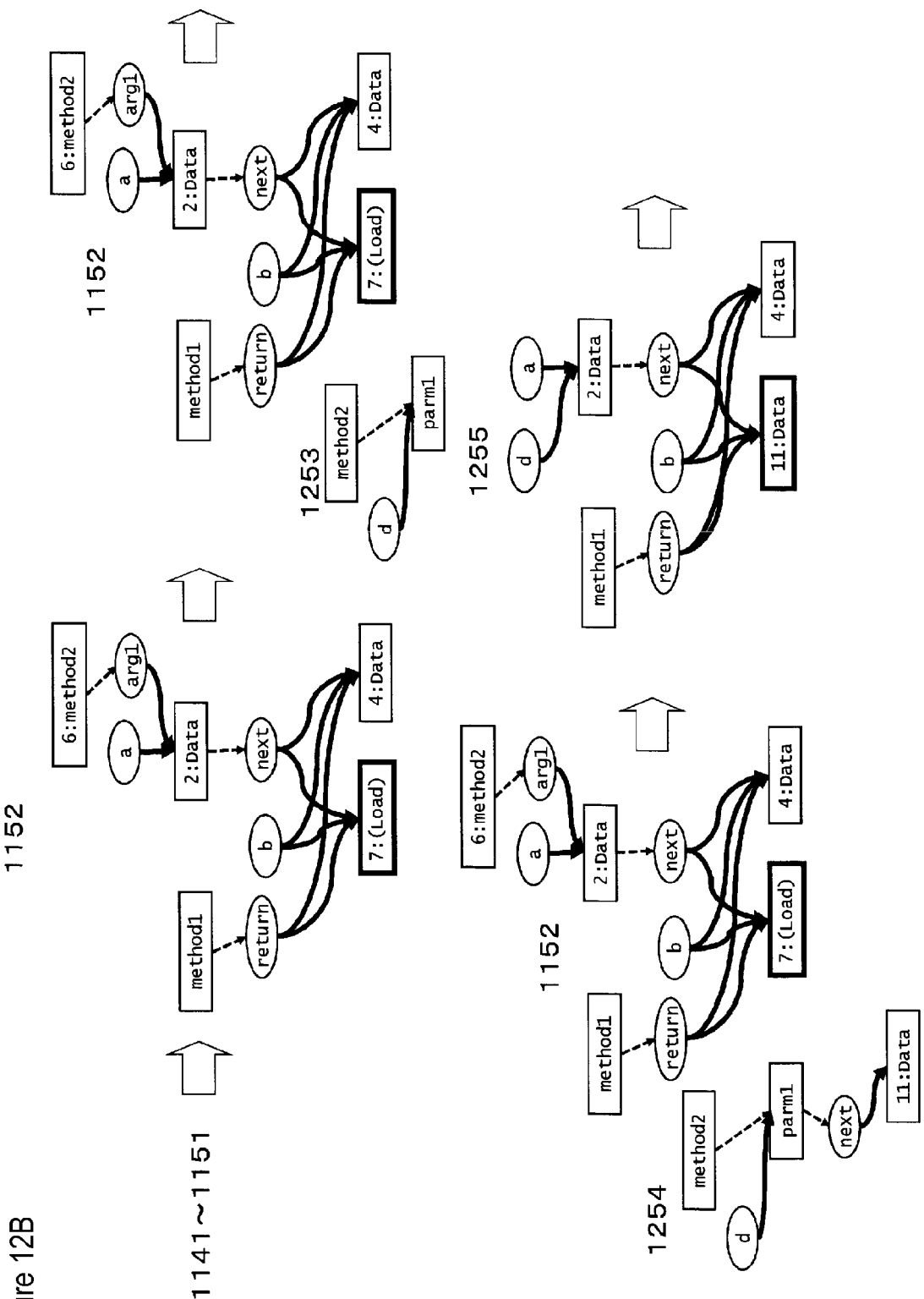
FIG. 12B is a diagram showing the details of generation of a point-to graph obtained by the pointer analysis shown in the upper part of FIG. 12A.
Figure 12C:
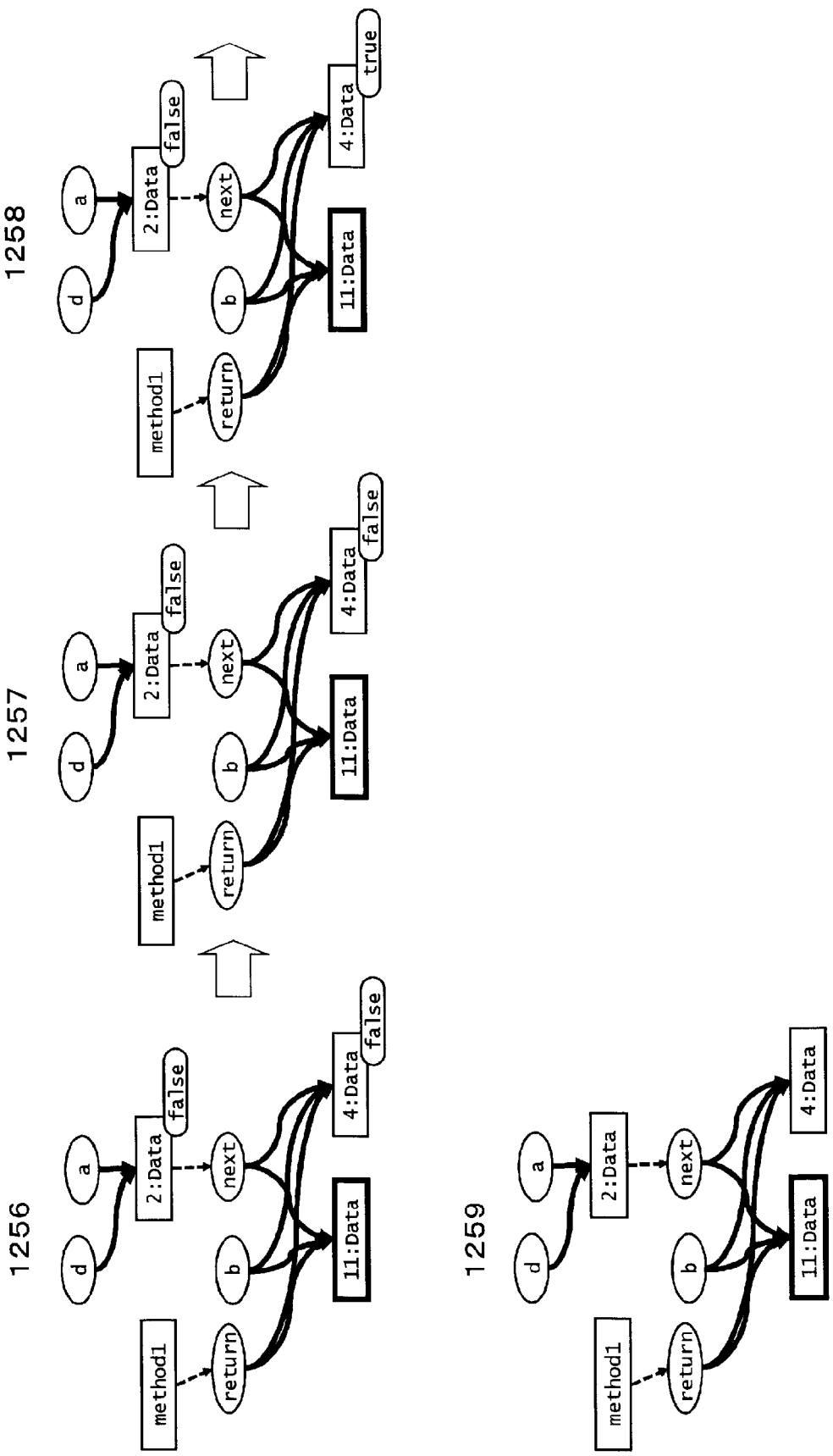
FIG. 12C is a diagram showing the details of generation of a point-to graph obtained by the pointer analysis shown in the upper part of FIG. 12A.

By performing pointer analysis of the program code (1201a) by the ordinary incrementalized technique shown in FIGS. 9A to 9C, FIG. 10A (lower part) and FIG. 10B (1211), a point-to graph (1212) is obtained. The details of generation of the point-to graph (1212) are shown in FIGS. 12B and 12C described below. The point-to graph (1212) is a point-to graph at a stage where "method1" has been analyzed, and "method2" has been further sniffed. The result of analyzing "method1" in the program code (1201a) is the graph (1112) in the upper part of FIG. 11A or the graph (1122) in the lower part. However, since "2: Data" escapes to "method2", it is necessary to sniff "method2", and therefore, "method2" is further sniffed. It is seen from the point-to graph (1212) that "2: Data" is accessed by the fourth, seventh and eleventh lines in the code (1201a). Therefore, it is known that "a.next" on the seventh line in the code (1201a) is the last position accessing the Data object allocated by the instruction on the second line.

Referring to the lower part of FIG. 12A, in access analysis of an object, it is often the case that analysis of only a program area executed more than a predetermined number of times (for example, frequently) is sufficient. Here, "executed more than a predetermined number of times" means being executed, for example, at least once or more, at least a hundred times or more, at least four hundred times or more, or at least one thousand times or more though it depends on an analysis target program. The number of times can be set by a developer or a program appropriately performing tuning a predetermined number of times. To be executed frequently means to be executed, for example, at least one hundred times or more, at least four hundred times or more, at least one thousand times or more though it depends on the program, and the number of times can be set by the developer or the program by appropriately performing tuning a predetermined number of times. An existing method for identifying a program area executed frequently is, for example, a technique in which the value of an instruction pointer of a CPU is acquired at predetermined time intervals, the value of a counter corresponding to the instruction pointer value is incremented, and a program area corresponding to an instruction pointer value exceeding a certain threshold is regarded as a program area executed frequently.

In the following example, it is assumed that whether or not the program code (1201b) is executed frequently is judged with the number of method calls as criteria. It is assumed that, in the program code (1201b), a call of "method2" on the sixth line is seldom executed.

Figure 12E:
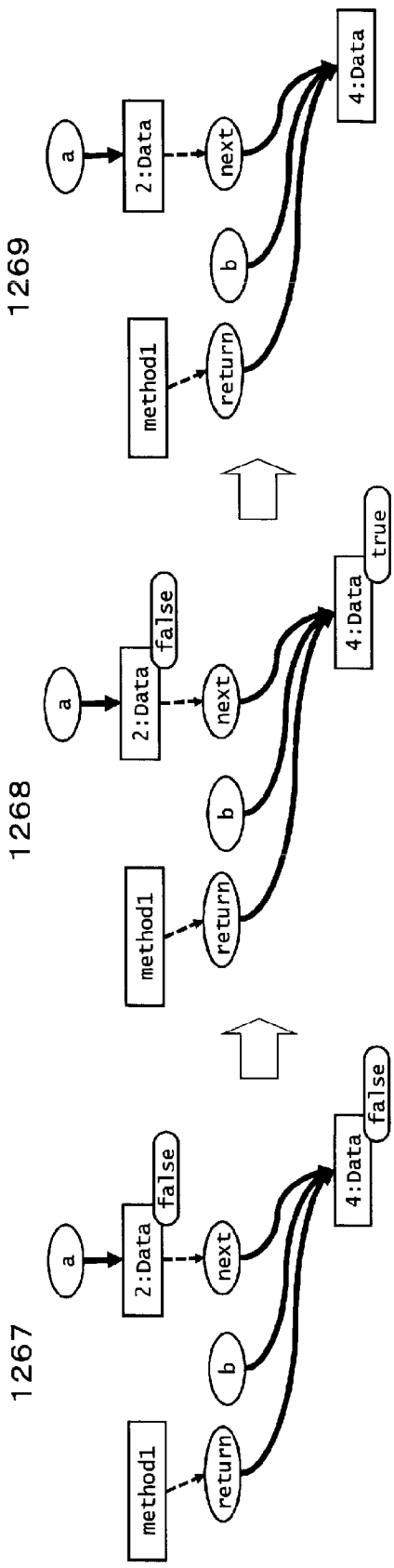
FIG. 12E is a diagram showing the details of generation of a point-to graph obtained by the pointer analysis shown in the lower part of FIG. 12A.

When pointer analysis of the program code (1201b) is performed in accordance with a method in accordance with the aspect of the present invention (1221), a point-to graph (1222) shown in the lower part of FIG. 12A is obtained. The details of generation of the point-to graph (1222) are shown in FIGS. 12D and 12E described below. Since a call of "method2" on the sixth line is seldom executed in the pointer analysis (1201b), it is not necessary to sniff "method2". Therefore, the analysis time and the amount of memory required for the sniffing are not necessary. It is seen from the point-to graph (1222) that "2: Data" is accessed by the fourth and seventh lines in the code (1201b). Therefore, it is known that "a.next" on the seventh line in the code (1201b) is the position accessed last by the Data object allocated by the instruction on the second line. This result is the same as the result obtained from the point-to graph (1212) shown in the upper part of FIG. 12A. That is, the result obtained from the point-to graph (1222) is the same as the result of the case of sniffing "method2", and it indicates that the analysis accuracy does not deteriorate even when "method2" is not sniffed in accordance with the aspect of the present invention.

FIGS. 12B and 12C are diagrams showing the details of generation of a point-to graph obtained by the pointer analysis shown in the upper part of FIG. 12A. Graphs generated over time will be described below in order of generation. However, graphs shown in FIGS. 12B and 12C are not all the graphs generated over time. It should be noted that, a point-to graph (1259) shown in FIGS. 12B and 12C is different from the point-to graph in the upper part of FIG. 12A in that "6: method2" is deleted.

The graphs (1141 to 1152) in FIGS. 11C and 11D are generated by this pointer analysis also. Therefore, description thereof will be omitted. The graph (1152) is a point-to graph at a stage where "method1" has been analyzed. It is assumed that an object for which it is desired to detect an access position is, for example, "2: Data" or "4: Data". Because both of "2: Data" and "4: Data" escape to "6: method2", it is necessary to sniff "method2".

A graph (1253) is a graph generated through a step of reading in the instruction on the tenth line of the program code (1201a) (corresponding to step 1708 in FIG. 17B). Since there is not a return value for "method2", the variable node "return" is unnecessary.

A graph (1254) is a graph generated through a step of reading in the instructions on the eleventh and twelfth lines (corresponding to step 1706 in FIG. 17B).

Figure 16:
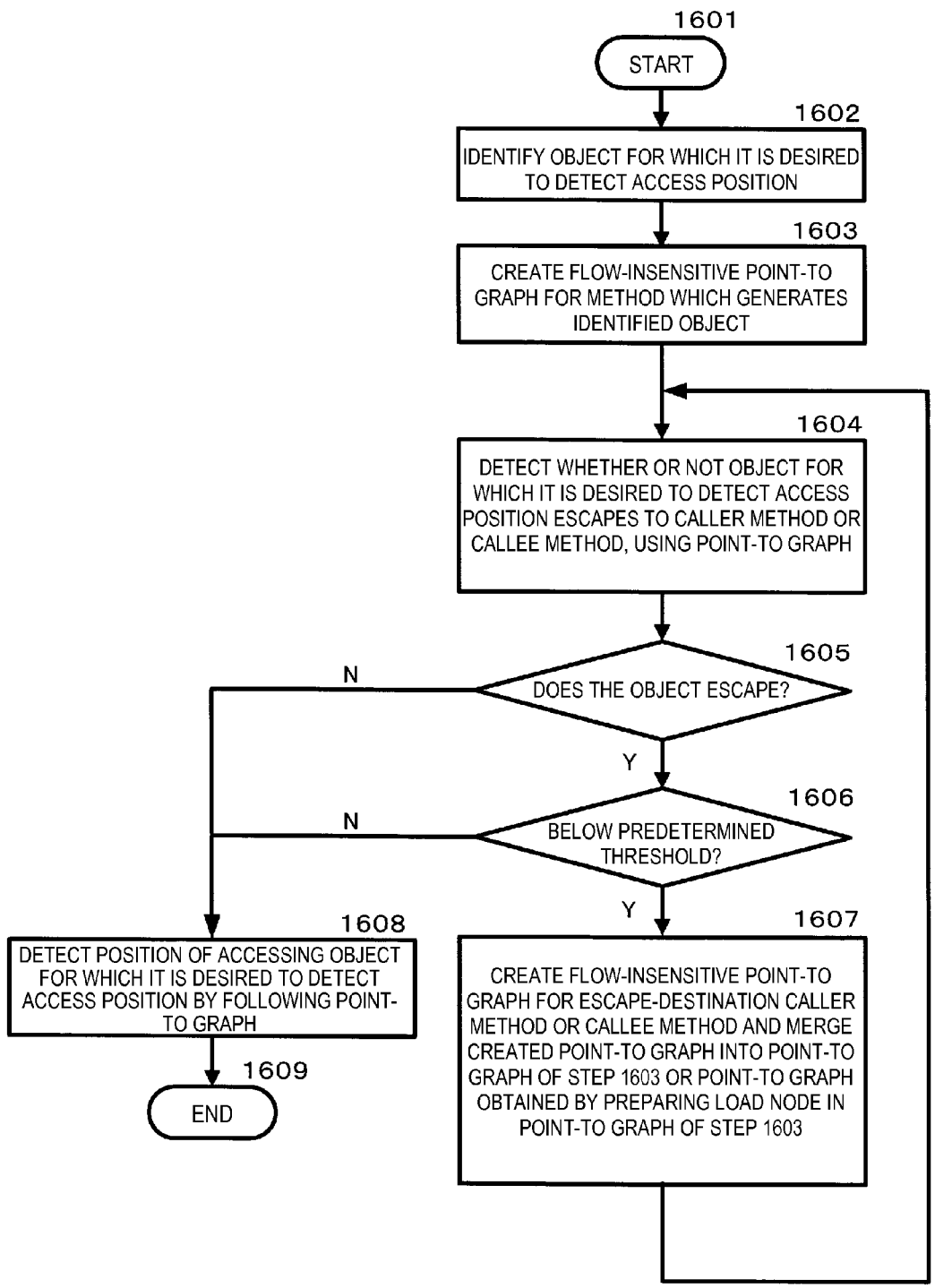
FIG. 16 is a flowchart of a pointer analysis method in accordance with an aspect of the present invention.

A graph (1255) is a graph generated through a step of merging the graph (1254) related to "method2" into the graph (1152) related to "method1" (corresponding to step 1607 in FIG. 16). In this example, since "parm1" and "11: Data" in the graph (1254) correspond to "2: Data" and "7: (Load)" in the graph (1152), respectively, the corresponding objects are merged with each other. Since the call of "method2" on the sixth line in the code (1201a) has already been analyzed, "6: method2" is deleted.

A graph (1256) is a graph generated through a step of initializing the escape attributes of all the objects nodes in the graph (1255) to "false" (corresponding to step 1802 in FIG. 18A).

A graph (1257) is a graph obtained through a step of causing the escape attributes of an object node indicating an argument (a parameter) object and an object node indicating a method-call return-value object in the graph (1256) to be "true" (corresponding to step 1803 in FIG. 18A). Since the graph (1257) has neither an object node indicating an argument (a parameter) object nor an object node indicating a method-call return-value object, the graph (1257) is the same as the graph (1256).

A graph (1258) is a graph obtained through a step of changing the escape attribute of the object "4: Data" pointed to by the variable "return" in the graph (1257) from "false" to "true" (corresponding to step 1804 in FIG. 18A).

A graph (1259) is the point-to graph (1212) obtained by the pointer analysis shown in the upper part of FIG. 12A. In the graph (1257), it is not necessary to add a load node. The escape attribute is not described in the graph (1259) because the escape attribute is not described ordinarily. Since it is known from the graph (1259) that "4: Data" escapes to a caller of "method1", the pointer analysis is continuously performed (see the flowchart in FIG. 18B).

FIGS. 12D and 12E are diagrams showing the details of generation of a point-to graph obtained by the pointer analysis shown in the lower part of FIG. 12A. Graphs generated over time will be described below in order of generation. However, graphs shown in FIGS. 12D and 12E are not all the graphs generated over time.

A graph (1261) is a graph generated through a step of reading in the instruction on the first line in the program code (1201b) (corresponding to step 1702 in FIG. 17A).

A graph (1262) is a graph generated through a step of reading in the instruction on the second line (corresponding to step 1707 in FIG. 17B).

A graph (1263) is a graph generated through a step of reading in the instructions on the third and fourth lines (corresponding to step 1707 in FIG. 17B).

A graph (1264) is a graph generated through a step of reading in the instruction on the seventh line (corresponding to step 1711 in FIG. 17B). Since the instructions on the fifth and sixth lines are not frequently executed, the instructions are skipped without being read in.

A graph (1265) is a graph generated through a step of reading in the instructions on the eighth and ninth lines (corresponding to step 1708 in FIG. 17B).

A graph (1266) is a graph generated through a step of initializing the escape attributes of all the objects nodes in the graph (1265) to "false" (corresponding to step 1802 in FIG. 18A).

A graph (1267) is a graph obtained through a step of causing the escape attributes of object nodes indicating argument (parameter) objects and object nodes indicating method-call return-value objects in the graph (1266) to be "true" (corresponding to step 1803 in FIG. 18A). Since the graph (1266) has neither an object node indicating an argument (a parameter) object nor an object node indicating a method-call return-value object, the graph (1267) is the same as the graph (1266).

A graph (1268) is a graph obtained through a step of changing the escape attribute of the object "4: Data" pointed to by the variable "return" in the graph (1267) from "false" to "true" (corresponding to step 1804 in FIG. 18A).

A graph (1269) is the point-to graph (1222) obtained by the pointer analysis shown in the lower part of FIG. 12A. At this stage, the point-to graph related to "method1" is completed. The escape attribute is not described in the graph (1269) because the escape attribute is not described ordinarily.

Figure 12F:
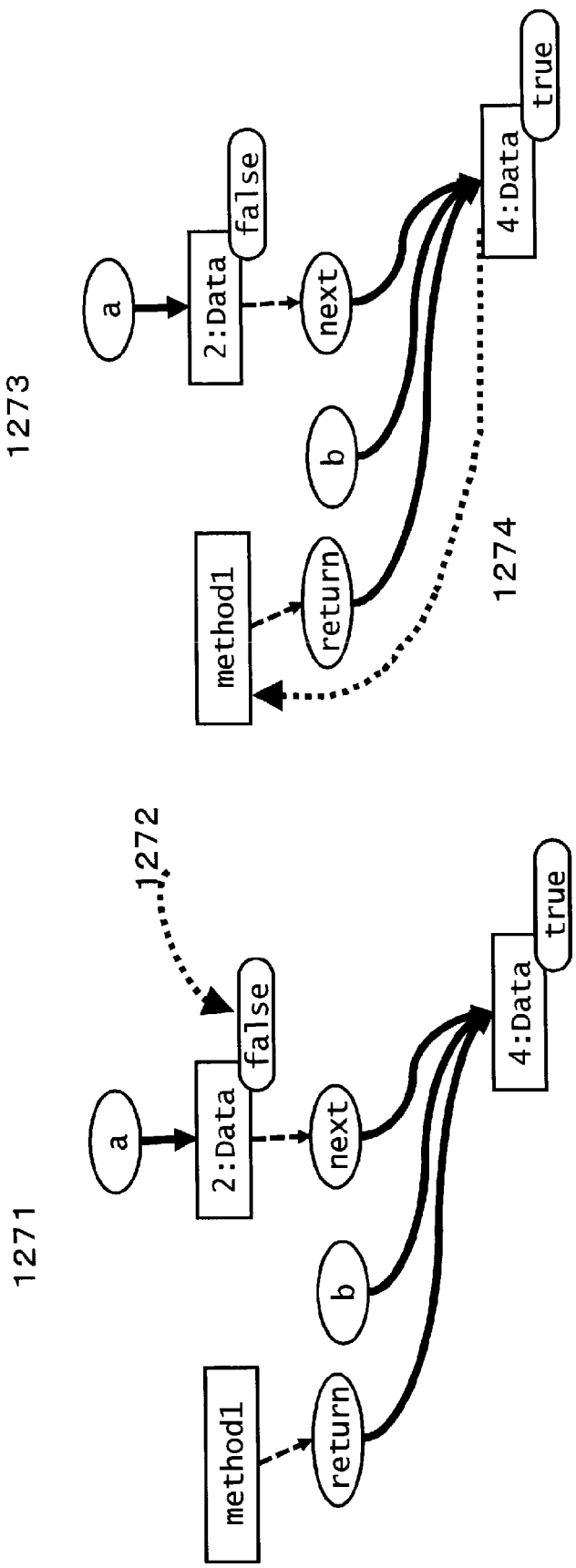
FIG. 12F is a diagram illustrating that it is detected whether it is necessary to further sniff a point-to graph obtained by the pointer analysis shown in the lower part of FIG. 12A.

FIG. 12F is a diagram illustrating that it is detected whether it is necessary to further sniff the point-to graph obtained by the pointer analysis shown in the lower part of FIG. 12A.

Here, it is assumed that the object for which it is desired to know an access position is, for example, "2: Data". As shown in a graph (1271), the escape attribute of "2: Data" is "false" (1272) (see step 1809 in FIG. 18B), and therefore, "2: Data" is regarded as not escaping (see step 1811 in FIG. 18B). Therefore, it is not necessary to further sniff "method2".

Here, it is assumed that the object for which it is desired to know an access position is, for example, "4: Data". As shown in a graph (1273), since the escape attribute of "4: Data" is "true" (see step 1809 in FIG. 18B), the arrow in the graph (1273) is followed in the opposite direction (1274) (see step 1810 in FIG. 18B), and the variable "return" is reached. Therefore, it is known that "4: Data" escapes to a caller of "method1" (see step 1813 in FIG. 18B). Therefore, it is not necessary to further sniff "method2".

As described above, it is not necessary to sniff "method2" regardless of whether the object for which it is desired to know an access position is "2: Data" and "4: Data". Thus, this state is the state indicated by the point-to graph (1222) obtained by the pointer analysis shown in the lower part of FIG. 12A. Since "4: Data" escapes to a caller of "method1", the pointer analysis can be continuously performed.

Figure 13A:
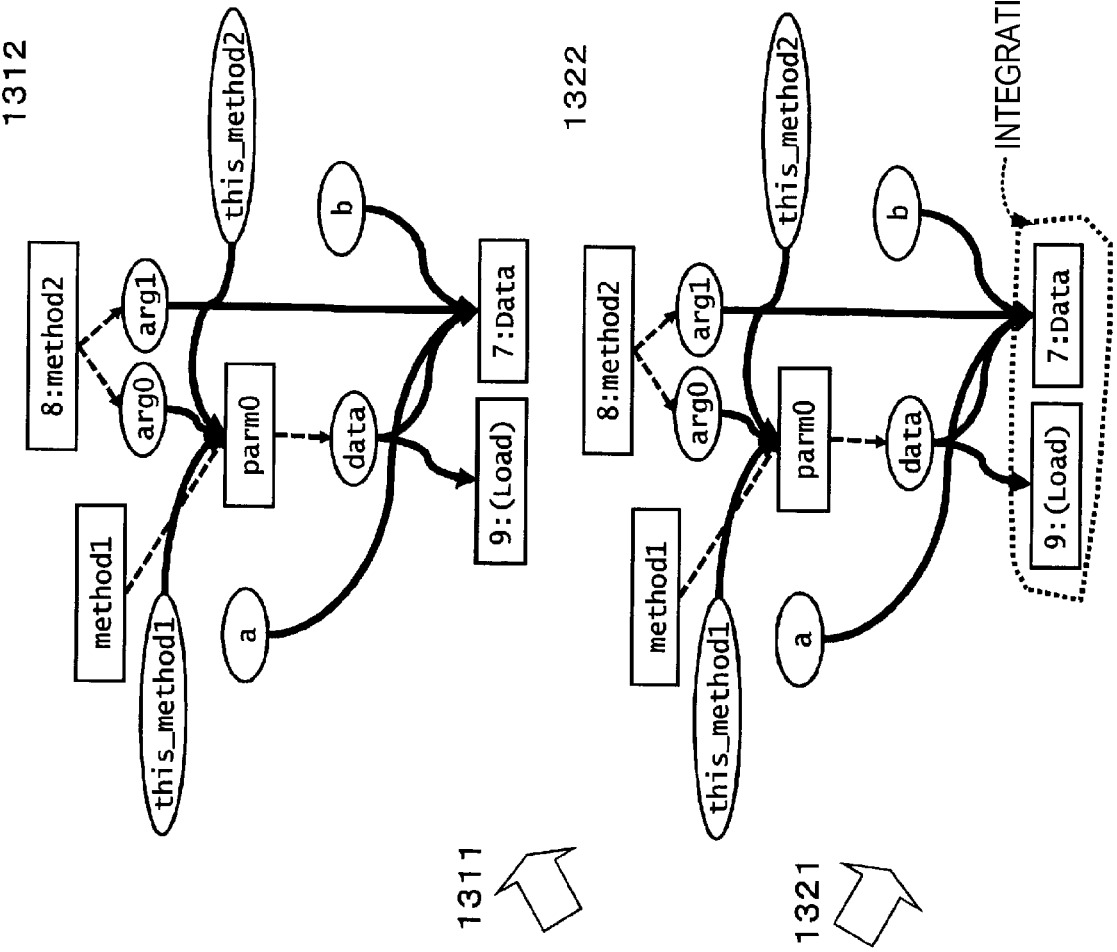
FIG. 13A is a diagram illustrating that analysis is performed without consideration of a private field.

FIG. 13A is a diagram illustrating that analysis is performed without consideration of a private field. On the other hand, FIGS. 13B and 13C are diagrams illustrating that analysis are performed in consideration of a private field.

Figure 13B:
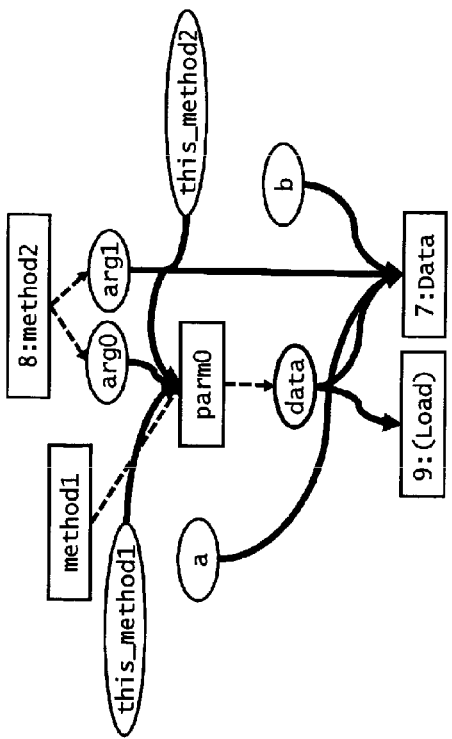
FIG. 13B is a diagram illustrating that analysis is performed in consideration of a private field in accordance with an aspect of the present invention.
Figure 13B:
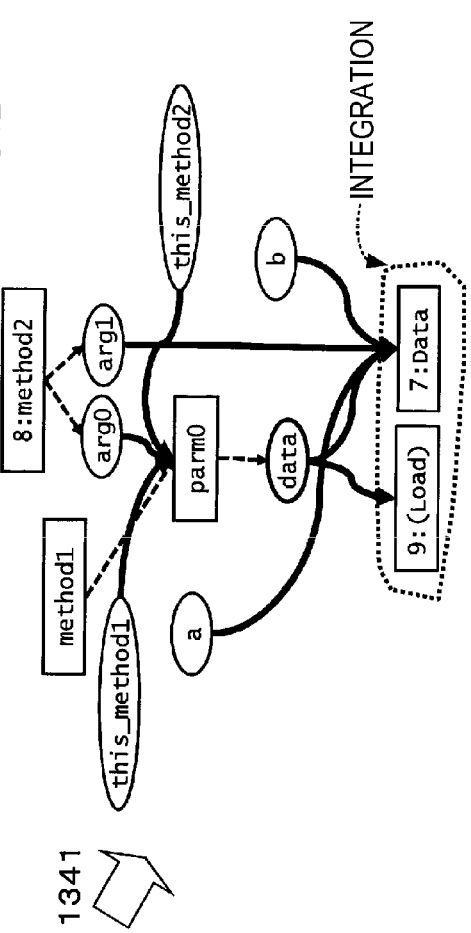
Figure 13C:
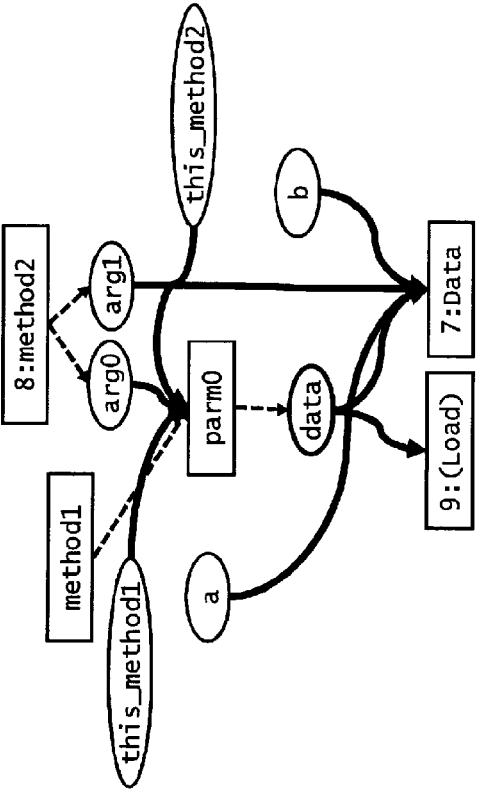
FIG. 13C is a diagram illustrating that analysis is performed in consideration of a private field in accordance with an aspect of the present invention.
Figure 13C:
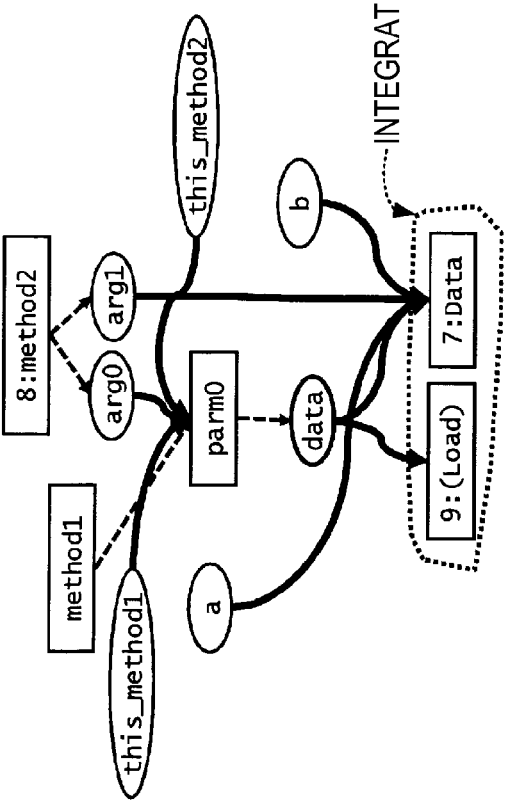

Program codes (1301a and 1301b) shown in FIGS. 13A and 13B are the same codes.

Referring to the upper part of FIG. 13A, it is assumed that it is desired to know a position where a Data object ("7: Data") allocated by the instruction on the seventh line of the program code (1301a) is accessed. That is, the Data object allocated by the seventh line is an object for which it is desired to detect an access position.

Figure 14A:
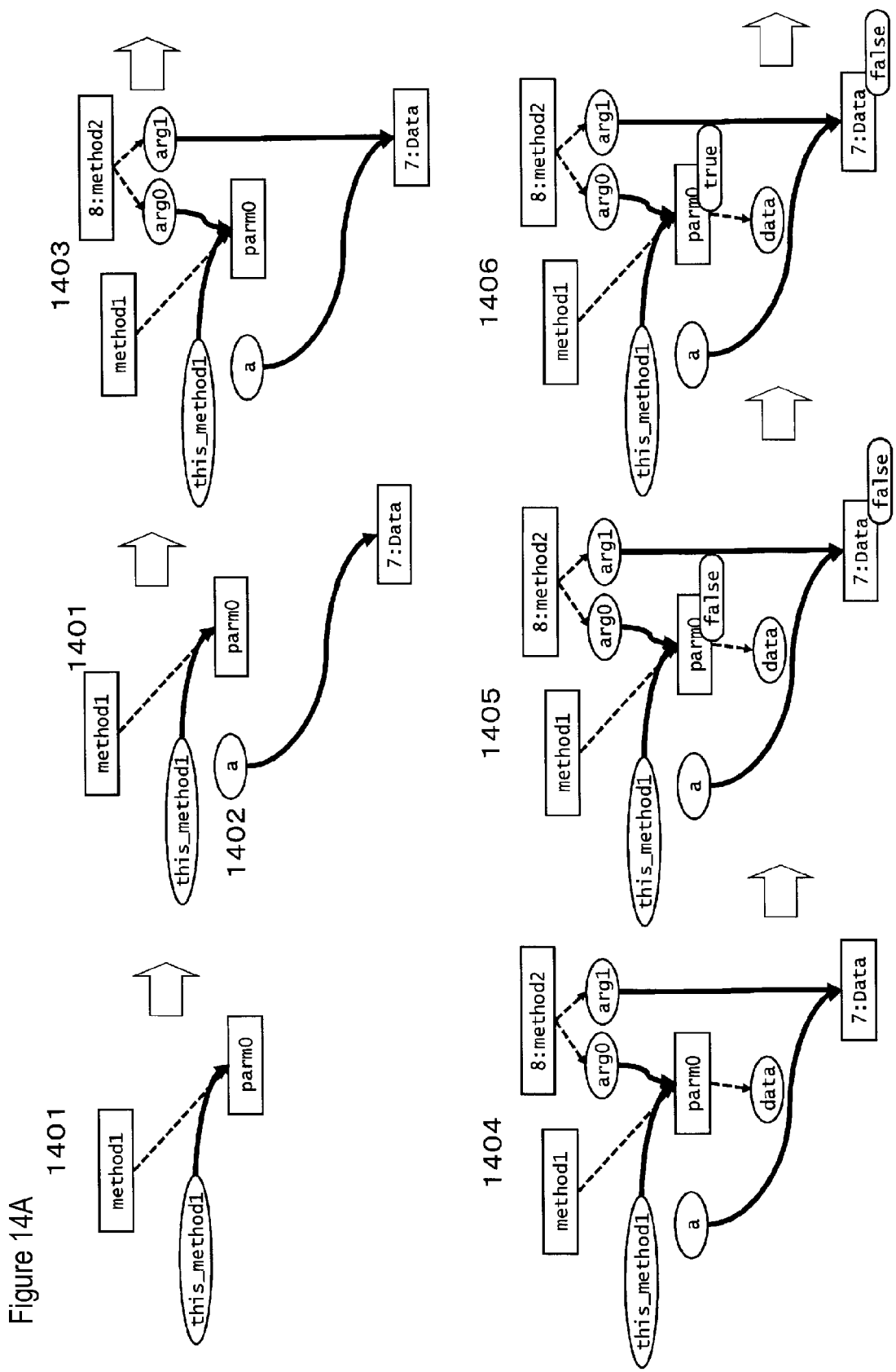
FIG. 14A is a diagram showing the details of generation of a point-to graph obtained by the pointer analysis shown in the upper part of FIG. 13A.
Figure 14B:
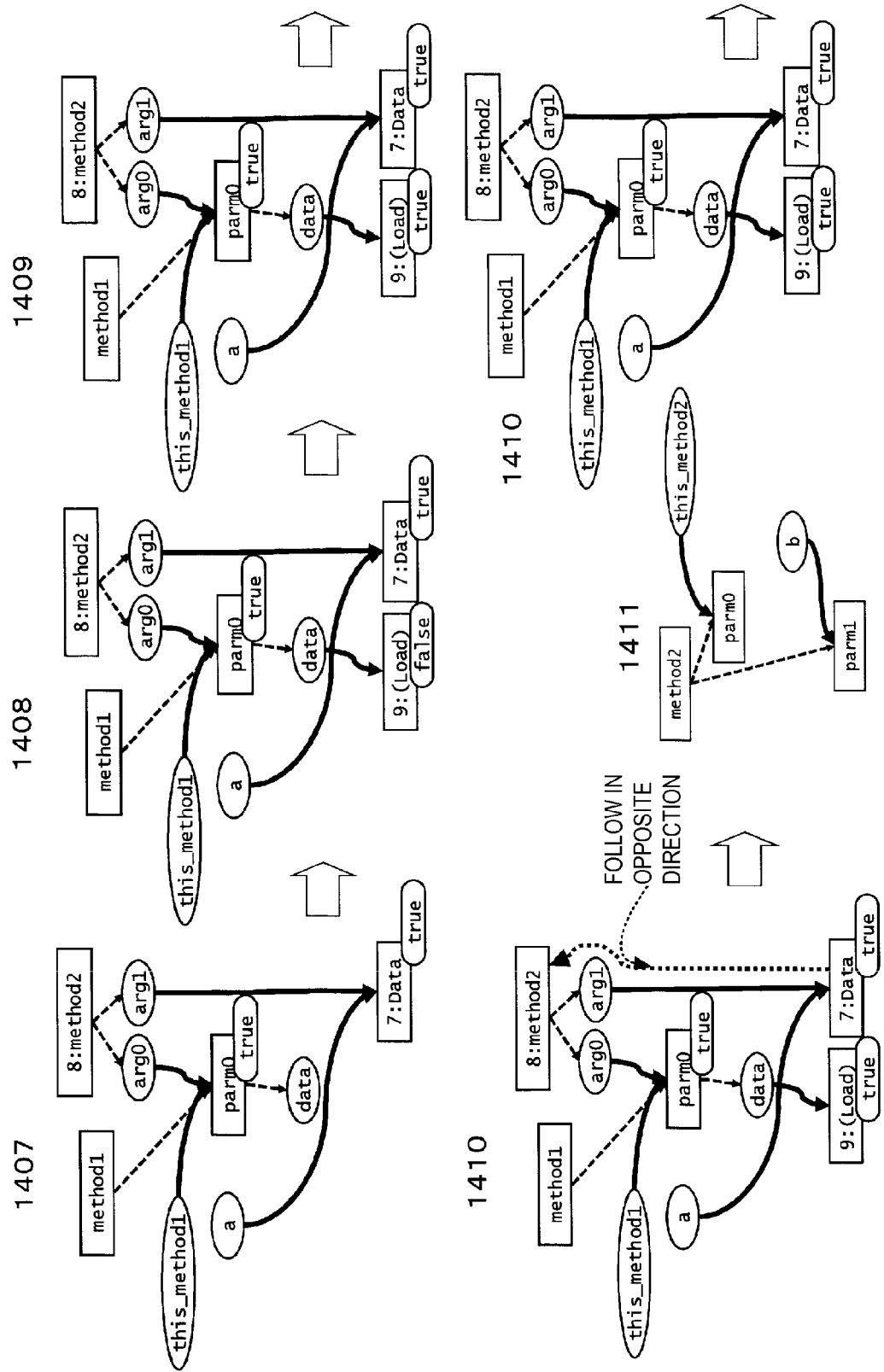
FIG. 14B is a diagram showing the details of generation of a point-to graph obtained by the pointer analysis shown in the upper part of FIG. 13A.
Figure 14C:
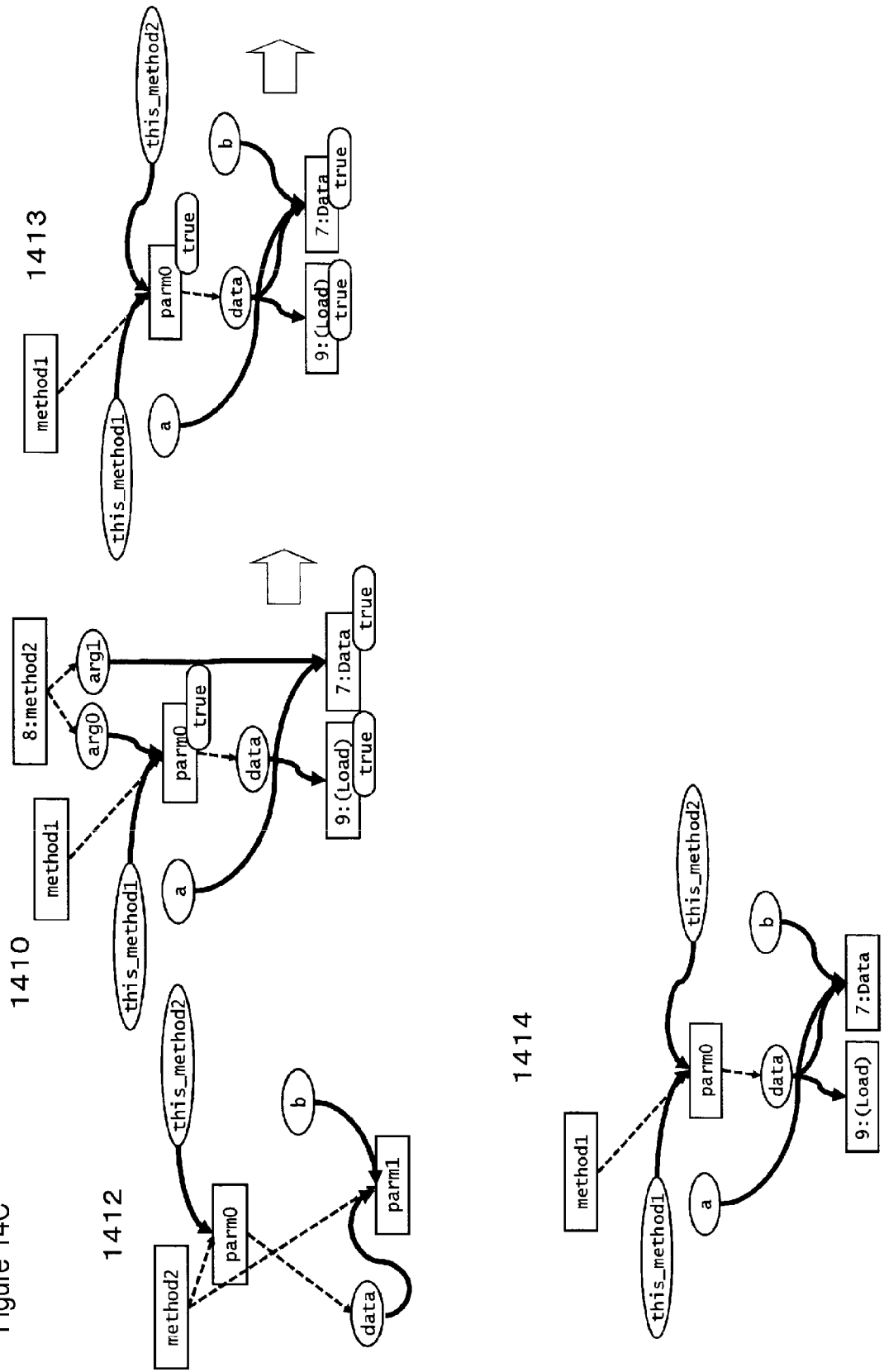
FIG. 14C is a diagram showing the details of generation of a point-to graph obtained by the pointer analysis shown in the upper part of FIG. 13A.

By performing pointer analysis (1311) of the program code (1301a) by analysis by the ordinary incrementalized technique shown in FIGS. 9A to 9C, FIG. 10A (lower part) and FIG. 10B (1311), a point-to graph (1312) shown on the upper side of FIG. 13A is obtained. The details of generation of the point-to graph (1312) is shown in FIGS. 14A to 14C described below. The point-to graph (1312) is a point-to graph at a stage where "method1" and "method2" have been analyzed. In the point-to graph (1312), "this_method1" and "this_method2" are names given to a "this" variable of "method1" and a "this" variable of "method2", respectively, to distinguish the variables from each other. In the point-to graph (1312), there is prepared a "parm0" node, a special node indicating a DataSet object which is the 0th argument of "method1". It is seen from the point-to graph (1312) that "7: Data" escapes to a caller of "method1" via "parm0" of "method1". Therefore, in order to know a position where "7: Data" is accessed, it is necessary to further sniff "method0", which is another method.

Therefore, it is necessary for the computer to further analyze the program code (1301a) and update the point-to graph (1312) (see FIG. 14E described below). Consequently, the point-to graph obtained by the update is further enlarged (see FIGS. 14F and 14G described below), and the analysis time and the amount of memory required increase.

Figure 14D:
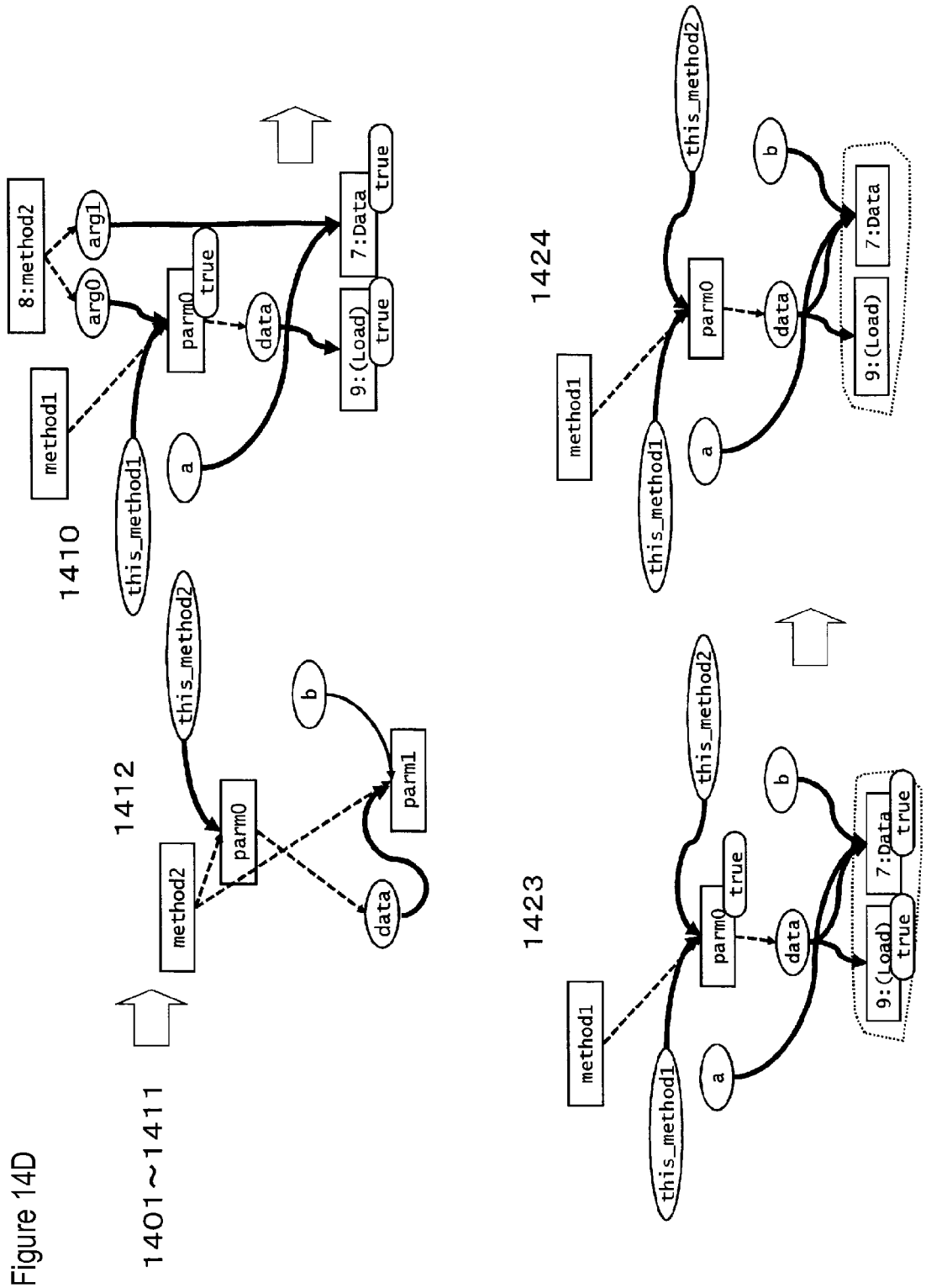
FIG. 14D is a diagram showing the details of generation of a point-to graph (1322) obtained by the pointer analysis shown in the lower part of FIG. 13A.

Referring to the lower part of FIG. 13A, by performing pointer analysis (1321) of the program code (1301a) by combination of analysis by the unification-based technique, one of the flow-insensitive techniques, and analysis by the ordinary incrementalized technique shown in FIGS. 9A to 9C, FIG. 10A (lower part) and FIG. 10B, a point-to graph (1322) shown on the lower side of FIG. 13A is obtained. The details of generation of the point-to graph (1322) are shown in FIG. 14D described below. In the point-to graph (1322), since "parm0" escapes to a caller of "method1", "9: (Load)" is prepared in response to loading of the instruction on the ninth line. In the analysis by the unification-based technique (1121), the "data" field of "parm0" pointed to by "method1" points to two objects, "9: (Load)" and "7: Data", and therefore, "9: (Load)" and "7: Data" are integrated and not distinguished from each other.

Referring to the upper part of FIG. 13B, the upper part of FIG. 13B is a diagram showing that a technique in which a load node and a private field are prepared in a point-to graph is combined with analysis by the incrementalized technique, and the point-to graph is updated, in accordance with an aspect of the present invention.

As described with reference to FIG. 13A, it is necessary to further sniff "method0", which is another method, in order to know a position where "7: Data" is accessed. However, when it is utilized that the "data" field of a DataSet class has a private attribute, it is not necessary to sniff "method0". This is because the computer is required to read in the "data" field in order to access "7: Data" via "parm0". Here, the "data" field is a private field. A private field has a nature that it is not accessed from outside a class declaration. Therefore, the position to read the "data" field is limited to the inside of the DataSet class. In the example of the code (1301b), reading of the "data" field is performed only by the ninth line. Therefore, analyzing where an object loaded by the ninth line in the code (1301b) is accessed is equivalent to analyzing where "7: Data" is accessed. The object loaded by the ninth line is "9: (Load)" in a point-to graph (1332). Therefore, where the object loaded by the ninth line is accessed has already been analyzed in the point-to graph (1332). Therefore, it is known that "this.data.field" on the ninth line in the code (1301b) is the position accessing the Data object allocated by the instruction on the seventh line. By using a private field in accordance with the aspect of the present invention, it is possible to know a position accessing the Data object allocated by the instruction on the seventh line without updating the point-to graph (1332). As described above, it is possible to decrease the number of methods targeted by analysis, using the nature of a private field that it is not accessed from outside a class declaration.

Figure 14E:
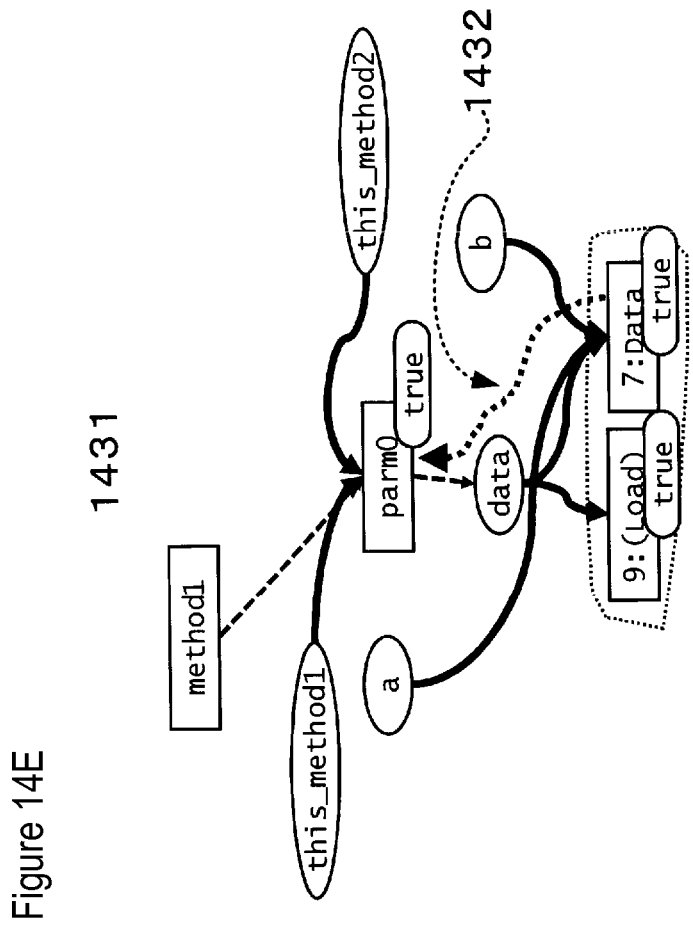
FIG. 14E is a diagram illustrating that pointer analysis is further necessary in the pointer analysis shown in the lower part of FIG. 13A.
Figure 14G:
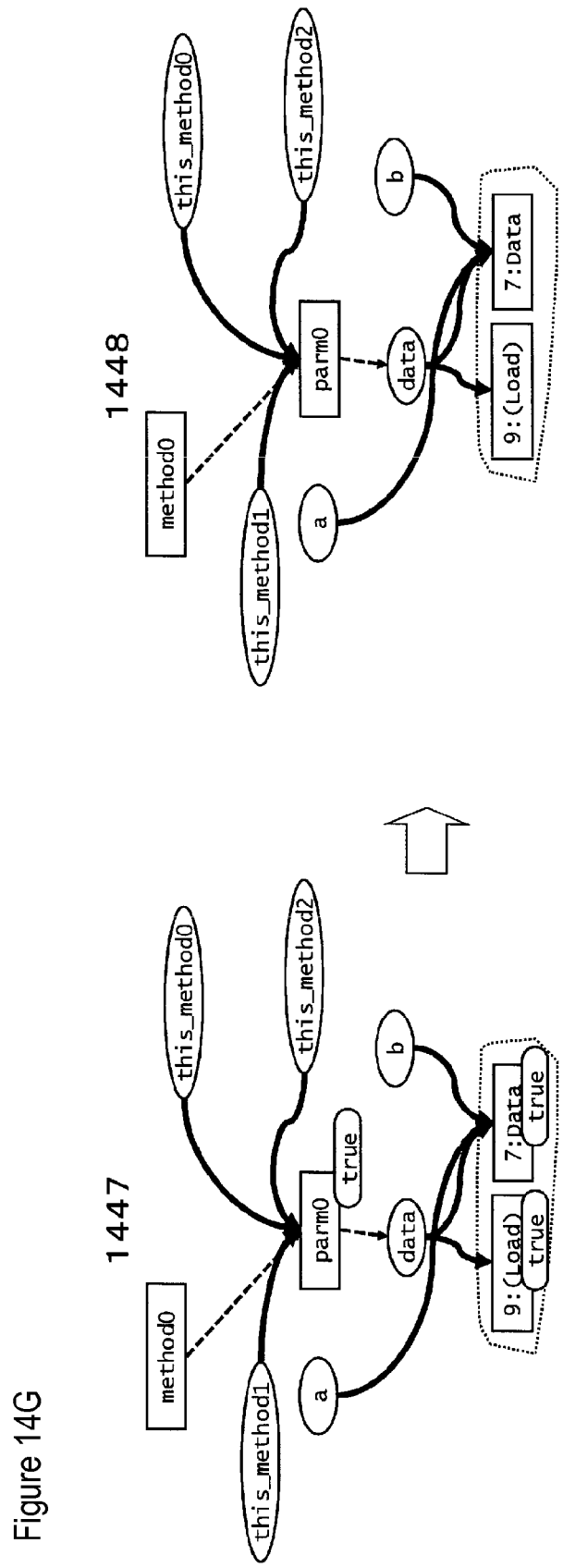
FIG. 14G is a diagram showing that a graph is further enlarged by the pointer analyses shown in the upper and lower parts of FIG. 13A.
Figure 14H:
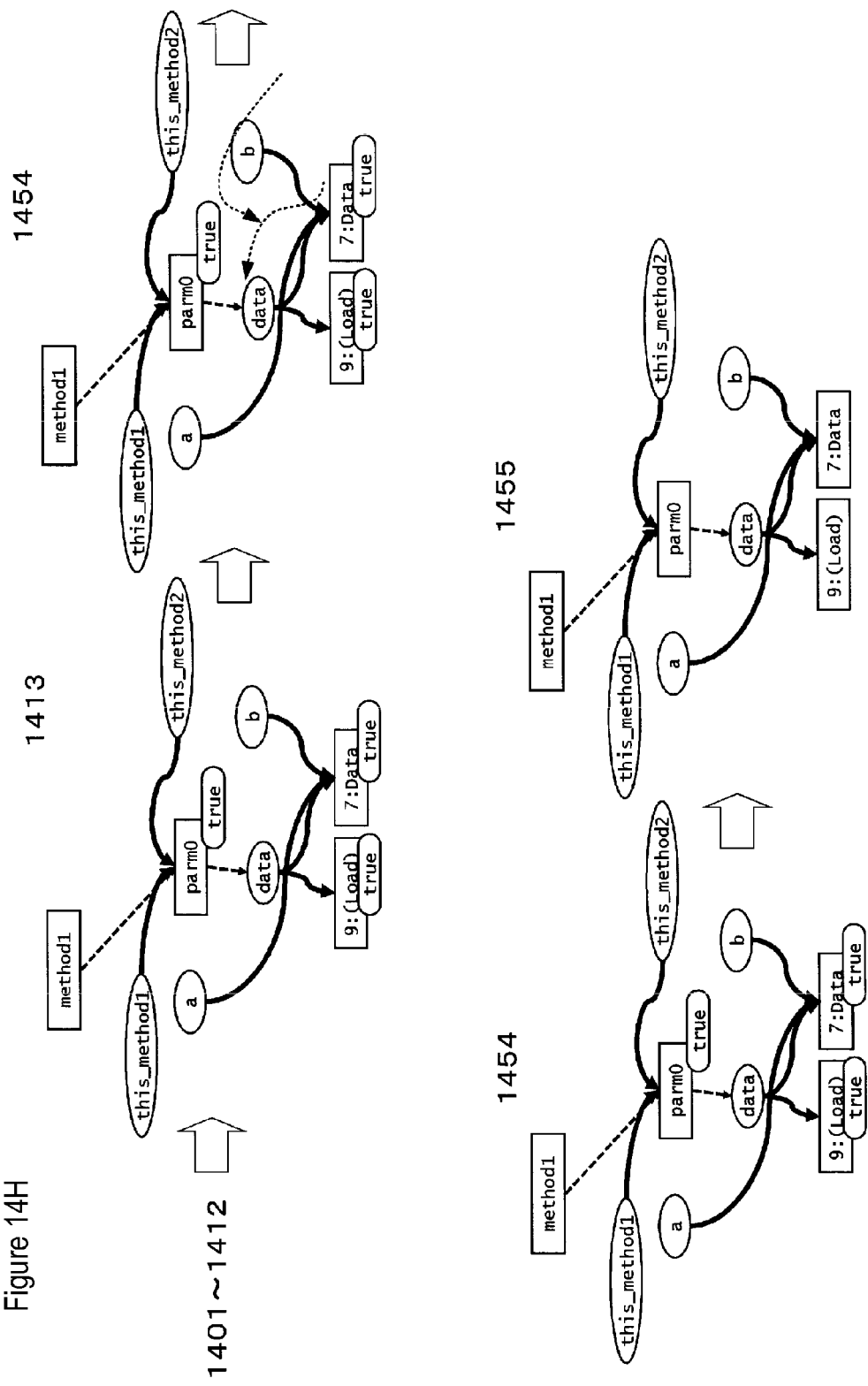
FIG. 14H is a diagram showing the details of generation of a point-to graph obtained by the pointer analysis shown in the upper part of FIG. 13B.

The details of generation of the point-to graph (1332) shown in the upper part of FIG. 13B is shown in FIG. 14H described below.

Referring to the lower part of FIG. 13B, the diagram in the lower part of FIG. 13B is a diagram showing that analysis by the unification-based technique, one of the flow-insensitive techniques, is combined with analysis by the incrementalized technique, a load node and a private field are prepared in a point-to graph, and the point-to graph is updated, in accordance with the aspect of the present invention.

Figure 14I:
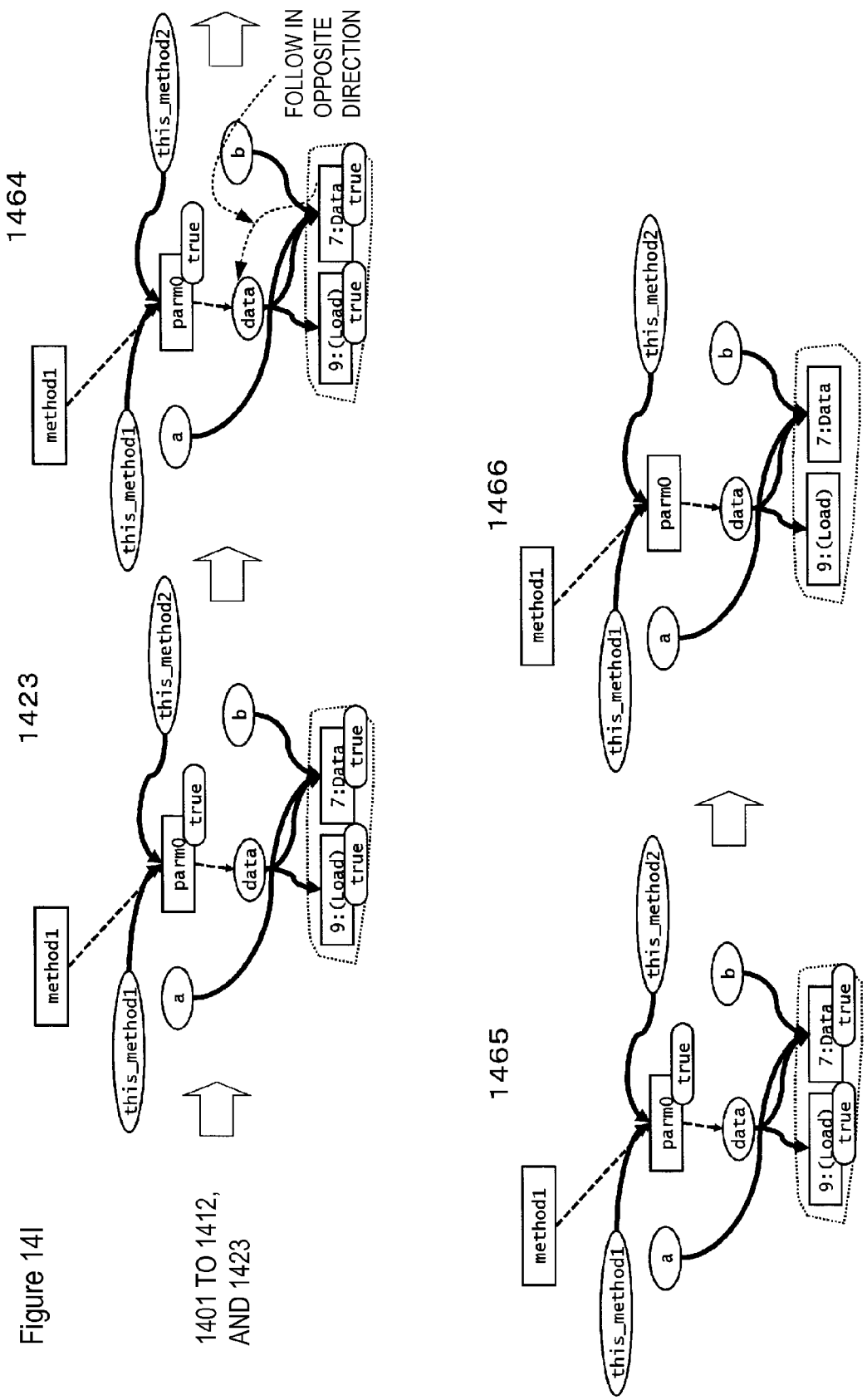
FIG. 14I is a diagram showing the details of generation of a point-to graph obtained by the pointer analysis shown in the lower part of FIG. 13B.

As stated in the description about the point-to graph (1332) in the upper part of FIG. 13B, since "parm0" escapes to a caller of "method1", "9: (Load)" is generated in response to loading of the instruction on the ninth line. However, in analysis by the unification-based technique (1341), "9: (Load)" and "7: Data" are integrated, unlike the analysis described in the upper part of FIG. 13B (1331). That is, in the analysis by the unification-based technique (1341), the "data" field of "parm0" pointed to by "method1" points to two objects, "9: (Load)" and "7: Data", and therefore, "9: (Load)" and "7: Data" are integrated and not distinguished from each other. A point-to graph generated as a result is a point-to graph (1342) shown in the lower part of FIG. 13B. The details of generation of the point-to graph (1342) is shown in FIG. 14I described below.

Referring to the upper part of FIG. 13C, the upper part of FIG. 13C is a diagram showing that a technique in which a load node and a private field are prepared in a point-to graph is combined with analysis by the incrementalized technique, and the point-to graph is updated, in accordance with the aspect of the present invention.

A program code (1301c) shown in FIG. 13C is a code which includes the program codes (1301a and 1301b) as a part thereof. It is assumed that there is a position to read in the "data" field on the sixteenth line also in addition to the ninth line in the program code (1301c). In this case, the computer has to analyze the position to access an object loaded by the sixteenth line in the program code (1301c) again. The computer also has to sniff "method3" (see the fifteenth line of the program code (1301c)). Otherwise, as stated in the description about FIG. 13A, it is necessary to further sniff "method0" in order to know the position where "7: Data" is accessed (see the third line of the program code (1301*c*)). However, which method between "method3" and "method0" is to be sniffed depends on analysis time or the amount of memory required. Therefore, a point-to graph (1352) shown in the upper part of FIG. 13C can be further larger depending on which method between "method3" and "method0" is sniffed.

Referring to the lower part of FIG. 13C, the diagram in the lower part of FIG. 13C is a diagram showing that analysis by the unification-based technique, one of the flow-insensitive techniques, is combined with analysis by the incrementalized technique, a load node and a private field are prepared in a point-to graph, and the point-to graph is updated, in accordance with the aspect of the present invention.

As stated in the description about the point-to graph (1352) in the upper part of FIG. 13C, since "parm0" escapes to a caller of "method1", "9: (Load)" is generated in response to loading of the instruction on the ninth line. However, in analysis by the unification-based technique (1361), "9: (Load)" and "7: Data" are integrated, unlike the analysis described in the upper part of FIG. 13C (1351). That is, in the analysis by the unification-based technique (1361), the "data" field of "parm0" pointed to by "method1" points to two objects, "9: (Load)" and "7: Data", and therefore, "9: (Load)" and "7: Data" are integrated and not distinguished from each other. A point-to graph generated as a result is a point-to graph (1362) shown in the lower part of FIG. 13C.

FIGS. 14A to 14C are diagrams showing the details of generation of the point-to graph (1312) obtained by the pointer analysis shown in the upper part of FIG. 13A. Graphs generated over time will be described below in order of generation. However, graphs shown in FIGS. 14A to 14C are not all the graphs generated over time.

A graph (1401) is a graph generated through a step of reading in the instruction on the sixth line in the program code (1301*a*) (corresponding to step 1702 in FIG. 17A).

A graph (1402) is a graph generated through a step of reading in the instruction on the seventh line (corresponding to step 1707 in FIG. 17B).

A graph (1403) is a graph generated through a step of reading in the instruction on the eighth line (corresponding to step 1713 in FIG. 17B).

A graph (1404) is a graph generated through a step of reading in the instructions on the ninth, tenth and eleventh lines (corresponding to step 1711 in FIG. 17B).

A graph (1405) is a graph generated through a step of initializing the escape attributes of all the objects nodes in the graph (1404) to "false" (corresponding to step 1802 in FIG. 18A).

A graph (1406) is a graph obtained through a step of causing the escape attributes of an object node indicating an argument (a parameter) object and an object node indicating a method-call return-value objects in the graph (1405) to be "true" (corresponding to step 1803 in FIG. 18A). In this example, the escape attribute of "parm0" changes to "true".

A graph (1407) is a graph obtained through a step of changing the escape attribute of the object ("parm0") pointed to by variables "return" and "arg1" in the graph (1406) to "true" (corresponding to step 1804 in FIG. 18A).

A graph (1408) is a graph obtained through a step of adding a load node "9: (Load)" into the graph (1407) (corresponding to steps 1805 and 1806 in FIG. 18A).

A graph (1409) is a graph obtained through a step of causing the escape attribute of an object ("9: Load") pointed to by an object ("7: Data") which has the escape attribute set to "true" to be "true" in the graph (1408) (corresponding to steps 1807 and 1808 in FIG. 18A). At this stage, the point-to graph related to "method1" is completed.

Here, it is assumed that the object for which it is desired to know an access position is, for example, "7: Data". As shown in a graph (1410), since the escape attribute of "7: Data" is "true" (see step 1809 in FIG. 18B), the arrow in the graph (1410) is followed in the opposite direction (see step 1810 in FIG. 18B), and the variable "arg1" is reached. Therefore, it is known that "7: Data" escapes to "8: method2" (see step 1813 in FIG. 18B). Therefore, it is not known that it is necessary to sniff "method2".

A graph (1411) is a graph generated through a step of reading in the instruction on the twelfth line to sniff "method2" (corresponding to step 1702 in FIG. 17A).

A graph (1412) is a graph generated through a step of reading in the instruction on the fourteenth line (corresponding to step 1702 in FIG. 17A).

A graph (1413) is a graph generated through a step of merging the graph (1412) related to "method2" into the graph (1410) related to "method1" (corresponding to step 1607 in FIG. 16). In this example, since "parm0" and "parm1" pointed to by "method2" in the graph (1412) correspond to "parm0" and "7: Data" pointed to by "method1" in the graph (1410), respectively, the corresponding objects are merged with each other. Since the call of "method2" on the eighth line in the code (1301*a*) has already been analyzed, "8: method2" is deleted.

A graph (1414) corresponds to the point-to graph (1312) obtained by the pointer analysis shown in the upper part of FIG. 13A except for that "8: method2" is deleted. The escape attribute is not described in the graph (1414) because the escape attribute is not described ordinarily.

FIG. 14D is a diagram showing the details of generation of the point-to graph (1322) obtained by the pointer analysis shown in the lower part of FIG. 13A. Graphs generated over time will be described below in order of generation. However, graphs shown in FIG. 14D are not all the graphs generated over time.

The graphs (1401 to 1412) in FIGS. 14A to 14C are generated by this pointer analysis also. Therefore, description thereof will be omitted.

A graph (1423) is a graph generated through a step of merging the graph (1412) related to "method2" into the graph (1410) related to "method1" (corresponding to step 1607 in FIG. 16). In this example, since "parm0" and "parm1" pointed to by "method2" in the graph 1412 correspond to "parm0" and "7: Data" pointed to by "method1" in the graph (1410), respectively, the corresponding objects are merged with each other. Since the call of "method2" on the eighth line in the code (1301*a*) has already been analyzed, "8: method2" is deleted. In the graph (1423), the "data" field of "parm0" pointed to by "method1" points to the two objects "9: (Load)" and "7: Data", "9: (Load)" and "7: Data" are integrated.

A graph (1424) corresponds to the point-to graph (1322) obtained by the pointer analysis shown in the lower part of FIG. 13A except for that "8: method2" is deleted. At this stage, the point-to graph related to "method2" is completed. The escape attribute is not described in the graph (1424) because the escape attribute is not described ordinarily.

FIG. 14E is a diagram illustrating that pointer analysis is further necessary in the pointer analysis shown in the lower part of FIG. 13A.

Here, it is assumed that the object for which it is desired to know an access position is, for example, "7: Data". A graph (1431) is the same as the graph (1423). As shown in the graph (1431), since the escape attribute of "7: Data" is "true" (see step 1809 in FIG. 18B), the arrow in the graph (1431) is followed in the opposite direction (1432) (see step 1810 in FIG. 18B), and "parm0" pointed to by "method1" is reached.

Therefore, it is known that "7: Data" escapes to the caller of "method1" (see step 1813 in FIG. 18B). Therefore, in the analysis by the ordinary incrementalized technique, it is necessary to further sniff "method0", the caller of "method1". Consequently, the graph is further enlarged.

FIGS. 14F and 14G are diagrams showing that a graph is further enlarged by the pointer analyses shown in the upper and lower part of FIG. 13A.

The graphs (1401 to 1412) in FIGS. 14A to 14C and the graph (1423) in FIG. 4D are generated by this pointer analysis also. Therefore, description thereof will be omitted.

A graph (1445) is a graph generated through a step of reading in the instruction on the third line in the code (1301a) to further sniff "method0", which is the caller of "method1" (corresponding to step 1702 in FIG. 17A).

A graph (1446) is a graph generated through a step of reading in the instructions on the fourth and fifth lines (corresponding to step 1712 in FIG. 17B).

A graph (1447) is a graph generated through a step of merging the graph (1446) related to "method0" into the graph (1444) related to "method1" (corresponding to step 1607 in FIG. 16). In this example, since "parm0" pointed to by "method0" in the graph (1446) corresponds to "parm0" pointed to by "method1" in the graph (1444), the corresponding objects are merged with each other. Since the call of "method1" on the fourth line in the code (1301a) has already been analyzed, "4: method1" is deleted.

A graph (1448) is a graph showing a result of analysis of "method0". The graph (1448) is larger than the graph (1424). In the graph (1447), since the escape attribute of "7: Data" is "true" (see step 1809 in FIG. 18B), the arrow in the graph (1447) is followed in the opposite direction (see step 1810 in FIG. 18B), and "parm0" pointed to by "method0" is reached. Therefore, it is known that "7: Data" escapes to a caller of "method0" (see step 1813 in FIG. 18B). Therefore, in the analysis by the ordinary incrementalized technique, it is necessary to further sniff a method which is the caller of "method0". Consequently, the graph is further enlarged.

FIG. 14H is a diagram showing the details of generation of a point-to graph obtained by the pointer analysis shown in the upper part of FIG. 13B. Graphs generated over time will be described below in order of generation. However, graphs shown in FIG. 14H are not all the graphs generated over time.

The graphs (1401 to 1412) in FIGS. 14A to 14C and the graph (1413) in FIG. 14C are generated by this pointer analysis also. Therefore, description thereof will be omitted.

In a graph (1454), since the escape attribute of "7: Data" is "true" (see step 1809 in FIG. 18B), the arrow in the graph (1454) is followed in the opposite direction (see step 1810 in FIG. 18B), and the "data" field of "parm0" pointed to by "method1" is reached. The data field is a private field, and the position to read the data field is only the ninth line in the code (1301b). Here, a load node ("9: Data") corresponding to an object read by the ninth line is already analyzed. Therefore, it is not necessary to further sniff "method0", the caller of "method1". Thus, according to the aspect of the present invention, since the analysis does not reach "parm0" from "7: Data", "7: Data" is regarded as not escaping (see step 1813 in FIG. 18B). Therefore, the pointer analysis shown in the upper part of FIG. 13B ends at this stage (which corresponds to No for step 1605 in FIG. 16). Therefore, subsequent analysis is not performed any more, and thereby, it is possible to shorten the analysis time and reduce the memory required.

FIG. 14I is a diagram showing the details of generation of the point-to graph (1342) obtained by the pointer analysis shown in the lower part of FIG. 13B. Graphs generated over time will be described below in order of generation. However, graphs shown in FIG. 14I are not all the graphs generated over time. A graph (1464) is the same as the graph (1423).

The graphs (1401 to 1412) in FIGS. 14A to 14C and the graph (1423) in FIG. 14D are generated by this pointer analysis also. Therefore, description thereof will be omitted.

In the graph (1464), since the escape attribute of "7: Data" is "true" (see step 1809 in FIG. 18B), the arrow in the graph (1464) is followed in the opposite direction (see step 1810 in FIG. 18B), and the "data" field of "parm0" pointed to by "method1" is reached. The data field is a private field, and the position to read the data field is only the ninth line in the code (1301b). Here, a load node ("9: Data") corresponding to an object read by the ninth line is already analyzed. Therefore, it is not necessary to further sniff "method0", the caller of "method1". Thus, according to the aspect of the present invention, since the analysis does not reach "parm0" from "7: Data", "7: Data" is regarded as not escaping (see step 1813 in FIG. 18B). Therefore, the pointer analysis shown in the lower part of FIG. 13B ends at this stage (which corresponds to No for step 1605 in FIG. 16). Therefore, subsequent analysis is not performed any more, and thereby, it is possible to shorten the analysis time and reduce the memory required.

Figure 15A:
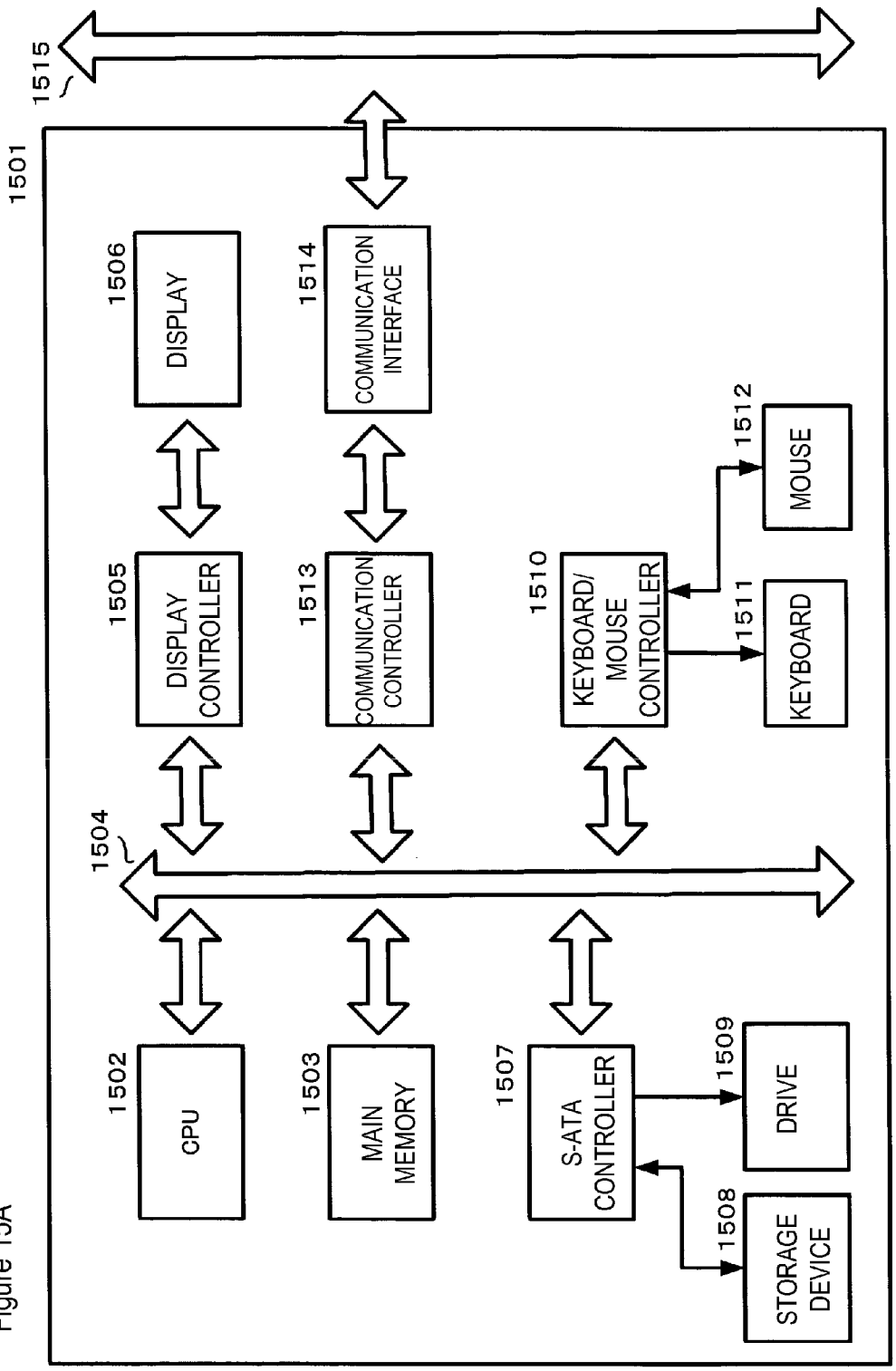
FIG. 15A shows a basic block diagram of computer hardware in an embodiment of the present invention.

FIG. 15A shows a basic block diagram of computer hardware in the embodiment of the present invention.

A computer (1501) is provided with a CPU (1502) and a main memory (1503), and these are connected to a bus (1504). The CPU (1502) is preferably based on a 32-bit or 64-bit architecture. For example, Core i™ Series, Core 2™ Series, Atom™ Series, Xeon™ Series, Pentium® Series or Celeron® Series by Intel Corporation, or Phenom™ Series, Athlon™ Series, Turion™ Series, or Sempron™ by Advanced Micro Devices, Inc. can be used. To the bus (1504), a display (1506), for example, a liquid crystal display (LCD), can be connected via a display controller (1505). The display (1506) is used to display information about the computer connected to a network via a communication line and information about software operating on the computer by an appropriate graphic interface for management of the computer. To the bus (1504), a storage device (1508), for example, a hard disk or a silicon disk, and a drive (1509), for example, a CD, DVD or BD drive can be also connected via an SATA or IDE controller (1507). To the bus (1504), a keyboard (1511) and a mouse (1512) can be also connected via a keyboard/mouse controller (1510) or a USB bus (not shown).

In the storage device (1508), an operating system, a Java® processing environment such as J2EE, a Java® application, a Java® Virtual Machine (VM), a program providing a Java® Just In Time (JIT) compiler, other programs and data are stored so that they can be loaded onto the main memory.

The drive (1509) is used to install a program from a CD-ROM, a DVD-ROM or a BD into the storage device (1508) as necessary.

A communication interface (1514) is in conformity with, for example, the Ethernet® protocol. The communication interface (1514) is connected to the bus (1504) via a communication controller (1513) and plays a role of physically connecting the computer (1501) to a communication line (1515), and it provides a network interface layer for the TCP/IP communication protocol, which is the communication function of the operating system of the computer (1501). The communication line can be in a wired LAN environment or a wireless LAN environment based on a wireless LAN connection standard such as IEEE802.11a/b/g/n.

Figure 15B:
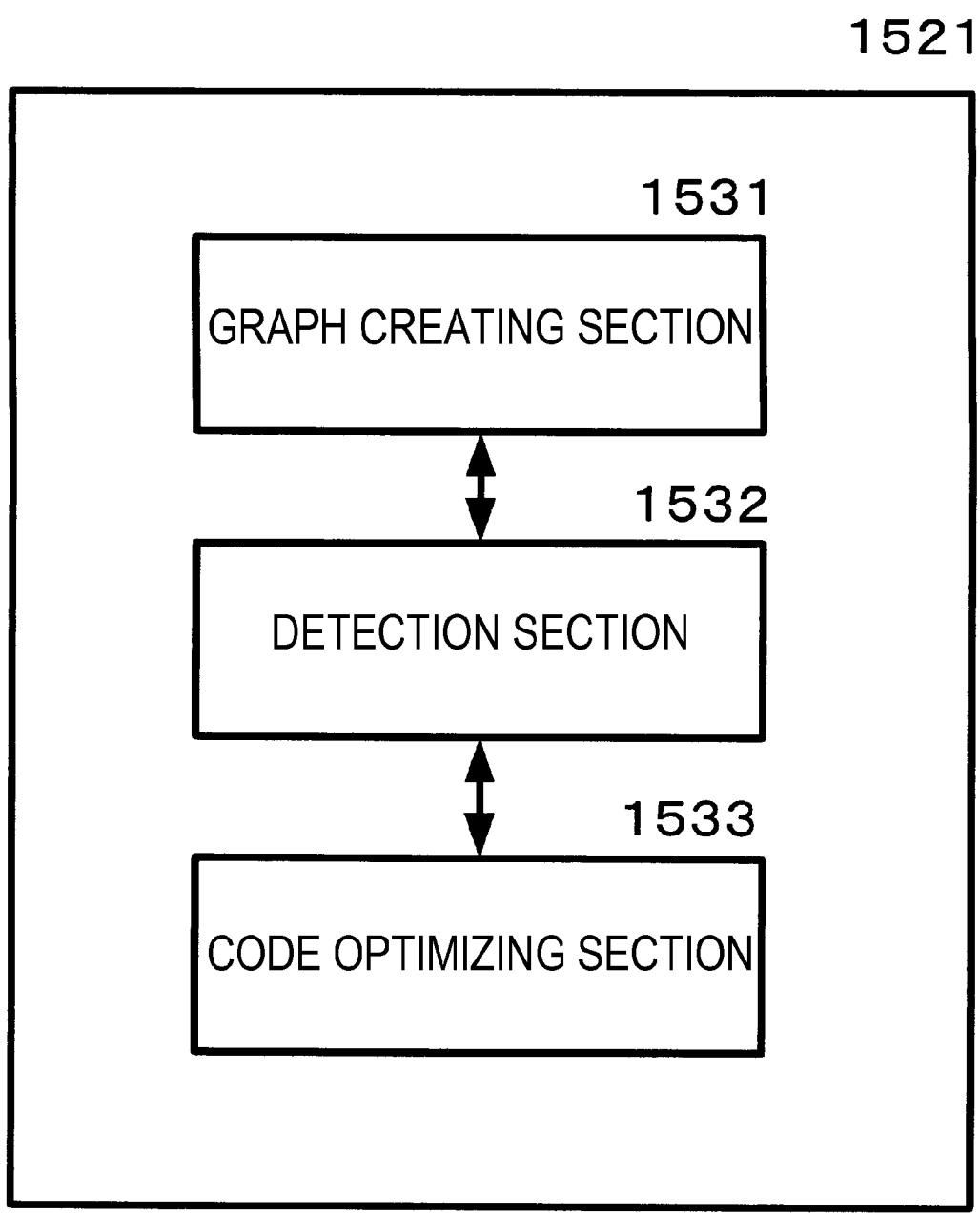
FIG. 15B shows a functional block diagram of a system having the functions of the computer hardware shown in FIG. 15A, which is in accordance with an aspect of the present invention.

FIG. 15B shows a functional block diagram of a system having the functions of the computer hardware shown in FIG. 15A, which is in accordance with an aspect of the present invention.

FIG. 15B shows a functional block diagram of a compiler section (1521) provided for the computer (1501) in accordance with the aspect of the present invention.

The computer (1501) is provided with the compiler section (1521) in addition to, for example, the CPU (1502), the main memory (1503) and the storage device (1508) shown in FIG. 15A. The compiler section (1521) is provided with a graph creating section (1531) and a detection section (1532). The computer (1501) can be further provided with a code optimizing section (1533).

The graph creating section (1531) creates one flow-insensitive point-to graph for an analysis target program or a partial program thereof, in the main memory (1503) or the storage device (1508) by the compiler, with a compiling target method as a target.

In one aspect of the present invention, in order to create the one point-to graph in the memory, the graph creating section (1531) executes:

(a) when an object for which it is desired to detect an access position is identified, creating a first flow-insensitive point-to graph for a method generating the identified object (a first method); and (b) detecting whether or not the object for which it is desired to detect an access position escapes to at least one method which is a caller of the first method (a first caller method) or at least one method which is called by the first method (a first callee method), using the created first point-to graph. The graph creating section (1531) includes preparing a first load node in the first point-to graph and updating the first point-to graph on condition that a field of at least one object in the first point-to graph is (1) reachable from the first caller method or the first callee method and (2) in a state of not pointing to an object in the first point-to graph. In other words, the graph creating section (1531) inhibits preparation of the first load node in the first point-to graph if the field of at least one object in the first point-to graph is not reachable from the first caller method and not reachable from the first callee method, or the field is in a state of pointing to an object in the first point-to graph. Here, the first load node is used to detect whether or not the object for which it is desired to detect an access position escapes, in the updated first point-to graph.

In the one aspect of the present invention, the graph creating section (1531) can further execute:

(c) when the object for which it is desired to detect an access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared;

(d) detecting whether or not the object for which it is desired to detect an access position escapes to a method which has not been analyzed yet among caller methods of a method analyzed in the past steps (a second caller method) or a method which has not been analyzed yet among methods called by the method analyzed in the past steps (a second callee method), using the merged first point-to graph, the detecting including preparing a second load node in the merged first point-to graph and updating the merged first point-to graph on condition that a field of at least one object in the merged first point-to graph is (1) reachable from the second caller method or the second callee method and (2) in a state of not pointing to an object in the merged first point-to graph, where the second load node is used to detect whether or not the object for which it is desired to detect an access position escapes in the updated, merged first point-to graph; and (e) repeating (c) and (d) described above until the object for which it is desired to detect an access position stops escaping or until analyzed methods other than the first method reach a predetermined threshold.

In one aspect of the present invention, the detection section (1532) detects, when the object for which it is desired to detect an access position does not escape to the first caller method or the first callee method, a position to access the object for which it is desired to detect an access position, by following the updated first point-to graph if the first load node is prepared and by following the first point-to graph if the first load node is not prepared.

In the one aspect of the present invention, detecting a position to access the object for which it is desired to detect an access position is executed by following a point-to graph obtained in the end at the step (e).

The code optimizing section (1533) optimizes a code using an access position detected by the detection section (1532). The optimization of a code includes, for example, inserting a cache flush instruction at an access point which can possibly be the last access point, allocating an object which seems not to be accessed to memory in a compressed format, relocating a field in an object, and lazily allocating an object to the memory.

FIG. 16 is a flowchart of a pointer analysis method in accordance with an aspect of the present invention.

At step 1601, the computer (1501) starts an algorithm for analyzing a pointer in an analysis target program or a partial program thereof.

At step 1602, the graph creating section (1531) of the computer (1501) recognizes an object for which it is desired to detect an access position, which has been identified by the developer or the computer (1501). When the developer identifying the object for which it is desired to detect an access position, he identifies one or more objects in a development environment, for example, using a graphical user interface. When the computer (1501) identifies the object for which it is desired to detect an access position, for example, the code optimizing section (1533) of the computer (1501) identifies one or more objects from an analysis target program or a partial program thereof.

At step 1603, the graph creating section (1531) creates a flow-insensitive point-to graph for a method which generates the object identified at step 1602. Hereinafter, this point-to graph will be called a first point-to graph for convenience. Here, if there are multiple objects for which it is desired to detect an access position, at step 1602, the first point-to graph can be created for a method (the first method) which generates each of the identified objects. The details of creation of the first point-to graph will be described in more detail with reference to FIG. 17.

At step 1604, the graph creating section (1531) detects whether or not the object identified at step 1602 escapes to at least one method which is a caller of the first method (a first caller method) or at least one method which is called by the first method (a first callee method), using the first point-to graph. An algorithm for determining whether the object escapes or not will be described in more detail with reference to FIGS. 18A and 18B.

At step 1605, the graph creating section (1531) advances the process to step 1606 if the object identified at step 1602 escapes to the first caller method or the first callee method according to the condition of step 1604. On the other hand, if the object does not escape, the graph creating section (1531) advances the process to step 1608.

At step 1606, the graph creating section (1531) judges whether, for example, the total size of, the analysis time for, or the amount of memory required for methods analyzed before the step is below a predetermined threshold. In the case of being below the predetermined threshold, the graph creating section (1531) advances the process to step 1607. On the other hand, in the case of being equal to or above the predetermined threshold, the graph creating section (1531) advances the process to step 1608.

At step 1607, the graph creating section (1531) creates a flow-insensitive point-to graph for the caller method (the first caller method) or the callee method (the first callee method) which is the escape destination. Hereinafter, this point-to graph will be called a second point-to graph for convenience. The details of creation of the second point-to graph will be described in more detail with reference to FIGS. 17A and 17B, similarly to creation of the first point-to graph. Then, the graph creating section (1531) merges the second point-to graph into the first point-to graph created at step 1603 or into a point-to graph (the first point-to graph updated) obtained by adding a load node prepared at step 1604 (more particularly, step 1806 in FIG. 18A) to the first point-to graph created at step 1603. As a result, the merged first point-to graph is created. When the updated first point-to graph is created, the graph creating section (1531) returns to step 1604, and detects whether or not the object identified at step 1602 escapes to a method which has not been analyzed yet among caller methods of a methods which have been analyzed in the past steps (a second caller method) or a method which has not been analyzed yet among methods called by the methods which have been analyzed in the past steps (a second callee method), using the updated first point-to graph. Subsequently, steps 1604 to 1607 are repeated until the process proceeds from step 1605 or 1606 to step 1608.

At step 1608, the detection section (1532) detects a position to access the object for which it is desired to detect an access position, by following the first point-to graph created at step 1603, or the first point-to graph updated at step 1604 and the first point-to graph merged at step 1607.

At step 1609, the computer (1501) ends the algorithm for analyzing a pointer.

FIGS. 17A and 17B are detailed flowcharts of the steps (1603 and 1607) of creating a flow-insensitive point-to graph in the flowchart in FIG. 16.

At step 1701, the graph creating section (1531) starts an algorithm for creating a point-to graph. The point-to graph is the graph created at step 1603 or 1607 in FIG. 16.

At step 1702, the graph creating section (1531) initializes a point-to graph which includes (1) an object node indicating an argument (a parameter) object of an analysis target method (for example, "parm0" in FIGS. 13B and 13C) and (2) a variable node indicating a return value of the analysis target method (for example, "return" in FIGS. 11A and 11B). Then, the graph creating section (1531) sequentially adds object nodes and variable nodes to the point-to graph at steps after step 1702.

At step 1703, the graph creating section (1531) judges whether all lines of an analysis-target method have been read in. If all lines of an analysis-target methods have not been read in, the graph creating section (1531) advances the process to step 1704. On the other hand, if all the analysis-target methods have been read in, the graph creating section (1531) advances the process to step 1714.

At step 1704, the graph creating section (1531) reads, from an analysis-target method, one line among instructions related to the method into the memory.

At step 1705, the graph creating section (1531) checks whether the read-in one line is a program existing in a program area executed frequently. If the read-in one line is a program existing in a program area executed frequently, the graph creating section (1531) advances the process to step 1706 (to FIG. 17B). On the other hand, if the read-in one line is not a program existing in a program area executed frequently, the graph creating section (1531) returns the process to step 1703. Step 1705 is an arbitrary step, and the graph creating section (1531) can skip step 1705 and advance the process from step 1703 to step 1706.

At step 1706, the graph creating section (1531) judges whether the read-in one line is an object allocation sentence. If the read-in one line is an object allocation sentence, the graph creating section (1531) advances the process to step 1707. On the other hand, if the read-in one line is not an object allocation sentence, the graph creating section (1531) advances the process to step 1708.

Figure 17C:
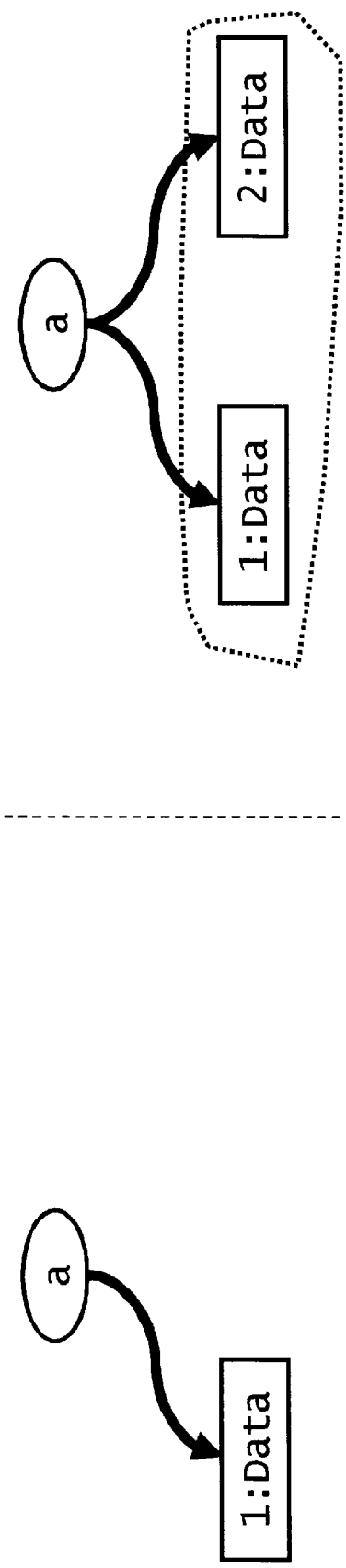
FIG. 17C is a graph for illustrating an example of graph generation performed at step 1707 in FIG. 17B.

At step 1707, the graph creating section (1531) adds an ordinary object node to the point-to graph newly created at step 1702 or the point-to graph updated at step 1707, 1709, 1711 or 1713 and integrates (1) the added ordinary object node with (2) an object node pointed to by a substitution-destination local variable node. FIG. 17C shows an example of the graph generation performed at step 1707. When the integration ends, the graph creating section (1531) returns the process to step 1703.

At step 1708, the graph creating section (1531) judges whether the read-in one line is a copy sentence. If the read-in one line is a copy sentence, the graph creating section (1531) advances the process to step 1709. On the other hand, if the read-in one line is not a copy sentence, the graph creating section (1531) advances the process to step 1710.

At step 1709, the graph creating section (1531) integrates an object node pointed to by a substitution-source local variable node with an object node pointed to by a substitution-destination local variable node, in the point-to graph updated at step 1702 or the point-to graph updated at step 1707, 1709, 1711 or 1713. When the integration ends, the graph creating section (1531) returns the process to step 1703.

At step 1710, the graph creating section (1531) judges whether the read-in one line is a load/store sentence. If the read-in one line is a load/store sentence, the graph creating section (1531) advances the process to step 1711. On the other hand, if the read-in one line is not a load/store sentence, the graph creating section (1531) advances the process to step 1712.

At step 1711, in the point-to graph updated at step 1702 or the point-to graph updated at step 1707, 1709, 1711 or 1713, the graph creating section (1531) adds a field variable node of a load/store target object ("next" in FIG. 11B) if the field variable node of the load/store target object does not exist, and integrates (1) an object node pointed to by the added field variable node with (2) an object node pointed to by a substitution-source (in the case of a store sentence) or substitution-destination (in the case of a load sentence) local variable node. FIG. 17D shows an example of the graph generation performed at step 1711. When the integration ends, the graph creating section (1531) returns the process to step 1703.

At step 1712, the graph creating section (1531) judges whether the read-in one line is a method call sentence. If the read-in one line is a method call sentence, the graph creating section (1531) advances the process to step 1713. On the other hand, if the read-in one line is not a method call sentence, the graph creating section (1531) returns the process to step 1703.

Figure 17E:
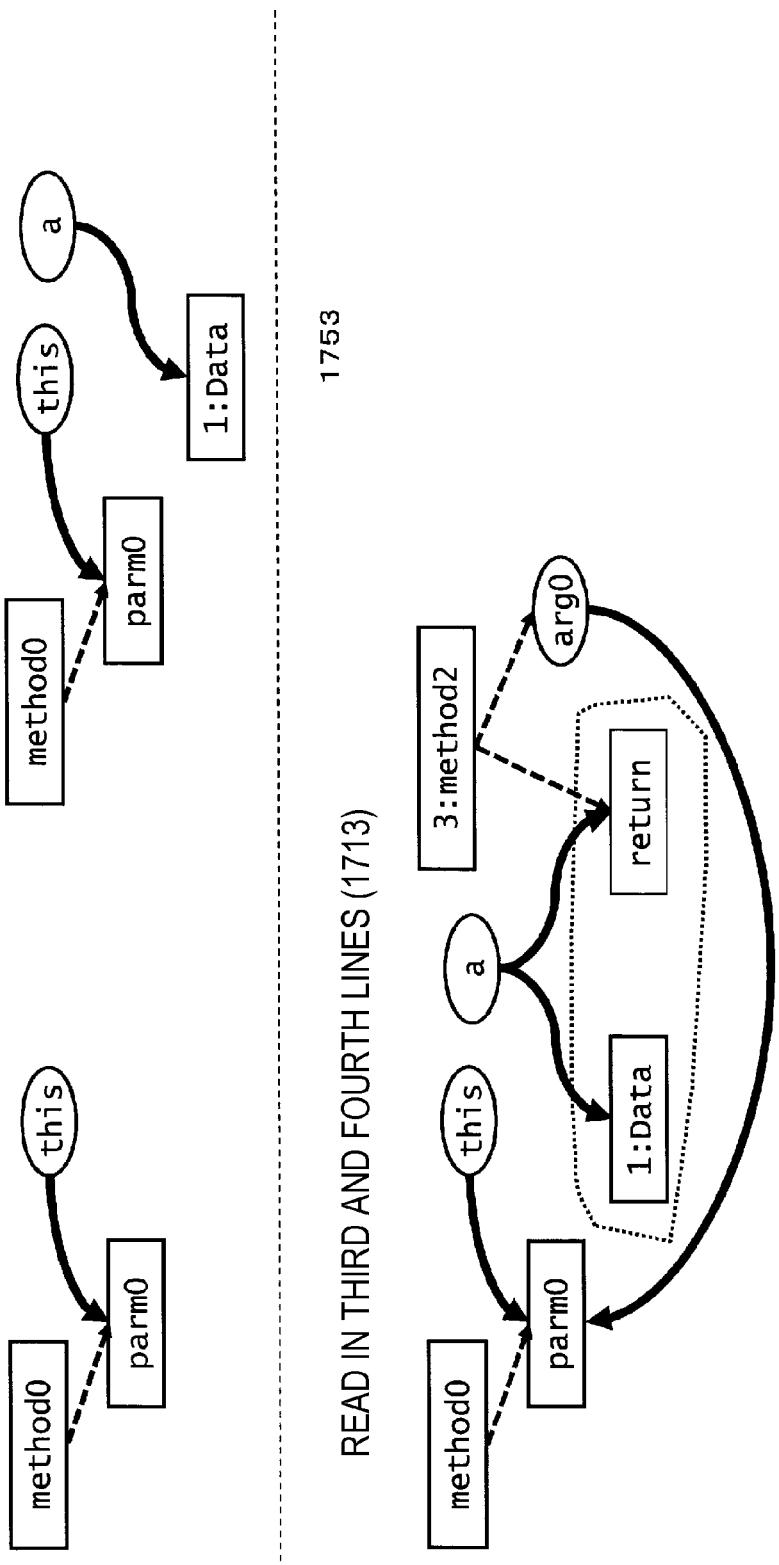
FIG. 17E is a graph for illustrating an example of graph generation performed at step 1713 in FIG. 17B.

At step 1713, the graph creating section (1531) adds a method node (a method which has not been sniffed yet at this stage but can be sniffed at a later stage), a variable node indicating a method call argument (for example, "arg1" in FIGS. 10B, 11A and 11B) and an object node indicating an object for a method call return value to the point-to graph updated at step 1702 or the point-to graph updated at step 1707, 1709, 1711 or 1713; forms an edge from the variable node indicating the argument to an object node to be substituted into the argument; and integrates (1) an object node indicating the object for the return value with (2) an object node pointed to by a local variable which is a substitution destination of the return value. FIG. 17E shows an example of the graph generation performed at step 1713. When the integration ends, the graph creating section (1531) returns the process to step 1703.

At step 1714, the graph creating section (1531) ends the algorithm for creating a point-to graph.

FIG. 17C is a graph for illustrating an example of the graph generation performed at step 1707 in FIG. 17B. It is assumed that a part of an analysis target program is a program code (1721).

Step 1731 is executed at step 1707, and, at step 1731, the graph creating section (1531) reads the first line in the code (1721) into the memory and generates a graph.

Step 1732 is executed at step 1707, and, at step 1732, the graph creating section (1531) reads the second line into the memory and generates a graph. At this step, an ordinary object node ("2: Data") and an object node ("1: Data") pointed to by a variable node a are integrated.

FIG. 17D is a graph for illustrating an example of the graph generation performed at step 1711 in FIG. 17B. It is assumed that a part of an analysis target program is a program code (1722).

Step 1741 is executed at step 1707, and, at step 1741, the graph creating section (1531) reads the first, second, third and fourth lines in the code (1722) into the memory and generates a graph.

Step 1742 is executed at step 1711, and, at step 1742, the graph creating section (1531) reads the fifth line into the memory and generates a graph. At this step, a field variable node "next" is added.

Step 1743 is executed at step 1711, and, at step 1743, the graph creating section (1531) reads the sixth line into the memory and generates a graph. At this step, an object node ("2: Data") pointed to by the field variable node "next" and an object node ("3: Data") pointed to by a variable node c pointing to the object node ("2: Data") are integrated.

Step 1744 is executed at step 1711, and, at step 1744, the graph creating section (1531) reads the seventh line into the memory and generates a graph. At this step, object nodes ("2: Data" and "3: Data") pointed to by the field variable node "next" and an object node ("4: Data") pointed to by a variable node d are integrated.

FIG. 17E is a graph for illustrating an example of the graph generation performed at step 1713 in FIG. 17B. It is assumed that a part of an analysis target program is a program code (1723).

Step 1751 is executed at step 1702, and, at step 1751, the graph creating section (1531) reads the first line in the code (1723) into the memory and generates a graph.

Step 1752 is executed at step 1707, and, at step 1752, the graph creating section (1531) reads the second line into the memory and generates a graph.

Step 1753 is executed at step 1713, and, at step 1753, the graph creating section (1531) reads the third and fourth lines into the memory and generates a graph. At this step, the object node ("return") indicating the return value object and an object node ("1: Data") pointed to by the local variable "a" which is a substitution destination of the return value are integrated.

Figure 18B:
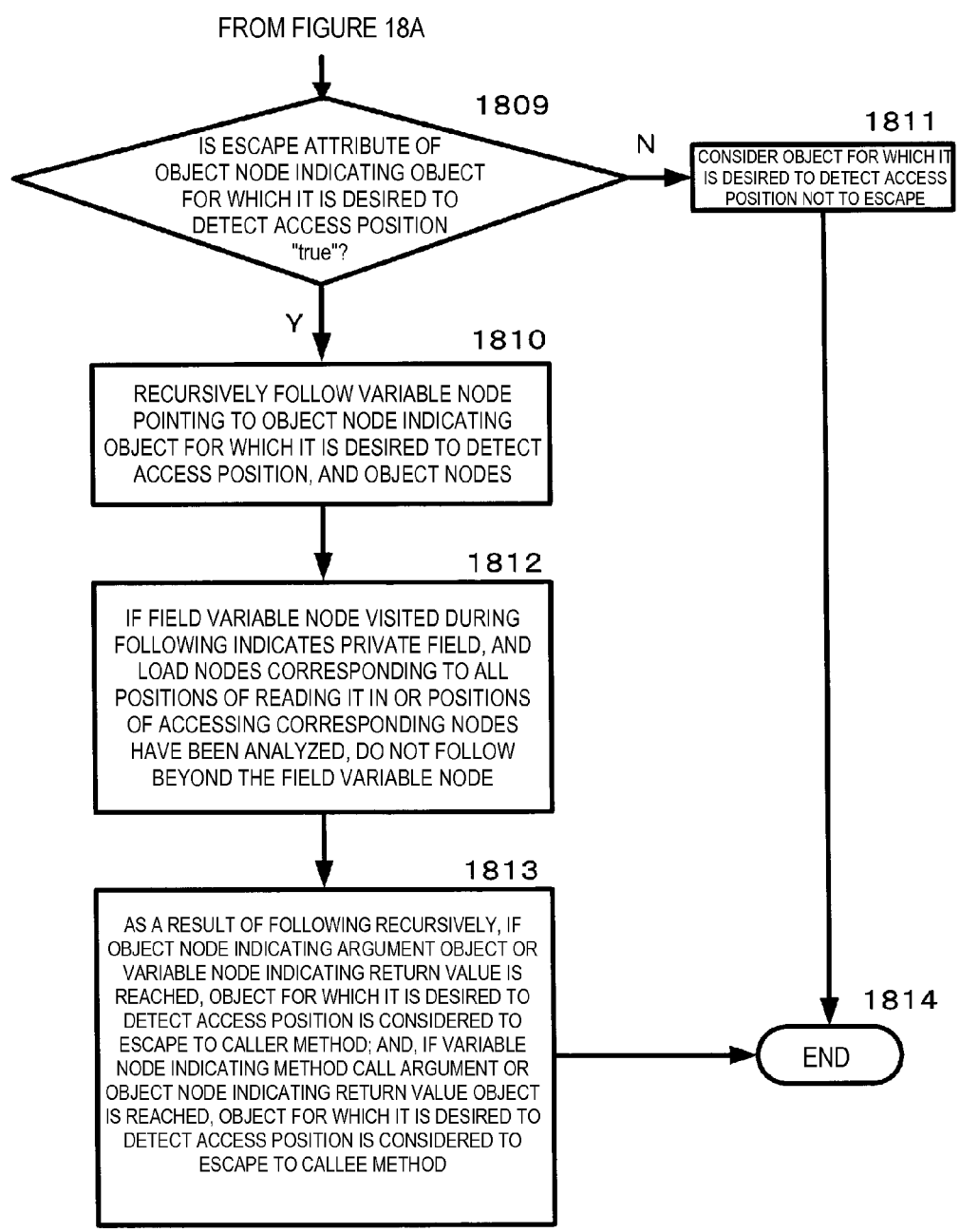
FIG. 18B is a detailed flowchart of a step (1604) of detecting whether or not an object for which it is desired to detect an access position escapes to a caller method or a callee method, using a flow-insensitive point-to graph in the flowchart of FIG. 16.

FIGS. 18A and 18B are detailed flowcharts of the step (1604) of detecting whether or not an object for which it is desired to detect an access position escapes to a caller method or a callee method, using a flow-insensitive point-to graph in the flowchart in FIG. 16.

At step 1801, the graph creating section (1531) starts an algorithm for detecting whether or not the object for which it is desired to detect an access position escapes to a caller method or a callee method.

At step 1802, the graph creating section (1531) initializes the escape attributes of all the object nodes in the point-to graph created at step 1603 or the point-to graph updated at step 1604 or 1607 to "false".

At step 1803, the graph creating section (1531) sets the escape attributes of object nodes indicating an argument (a parameter) object (for example, "parm0" in FIGS. 13B and 13C) and object nodes indicating an object for a method call return value to "true".

At step 1804, the graph creating section (1531) sets the escape attributes of object nodes (for example, "2: Data" and "10: Data" in FIG. 10B) pointed to by a variable node indicating a method call return value ("return" in FIG. 10B) and a variable node indicating a method call argument (for example, "arg1" in FIGS. 10B, 11A and 11B) to "true".

At step 1805, the graph creating section (1531) judges whether the field variable node of an object node which has the escape attribute set to is "true" points to any object node. If the field variable node points to any object node, the graph creating section (1531) advances the process to step 1807. On the other hand, if the field variable node does not point to any object node, the graph creating section (1531) advances the process to step 1806.

At step 1806, the graph creating section (1531) prepares a load node in the point-to graph created at step 1603, or the point-to graph updated at step 1604 or 1607, and updates the point-to graph so that the load node is pointed to by the field variable node of the object node which has the escape attribute set to "true" at step 1805.

At step 1807, the graph creating section (1531) judges whether the field variable node of an object node which has the escape attribute set to "true" points to an object node which has the escape attribute set to "false". If the field variable node points to an object node which has the escape attribute set to "false", the graph creating section (1531) advances the process to step 1808. On the other hand, if the field variable node does not point to an object node which has the escape attribute set to "false", the graph creating section (1531) advances the process to step 1809 (to FIG. 18B).

At step 1808, the graph creating section (1531) changes the escape attribute of the object node pointed to by the field variable node of the object node which has the escape attribute set to "true", to "true".

At step 1809, the graph creating section (1531) judges whether the escape attribute of an object node indicating the object for which it is desired to detect an access position is "true". If the escape attribute is "true", the graph creating section (1531) advances the process to step 1810. On the other hand, if the escape attribute is not "true", the graph creating section (1531) advances the process to step 1811.

At step 1810, if the escape attribute of the object node indicating the object node for which it is desired to detect an access position is "true", the graph creating section (1531) recursively follows a variable node pointing to the object node indicating the object for which it is desired to detect an access position, and object nodes (object nodes existing in the program other than the object node for which it is desired to detect an access position). If reaching an object node indicating an argument (a parameter) object or a variable node indicating a return value, the graph creating section (1531) considers the object for which it is desired to detect an access position to escape to a caller method. If reaching a variable node indicating a method call argument or an object node indicating a return value object, the graph creating section (1531) considers the object for which it is desired to detect an access position to escape to a callee method.

At step 1811, if the escape attribute of the object node for which it is desired to detect an access position is not "true", the graph creating section (1531) considers the object node indicating the object for which it is desired to detect an access position not to escape.

At step 1812, if a field variable node visited during the round indicates a private field, and load nodes corresponding to all read positions or access positions of the corresponding nodes have already been analyzed (for example, they can be reached by following the edge in the opposite direction, from the object for which it is desired to detect an access position), the graph creating section (1531) does not follow beyond the field variable node.

At step 1813, if reaching an object node indicating an argument (a parameter) object or a variable node indicating a return value as a result of recursively following nodes, the graph creating section (1531) considers the object for which it is desired to detect an access position to escape to a caller method. If reaching a variable node indicating a method call argument or an object node indicating a return value object, the graph creating section (1531) considers the object for which it is desired to detect an access position to escape to a callee method.

At step 1814, the graph creating section (1531) ends the algorithm for detecting whether or not an object for which it is desired to detect an access position escapes to a caller method or a callee method.

Figure 19:
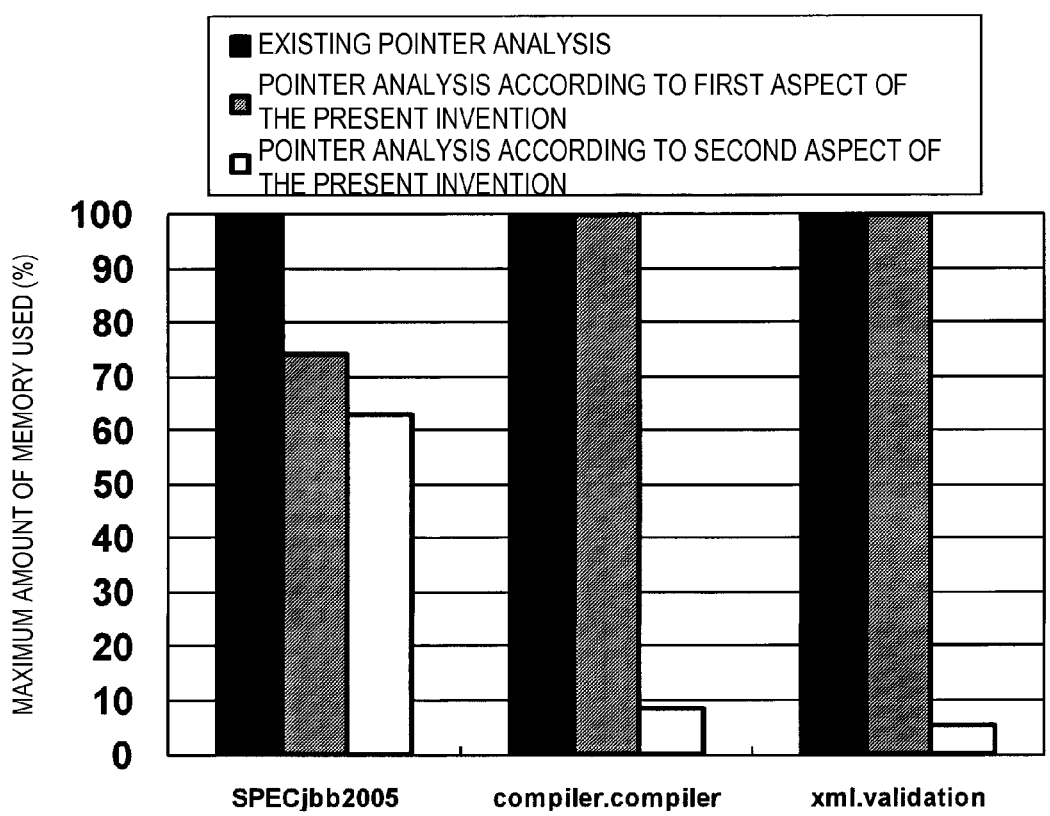
FIG. 19 is a diagram showing a result of an experiment on the effect of reducing the amount of memory used in pointer analysis in accordance with an aspect of the present invention.

FIG. 19 is a diagram showing a result of an experiment on the effect of reducing the amount of memory used in pointer analysis in accordance with an aspect of the present invention.

The experiment was evaluated by implementing the pointer analysis algorithms shown below in IBM™ PPC-32 J9/TR Java™ 6 (SR6) on Linux™ p6 4.7 GHz×16. The pointer analysis algorithms are: (1) existing pointer analysis (analysis by a simple flow-insensitive technique); (2) pointer analysis according to the first aspect of the present invention (analysis in consideration of a private field; see FIGS. 13A to 13C); and (3) pointer analysis according to the second aspect of the present invention (suppression of generation of an unnecessary load node; see FIG. 11A). As benchmark software, three kinds of benchmark programs were used: SPEC (Standard Performance Evaluation Corporation) jbb2005 (Java Server Benchmark), compiler.compiler, and xml.validation. The result of the experiment is shown in FIG. 19.

(Benchmark Result by SPECjbb2005)

In the pointer analysis according to the first aspect of the present invention, the maximum amount of memory used is suppressed to 74% in comparison with the existing pointer analysis. In the pointer analysis according to the second aspect of the present invention, the maximum amount of memory used is suppressed to 62.9% in comparison with the existing pointer analysis.

(Benchmark Result by compiler.compiler)

In the pointer analysis according to the second aspect of the present invention, the maximum amount of memory used is decreased to 8.6% in comparison with the existing pointer analysis.

(Benchmark Result by xml.validation)

In the pointer analysis according to the second aspect of the present invention, the maximum amount of memory used is decreased to 5.2% in comparison with the existing pointer analysis.

Figure 20:
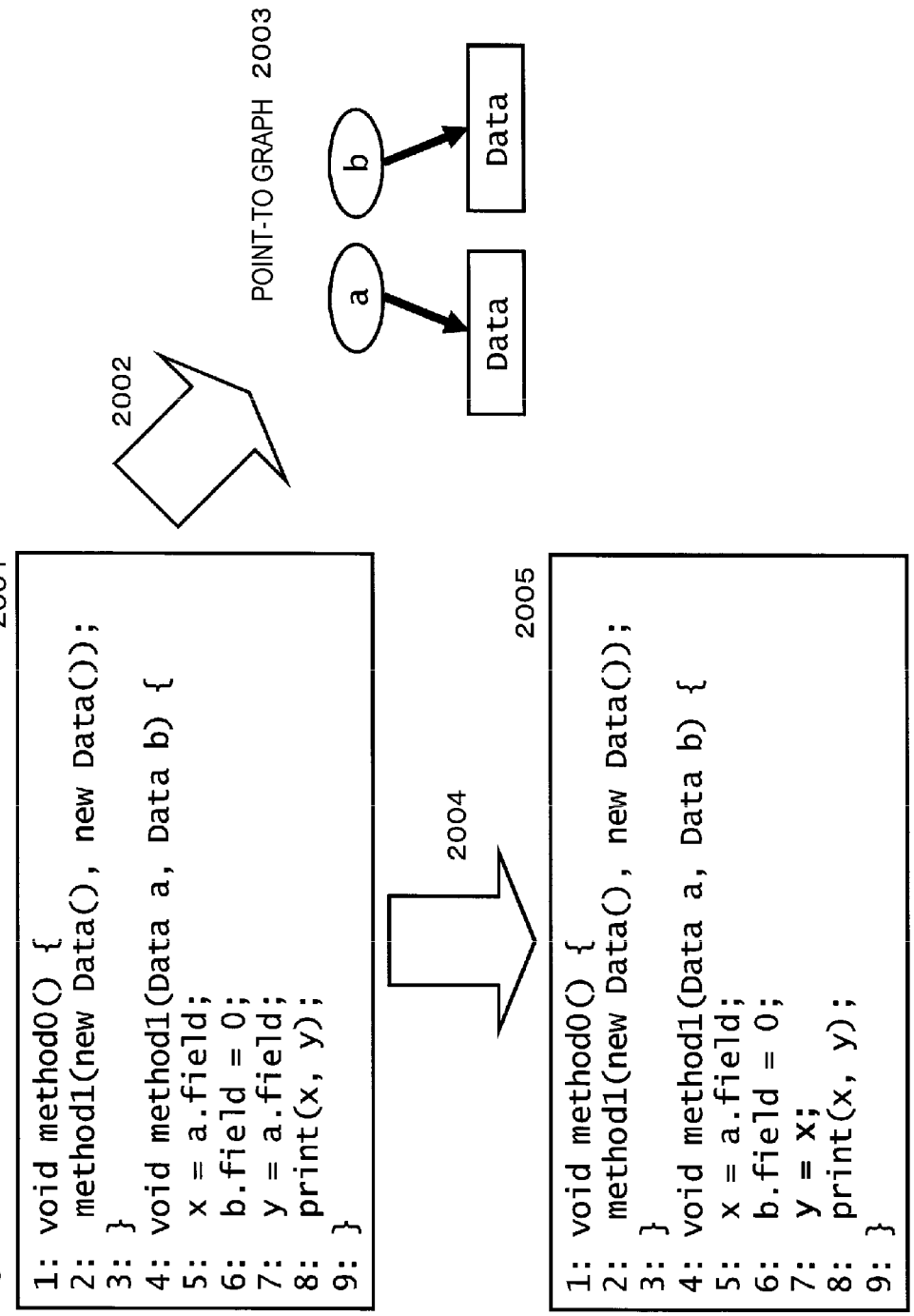
FIG. 20 is a diagram showing an example of performing alias analysis using a result of pointer analysis to optimize a code.

FIG. 20 is a diagram showing an example of performing alias analysis using a result of pointer analysis to optimize a code.

The alias analysis means to judge whether or not variables refer to the same object using multiple names.

It is assumed that pointer analysis (2002) is performed for a program code (2001) and a point-to graph (2003) is obtained. It is seen from the point-to graph (2003) that (sets of) objects pointed to by a variable "a" and a variable "b" do not overlap. That is, the variable "a" and the variable "b" necessarily point to different objects. Therefore, the program code (2001) is optimized (2004) by the code optimizing section (1533) automatically or by the developer, and a program code (2005) is created. In the optimization, "y=a.field" on the seventh line in the code (2001) is rewritten to "y=x" as shown on the seventh line in the code (2005).

Figure 21:
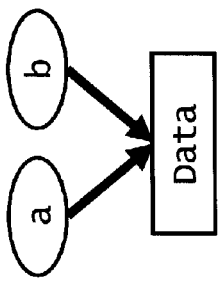
FIG. 21 is a diagram showing an example of performing access analysis of an object using a result of pointer analysis to optimize a code.
Figure 21:
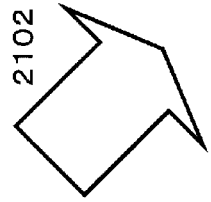
Figure 21:
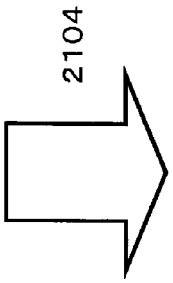

FIG. 21 is a diagram showing an example of performing access analysis of an object using a result of pointer analysis to optimize a code.

It is assumed that pointer analysis (2102) is performed for a program code (2101) and a point-to graph (2103) is obtained. It is seen from the point-to graph (2103) that it is only a variable "a" and a variable "b" that point to an object allocated by the sixth line in the code (2101). Therefore, by checking positions where the variable "a" and the variable "b" are used, it is known that the position to access a Data object allocated by the sixth line last is the code on the third line. Therefore, the program code (2101) is optimized (2104) by the code optimizing section (1533) automatically or by the developer, and a program code (2105) is created. In the optimization, "cache_flush(b)", an instruction to flush the Data object from the cache of the CPU, is inserted immediately after "use(b.field)" on the third line in the code (2105), as shown immediately after the third line in the code (2105). By inserting the cache flush instruction "cache_flush(b)" at an access point which can be the last access point, the computer can use the cache effectively.

Figure 22:
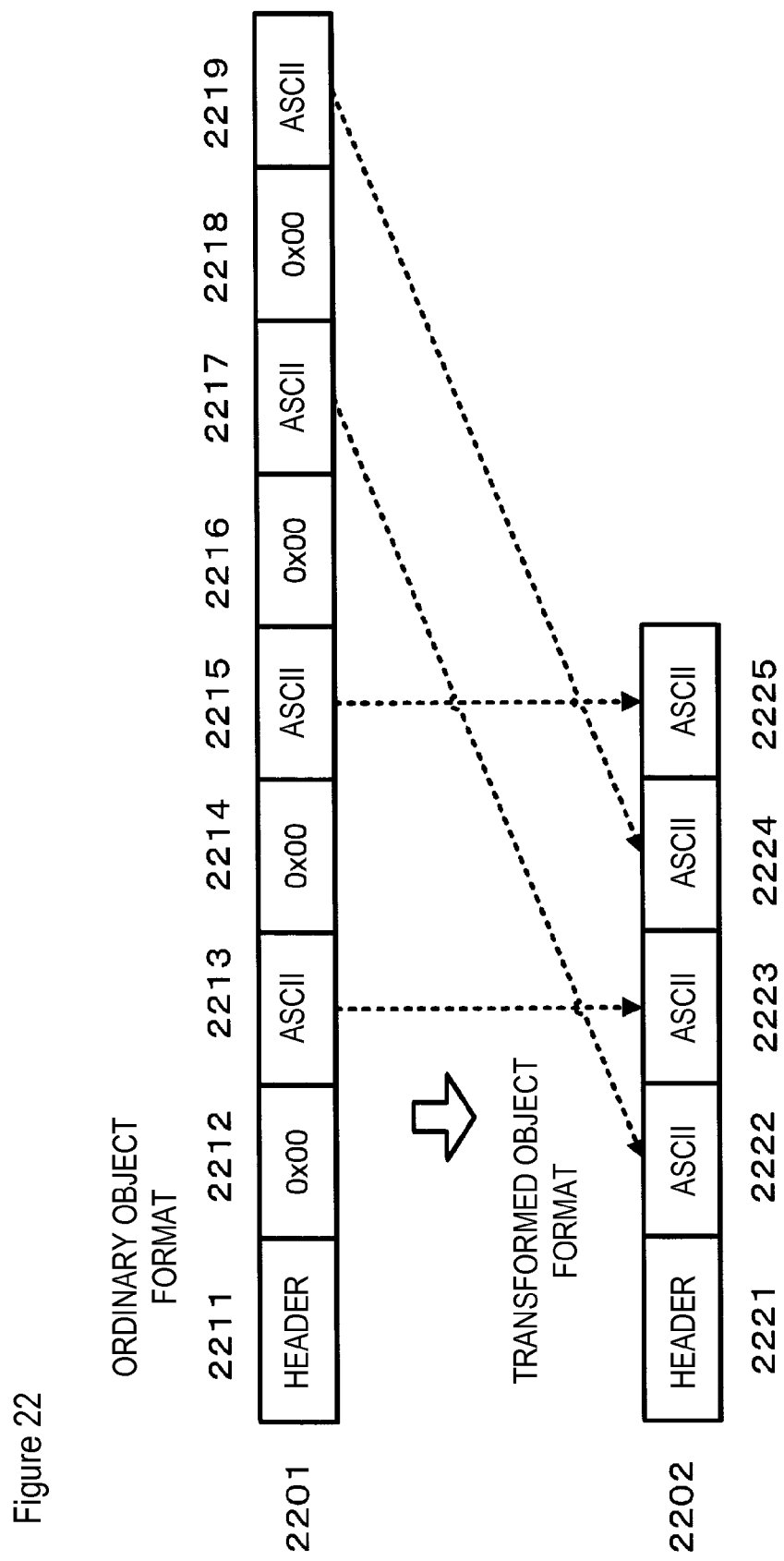
FIG. 22 is a diagram showing an example of performing compression an object using a result of pointer analysis to optimize a code.

FIG. 22 is a diagram showing an example of compressing an object using a result of pointer analysis to optimize a code.

FIG. 22 shows an example of an object format by transforming an ordinary object format by compression.

To be transformable by compression means that a certain character array(s) or a character array(s) allocated to a certain part can be compressed if the character array(s) is in a tendency not to be accessed and includes only ASCII character strings. Compression of an object brings about optimization of access to the object.

An object format (2201) shows an ordinary format. An object format (2202) shows a format in the case where the object format (2201) is transformed by compression.

The object format (2201) includes a header (2211), null value data fields (2212, 2214, 2216 and 2218) and ASCII data fields (2213, 2215, 2217 and 2219). The object format (2202) includes a header (2221) and ASCII data fields (2222 to 2225).

In the transformed object format (2202), the null value data fields (2212, 2214, 2216 and 2218) of the object format (2201) are deleted, and the ASCII data fields (2213, 2215, 2217 and 2219) are connected. Since the number of the data fields of the transformed object format (2202) is four, and the number of the data fields of the object format (2201) is eight, the data fields of the transformed object format (2202) are compressed to almost half the data fields of the object format (2201). Since the number of data fields is compressed in the transformed object format (2202), the memory cost can be reduced in comparison with the object format (2201). As for a method for compressing an object, there are a lot of known methods.

It is assumed that pointer analysis of a program code is performed in accordance with an aspect of the present invention, and it is known from a point-to graph obtained as a result thereof that an object is seldom accessed. The code optimizing section (1533) or the developer optimizes the code so that the object which is seldom accessed can be allocated to the memory in a compressed format (for example, by omitting data fields including 0 as a value, as described above). The amount of memory used can be reduced by this optimization.

Figure 23:
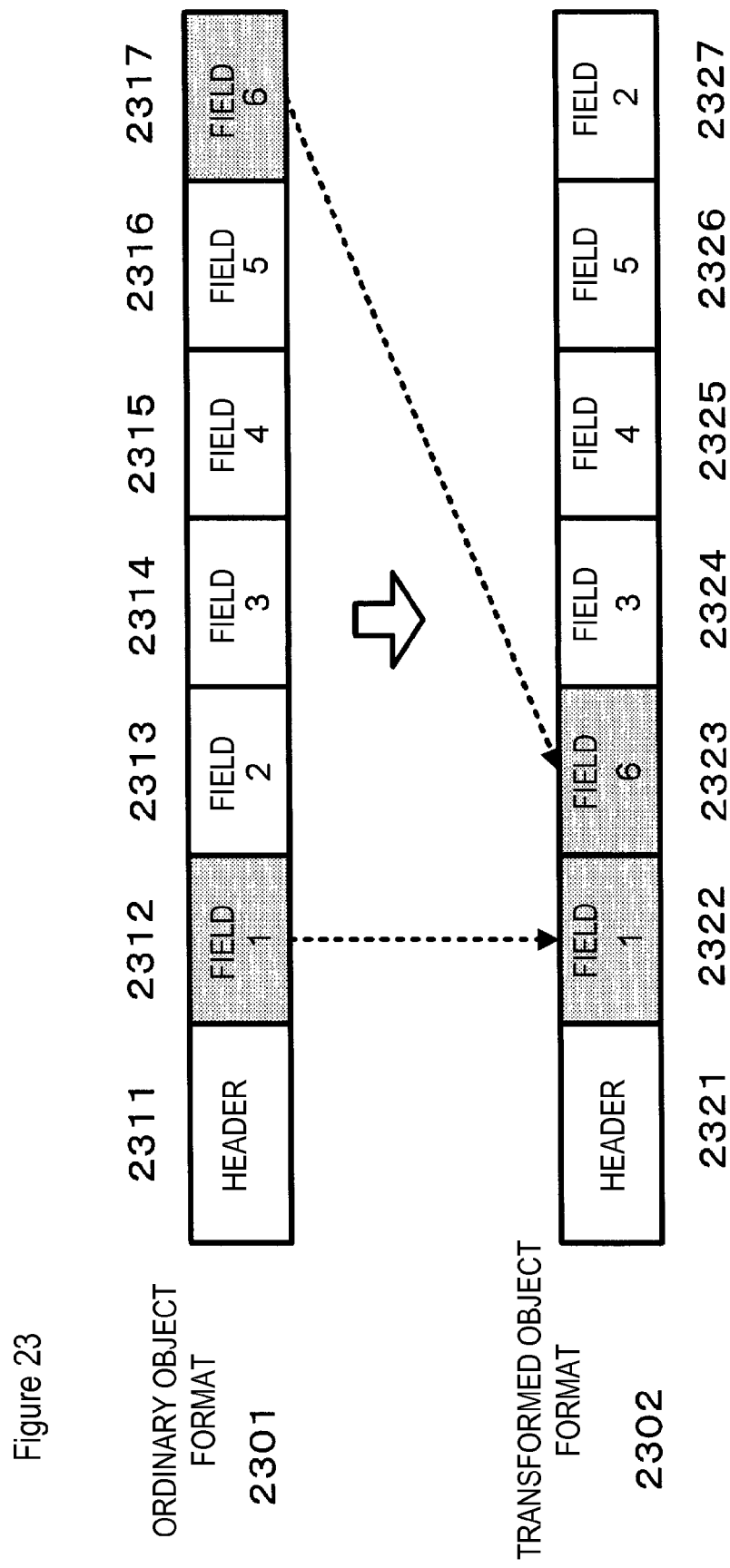
FIG. 23 is a diagram showing an example of performing relocation of a field which is accessed frequently using a result of pointer analysis to optimize a code.

FIG. 23 is a diagram showing an example of performing relocation of a field which is accessed frequently using a result of pointer analysis to optimize a code.

The field relocation means that, for example, when there is a tendency that two or more fields in an object are accessed at the same time, the two or more fields are located at adjacent positions (co-located) in order to decrease data cache misses about the two or more fields.

The object format (2301) shows an ordinary format. An object format (2302) shows a format in the case of the object format (2301) having been transformed.

The object format (2301) includes a header (2311) and data fields 1 to 6 (2312 to 2317) in that order. The object format (2302) includes a header (2321) and data fields 1, 6, 3, 4, 5 and 2 (2321 to 2327) in that order. It is assumed that the data fields 1 (2312) and 6 (2317) show a tendency to be accessed at the same time.

In the object format (2301), the data field 1 (2312) and the data field 6 (2317) in the tendency to be accessed at the same time exist apart from each other. Therefore, in the transformed object format (2302), optimization is performed so that the data field 6 (2323) in the tendency to be accessed at the same time is positioned adjacent to the data field 1 (2322). In the transformed object format (2302), the memory access cost can be reduced in comparison with the object format (2301) because the data field 1 (2322) and the data field 6 (2323) can be accessed at the same time.

It is assumed that pointer analysis of a program code is performed in accordance with an aspect of the present invention, and it is known from a point-to graph obtained as a result thereof that some particular fields of an object are accessed at the same time. The code optimizing section (1533) or the developer optimizes the code so that the fields are relocated to be at near positions in the object. Since the fields can be put on the same cache line by the optimization, it is possible to reduce cache misses.

Figure 24A:
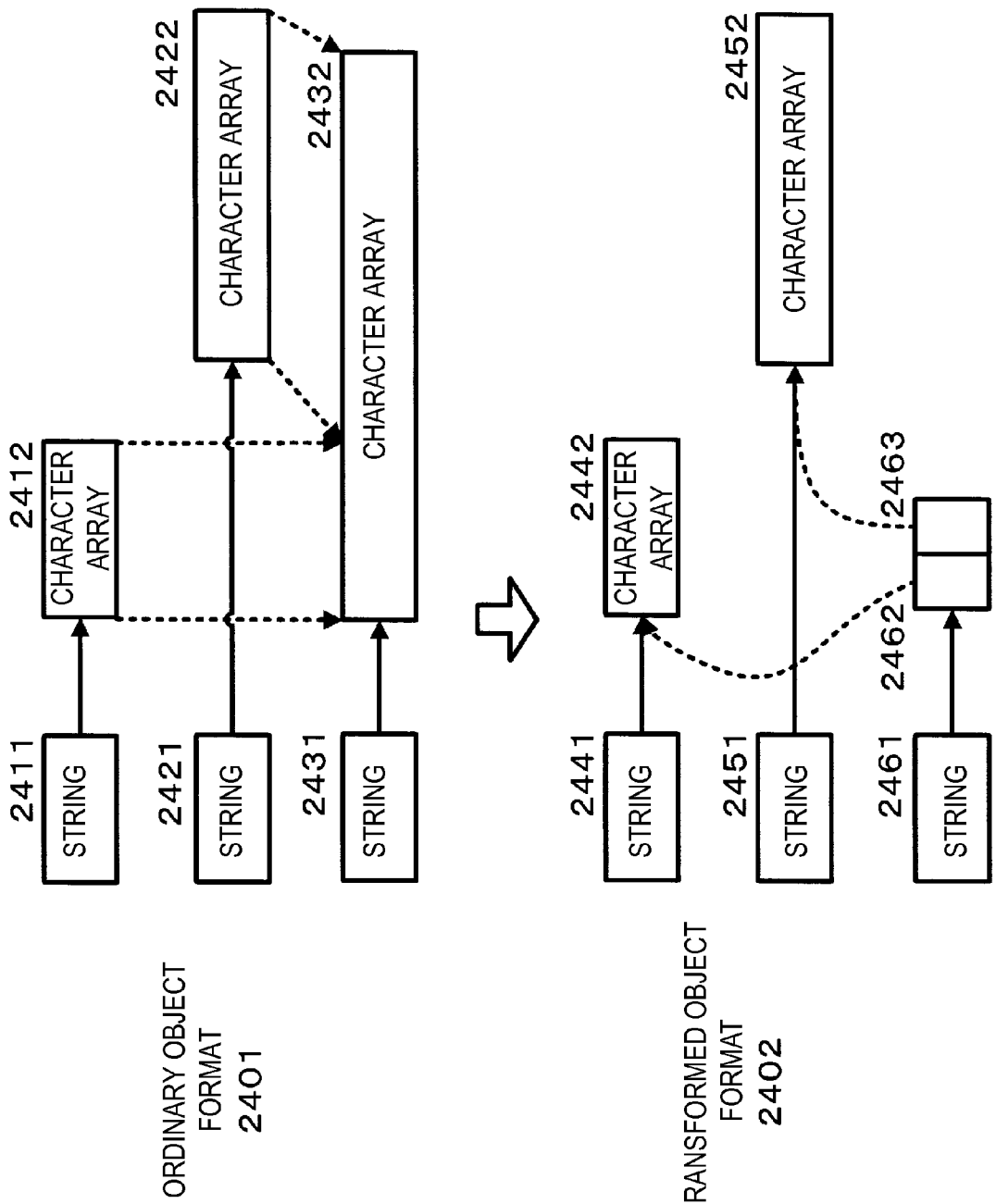
FIG. 24A is a diagram showing an example of lazily allocating an object using a result of pointer analysis to optimize a code.

FIG. 24A is a diagram showing an example of lazily allocating an object using a result of pointer analysis to optimize a code.

To specify a character array using a pointer means that, for example, when multiple string objects allocated to a certain part are in a tendency not to be accessed, and the string objects are generated by being coupled with other string objects, the character array which can be coupled can be specified by using a pointer. The allocation of a character array using a pointer can occur lazily. In the lazy allocation, an object is not allocated until the object is actually needed. Therefore, the lazy allocation brings about optimization of access to the object.

An object format (2401) shows an ordinary format. An object format (2402) shows a format in the case of the object format (2401) having been transformed.

The object format (2401) shows that, when two character arrays (2412) and (2422) are allocated at different positions, the character arrays (2412) and (2422) are combined to newly generate a character array (object format (2432)). Generation of the character array (2432) occurs lazily.

The object format (2402) shows that, when two character arrays (2442) and (2452) are allocated at different positions, each of the character arrays (2442) and (2452) are specified with the use of two pointers (2462 and 2463).

The transformed object format (2402) is different from the object format (2401) in that the two pointers (2462 and 2463) are provided instead of the character array (2432). Since the two pointers (2462 and 2463) can be used instead of the character array (2432) in the object format (2402), the memory cost can be reduced.

It is assumed that pointer analysis of a program code is performed in accordance with an aspect of the present invention, and it is known from a point-to graph obtained as a result thereof that an object is used only by a particular path. The code optimizing section (1533) or the developer optimizes the code so that generation of the object is delayed until the particular path is executed. That is, the object is lazily allocated to the memory. The amount of memory used at the time of executing another path can be reduced by the optimization.

Figure 24B:
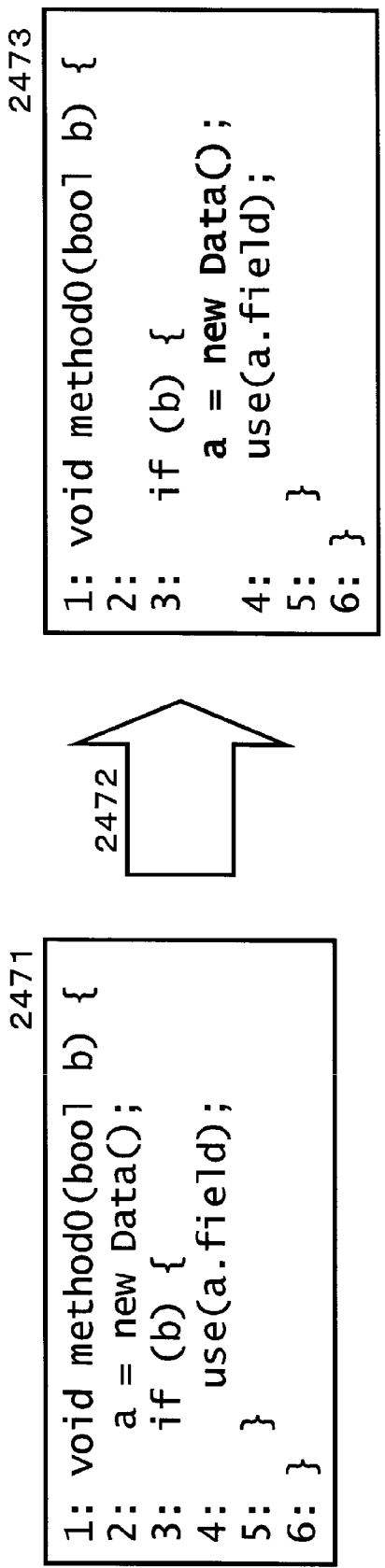
FIG. 24B is a diagram showing an example of a code which lazily allocates an object using a result of pointer analysis.

FIG. 24B is a diagram showing an example of a code which lazily generates an object using a result of pointer analysis.

Pointer analysis of a program code (2471) is performed in accordance with an aspect of the present invention, and it is known from a point-to graph obtained as a result thereof that an object generated by the second line is used only by the fourth line. The code optimizing section (1533) or the developer optimizes the code (2472) so that generation of the object is delayed until immediately before the fourth line. In a code (2473) after the optimization, the instruction on the second line in the code (2471) is moved to be between the third and fourth lines. Due to the optimization, it is not necessary to generate the object in the case of an execution path which does not pass through the instruction on the fourth line, in the code (2473) after the optimization. Therefore, it is possible to reduce the amount of memory used.

The invention claimed is:

1. A method for analyzing a pointer in an analysis target program or a partial program thereof by processing by a computer, the method comprising the computer executing the steps of:

creating a flow-insensitive point-to graph for the program in memory by a compiler, with a compiling target method as a target, the point-to graph being a graph with variables, or variables and at least one of methods and objects as nodes and with objects pointed to by the variables as edges, wherein on condition that an object for which it is desired to detect an access position is identified, creating a first flow-insensitive point-to graph for a first method generating the identified object; and detecting whether or not the object for which it is desired to detect the access position escapes to a first caller method or a first callee method, using the first point-to graph, the detecting step comprising preparing a first load node in the first point-to graph and updating the first point-to graph on condition that a field of at least one object in the first point-to graph is (i) reachable from the first caller method or the first callee method and (ii) in a state of not pointing to the object in the first point-to graph, wherein the first load node is used to detect whether or not the object for which it is desired to detect the access position escapes in the updated first point-to graph; and on condition that the object for which it is desired to detect the access position does not escape to the first caller method or the first callee method, detecting a position to access the object for which it is desired to detect the access position, by following the updated first point-to graph if the first load node is prepared and by following the first point-to graph if the first load node is not prepared.

2. The method according to claim 1, wherein the creating step comprises:

on condition that the object for which it is desired to detect the access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared;

detecting whether or not the object for which it is desired to detect the access position escapes to a method which has not been analyzed yet among a second caller method or a second callee method, using the merged first point-to graph, the detecting step comprising preparing a second load node in the merged first point-to graph and updating the merged first point-to graph on condition that a field of at least one object in the merged first point-to graph is (1) reachable from the second caller method or the second callee method and (2) in a state of not pointing to the object in the merged first point-to graph, wherein the second load node is used to detect whether or not the object for which it is desired to detect the access position escapes in the updated merged first point-to graph;

repeating the creating and the detecting steps until the object for which it is desired to detect the access position stops escaping or until the analyzed methods other than the first method reach a predetermined threshold; and detecting the position to access the object for which it is desired to detect the access position, by following a point-to graph obtained in the end of the repeating step instead of the detecting step.

3. The method according to claim 2, wherein the method analyzed is the first method, the first caller method or the first callee method.

4. The method according to claim 2, wherein the second caller method or the second callee method is a caller method for the first caller method, a method called by the first caller method, another method called by the first method or a method called by the first callee method.

5. The method according to claim 1, wherein, in the detection of whether or not the object escapes, the object for which it is desired to detect the access position is considered not to escape on condition that (i) the object for which it is desired to detect the access position is reachable from the first caller method or the first callee method via a private field, which is a variable, and (ii) positions to access objects read out at all positions to read the private field have been analyzed.

6. The method according to claim 2, wherein, in the detection of whether or not the object escapes, the object for which it is desired to detect the access position is considered not to escape on condition that (i) the object for which it is desired to detect the access position is reachable from the second caller method or the second callee method via a private field, which is a variable, and (ii) positions to access objects read out at all positions to read the private field have been analyzed.

7. The method according to claim 1, further comprising integrating all objects that at least one variable can point to.

8. The method according to claim 2, further comprising integrating all objects that at least one variable can point to.

9. The method according to claim 1, wherein only the program that is executed a predetermined number of times or more is targeted by the analysis.

10. The method according to claim 2, wherein only the program that is executed a predetermined number of times or more is targeted by the analysis.

11. The method according to claim 2, wherein the predetermined threshold is a predetermined value of the total size of the analyzed methods, time required for the analysis or the amount of memory required for the analysis.

12. A method for a computer to optimize a code using an access position detected by an analyzing method for a pointer in an analysis target program or a partial program thereof, by processing by the computer, the analyzing method comprising the computer executing the steps of:

creating a flow-insensitive point-to graph for the program in memory by a compiler, with a compiling target method as a target, the point-to graph being a graph with variables, or variables and at least one of methods and objects as nodes and with objects pointed to by the variables as edges, wherein on condition that an object for which it is desired to detect the access position is identified, creating a first flow-insensitive point-to graph for a first method generating the identified object; and detecting whether or not the object for which it is desired to detect the access position escapes to a first caller method or a first callee method, using the created first point-to graph, the detecting step comprising preparing a first load node in the first point-to graph and updating the first point-to graph on condition that a field of at least one object in the first point-to graph is (i) reachable from the first caller method or the first callee method and (ii) in a state of not pointing to the object in the first point-to graph, wherein the first load node is used to detect whether or not the object for which it is desired to detect the access position escapes in the updated first point-to graph; and on condition that the object for which it is desired to detect the access position does not escape to the first caller method or the first callee method, detecting a position to access the object for which it is desired to detect the access position, by following the updated first point-to graph if the first load node is prepared and by following the first point-to graph if the first load node is not prepared.

13. The method according to claim 12, wherein the code optimization includes at least one of (i) inserting a cache flush instruction at the access point which can possibly be the last access point, (ii) allocating the object which seems not to be accessed to memory in a compressed format, (iii) relocating a field in the object, or (iv) lazily allocating the object to the memory.

14. A method for analyzing a pointer in an analysis target program or a partial program thereof by processing by a computer, the method comprising the computer executing the steps of:

creating a flow-insensitive point-to graph for the program in memory by a compiler, with a compiling target method as a target, the point-to graph being a graph with variables, or variables and at least one of methods and objects as nodes and with objects pointed to by the variables as edges, wherein on condition that an object for which it is desired to detect the access position is identified, creating a first flow-insensitive point-to graph for a first method generating the identified object;

detecting whether or not the object for which it is desired to detect the access position escapes to a first caller method or a first callee method, using the created first point-to graph, the detecting step comprising preparing a first load node in the first point-to graph and updating the first point-to graph on condition that a field of at least one object in the first point-to graph is (i) reachable from the first caller method or the first callee method and (i) in a state of not pointing to the object in the first point-to graph, wherein the first load node is used to detect whether or not the object for which it is desired to detect the access position escapes in the updated first point-to graph;

on condition that the object for which it is desired to detect the access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared;

detecting whether or not the object for which it is desired to detect the access position escapes to a method which has not been analyzed yet among a second caller method or a method which has not been analyzed yet among a second callee method, using the merged first point-to graph, the detecting step comprising preparing a second load node in the merged first point-to graph and updating the merged first point-to graph on condition that a field of at least one object in the merged first point-to graph is (i) reachable from the second caller method or the second callee method and (ii) in a state of not pointing to the object in the merged first point-to graph, wherein the second load node is used to detect whether or not the object for which it is desired to detect the access position escapes in the updated, merged first point-to graph; and repeating the creating and the detecting steps until the object for which it is desired to detect the access position stops escaping or until analyzed methods other than the first method reach a predetermined threshold; and detecting a position to access the object for which it is desired to detect the access position, by following a point-to graph obtained in the end of the repeating steps.

15. A computer for analyzing a pointer in an analysis target program or a partial program thereof, the computer comprising:

a memory element storing the system;
a processor coupled to the memory element;
wherein the processor executes the following sections of the computer:

a graph creating section creating a flow-insensitive point-to graph for the program in memory by a compiler, with a compiling target method as a target, the point-to graph being a graph with variables, or variables and at least one of methods and objects as nodes and with objects pointed to by the variables as edges, wherein on condition that an object for which it is desired to detect an access position is identified, creating a first flow-insensitive point-to graph for a first method generating the identified object; and detecting whether or not the object for which it is desired to detect the access position escapes to at least one method which is a first caller method or a first callee method, using the created first point-to graph, the detecting comprising preparing a first load node in the first point-to graph and updating the first point-to graph on condition that a field of at least one object in the first point-to graph is (i) reachable from the first caller method or the first callee method and (ii) in a state of not pointing to the object in the first point-to graph, wherein the first load node is used to detect whether or not the object for which it is desired to detect the access position escapes in the updated first point-to graph; and a detection section detecting, on condition that the object for which it is desired to detect the access position does not escape to the first caller method or the first callee method, a position to access the object for which it is desired to detect the access position, by following the updated first point-to graph if the first load node is prepared and by following the first point-to graph if the first load node is not prepared.

16. The computer according to claim 15, wherein the graph creation section further comprises:

on condition that the object for which it is desired to detect the access position escapes to the first caller method or the first callee method, creating a second flow-insensitive point-to graph for the first caller method or the first callee method, and merging the second point-to graph into the updated first point-to graph if the first load node is prepared or into the first point-to graph if the first load node is not prepared;

detecting whether or not the object for which it is desired to detect the access position escapes to a method which has not been analyzed yet among a second caller method or a second callee method, using the merged first point-to graph, the detecting comprising preparing a second load node in the merged first point-to graph and updating the merged first point-to graph on condition that a field of at least one object in the merged first point-to graph is (i) reachable from the second caller method or the second callee method and (ii) in a state of not pointing to the object in the merged first point-to graph, wherein the second load node is used to detect whether or not the object for which it is desired to detect the access position escapes in the updated, merged first point-to graph; and repeating the creating and the detecting steps until the object for which it is desired to detect the access position stops escaping or until analyzed methods other than the first method reach a predetermined threshold; and the detection section executes detecting a position to access the object for which it is desired to detect the access position, by following a point-to graph obtained in the end of the repeating step.

17. The computer according to claim 15, wherein, in the detection of whether or not the object escapes, the object for which it is desired to detect the access position is considered not to escape on condition that (i) the object for which it is desired to detect the access position is reachable from the first caller method or the first callee method via a private field, which is a variable, and (ii) positions to access objects read out at all positions to read the private field have been analyzed.

18. The computer according to claim 16, wherein, in the detection of whether or not the object escapes, the object for which it is desired to detect the access position is considered not to escape on condition that (i) the object for which it is desired to detect an access position is reachable from the second caller method or the second callee method via a private field, which is a variable, and (ii) positions to access objects read out at all positions to read the private field have been analyzed.

19. The computer according to claim 15, further comprising an optimization section performing optimization of a code using the access position detected by the detection section.

20. A computer readable article of manufacture tangibly embodying non-transitory computer readable instructions which, when executed, cause a computer to carry out the steps of a method comprising:

creating a flow-insensitive point-to graph for the program in memory by a compiler, with a compiling target method as a target, the point-to graph being a graph with variables, or variables and at least one of the methods and objects as nodes and with objects pointed to by the variables as edges, wherein on condition that an object for which it is desired to detect an access position is identified, creating a first flow-insensitive point-to graph for a first method generating the identified object; and detecting whether or not the object for which it is desired to detect the access position escapes to a first caller method or a first callee method, using the first point-to graph, the detecting step comprising preparing a first load node in the first point-to graph and updating the first point-to graph on condition that a field of at least one object in the first point-to graph is (i) reachable from the first caller method or the first callee method and (ii) in state of not pointing to the object in the first point-to graph, wherein the first load node is used to detect whether or not the object for which it is desired to detect the access position escapes in the updated first point-to graph; and on condition that the object for which it is desired to detect the access position does not escape to the first caller method or the first callee method, detecting a position to access the object for which it is desired to detect the access position, by following the updated first point-to graph if the first load node is prepared and by following the first point-to graph if the first load node is not prepared.

* * * * *